US007983165B2

United States Patent
Li et al.

(10) Patent No.: US 7,983,165 B2
(45) Date of Patent: *Jul. 19, 2011

(54) METHODS AND APPARATUS RELATED TO SCHEDULING TRAFFIC IN A WIRELESS COMMUNICATIONS SYSTEM USING SHARED AIR LINK TRAFFIC RESOURCES

(75) Inventors: Junyi Li, Bedminster, NJ (US); Rajiv Laroia, Far Hills, NJ (US); Thomas Richardson, South Orange, NJ (US); Xinzhou Wu, Monmouth Junction, NJ (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

This patent is subject to a terminal disclaimer.

(21) Appl. No.: 11/933,042

(22) Filed: Oct. 31, 2007

(65) Prior Publication Data
US 2009/0109851 A1    Apr. 30, 2009

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)
H04B 7/212 (2006.01)
H04B 7/00 (2006.01)

(52) U.S. Cl. .................. 370/235; 370/348; 455/509
(58) Field of Classification Search .............. None
See application file for complete search history.

(56) References Cited

U.S. PATENT DOCUMENTS

| 2003/0012176 A1* | 1/2003 | Kondylis et al. ............ 370/348 |
| 2007/0105576 A1* | 5/2007 | Gupta et al. ................ 455/509 |
| 2009/0109850 A1* | 4/2009 | Li et al. ....................... 370/235 |

FOREIGN PATENT DOCUMENTS

WO    WO 2007107895 A1 *    9/2007

OTHER PUBLICATIONS

International Search Report and Written Opinion—PCT/US2008/082017, International Search Authority—European Patent Office—Sep. 4, 2009.

* cited by examiner

*Primary Examiner* — Xavier Szewai Wong
(74) *Attorney, Agent, or Firm* — James K. O'Hare

(57) ABSTRACT

Methods and apparatus for use in a wireless communications system in which traffic air link resources may be, and sometimes are, shared are described. Various described methods and apparatus are well suited for use in a peer to peer communications system in which transmission control decisions are made in a decentralized manner. An exemplary peer to peer communications system implements the scheduling of traffic intervals in a distributed manner utilizing connection priority information and interference information. An exemplary peer to peer timing structure includes a user scheduling interval and an associated traffic interval. The user scheduling interval includes a plurality transmission request/request response rounds. By utilizing multiple request/request response rounds, a transmission decision corresponding to a connection to yield in an earlier round can be overridden in a subsequent round, resulting in higher overall traffic throughput in the system.

45 Claims, 27 Drawing Sheets

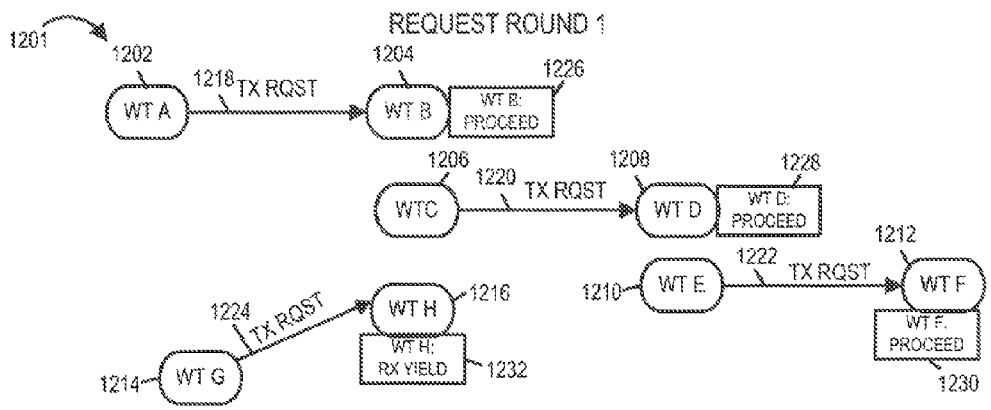
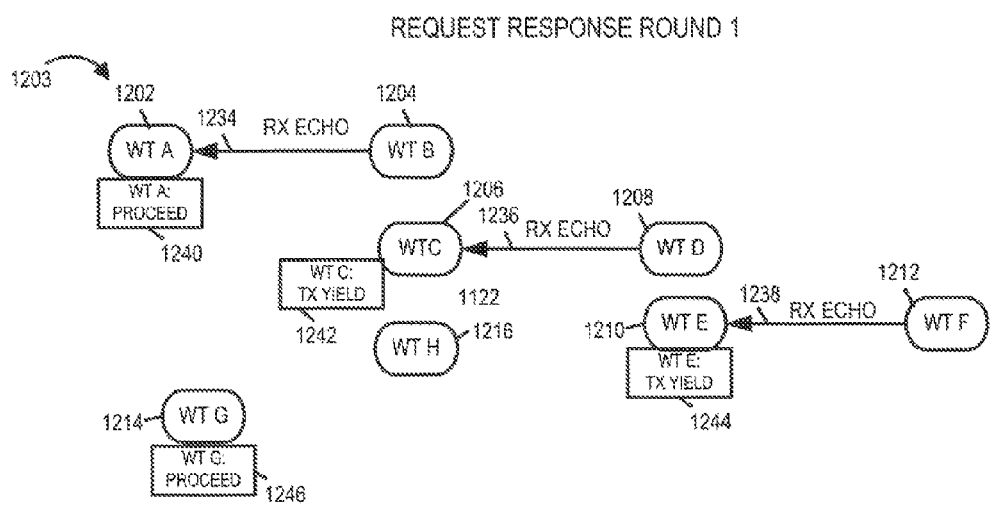
FIGURE 12

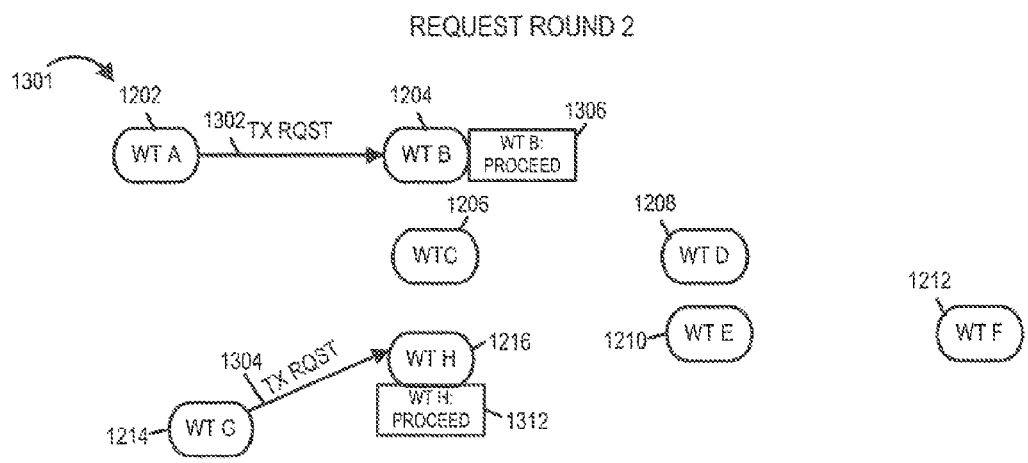
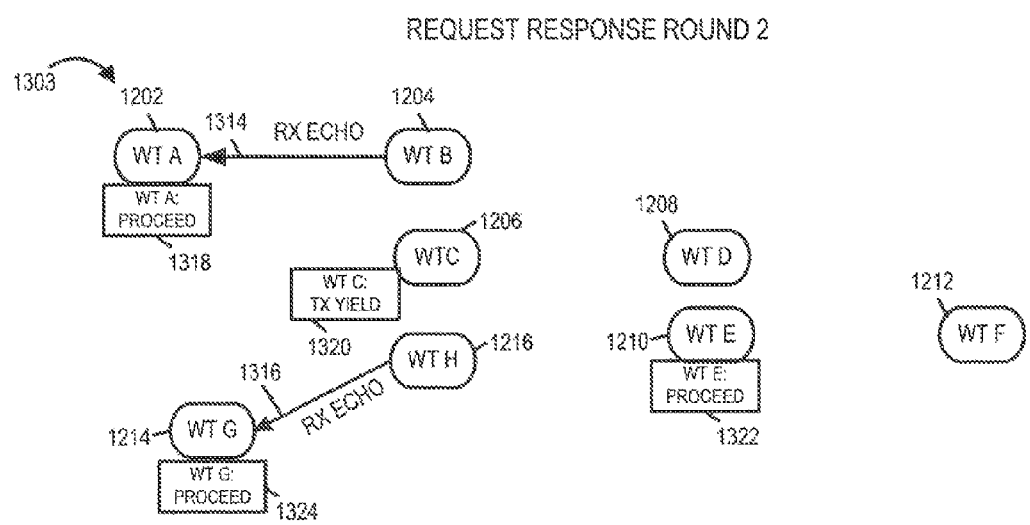
FIGURE 13

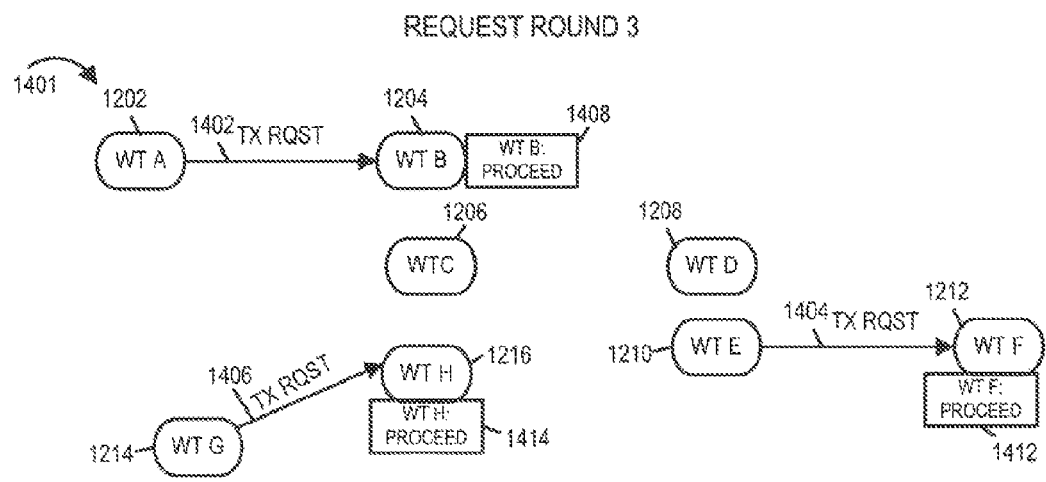
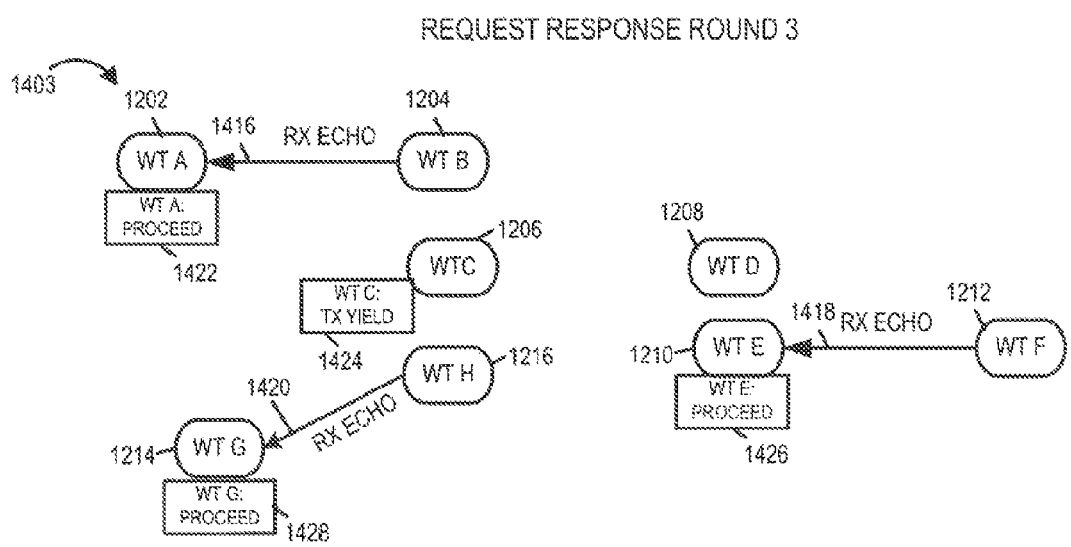
FIGURE 14

METHODS AND APPARATUS RELATED TO SCHEDULING TRAFFIC IN A WIRELESS COMMUNICATIONS SYSTEM USING SHARED AIR LINK TRAFFIC RESOURCES

FIELD

Various embodiments are directed to methods and apparatus for use in a wireless communications system and, more particularly, for use in a peer to peer wireless communications system.

BACKGROUND

In a peer to peer wireless communications systems multiple devices may desire to transmit traffic signals concurrently using the same air link resources. Scheduling users to an air link traffic resource in an efficient manner in a system lacking centralized control can be a challenging task. Accordingly, there is a need for efficient scheduling methods and apparatus.

It would be beneficial if methods and apparatus were developed which take in account interference implications of transmission scheduling decisions. It would also be advantageous if methods and apparatus were developed which take in account priority considerations when making transmission scheduling decisions. Methods and apparatus that allow for a transmission decision adjustments based on an earlier transmission decision of another device could also be beneficial.

SUMMARY

Methods and apparatus for use in a wireless communications system in which traffic air link resources may be, and sometimes are, shared are described. Various described methods and apparatus are well suited for use in a peer to peer communications system in which transmission control decisions are made in a decentralized manner.

An exemplary peer to peer communications system implements the scheduling of traffic intervals in a distributed manner utilizing connection priority information and interference information. An exemplary peer to peer timing structure includes a user scheduling interval and an associated traffic interval. The user scheduling interval includes a plurality transmission request/transmission request response rounds. A transmission request/transmission request response round includes a transmission interval and a corresponding request response interval.

In various embodiments, methods and/or apparatus utilizing multiple transmission request/request response rounds allow for a higher utilization of air link resources for traffic signaling than would otherwise be used if a single request/request response round approach was employed.

An exemplary method of operating a first device to communicate with a second device, in accordance with some embodiments, comprises: transmitting a first transmission request from the first device to the second device, the first transmission request being a first request to transmit data to the second device during a first traffic interval; transmitting a second transmission request from the first device to the second device, the second transmission request being a second request to transmit data to the second device during the first traffic interval, transmitting of the second transmission request occurring subsequent to transmission of said first transmission request; and making a decision whether or not to transmit data to the second device based on whether a response to the second transmission request was received from the second device.

A first device for communicating with a second device, in accordance with some embodiments, comprises: a transmission request module for generating transmission requests, said transmission requests including a first transmission request and a second transmission request from the first device to the second device, the first transmission request being a first request to transmit data to the second device during a first traffic interval, the second transmission request being a second request to transmit data to the second device during the first traffic interval; a wireless transmitter for transmitting the first and second transmission requests; a receiver for receiving transmission request responses; a transmission decision module for determining whether or not to transmit data to the second device based on whether a response to the second transmission request was received from the second device; and a transmission control module for controlling said wireless transmitter to transmit data to said second device when a decision by said transmission decision module indicates a decision to transmit.

An exemplary method of operating a second device to communicate with a first device, in accordance with some embodiments comprises: transmitting a first transmission request response from the second device to the first device, the first transmission request response being a response to a first request to transmit data to the second device during a first traffic interval; and transmitting a second transmission request response from the second device to the first device, the second transmission request response being a response to a second request to transmit data to the second device during the first traffic interval, transmitting of the second transmission request response occurring subsequent to transmission of said first transmission request response.

An exemplary second device for communicating with a first device, in accordance with some embodiments, comprises: a transmission request response generation module for generating transmission request responses including a first transmission request response and a second transmission request response, the first transmission request response being a response to a first request to transmit data to the second device during a first traffic interval, the second transmission request response being a response to a second request to transmit data to the second device during the first traffic interval; a transmitter for transmitting transmission request responses from the second device to the first device; and a transmission request response control module for controlling when said first and second transmission request responses are transmitted, transmission of said second transmission request response from the second device to the first device occurring subsequent to transmission of said first transmission request response.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIGS. 12, 13, 14 and 15 include a sequence of drawing illustrating exemplary multi-round request and response signaling in accordance with various embodiments.

DETAILED DESCRIPTION

Figure 1:
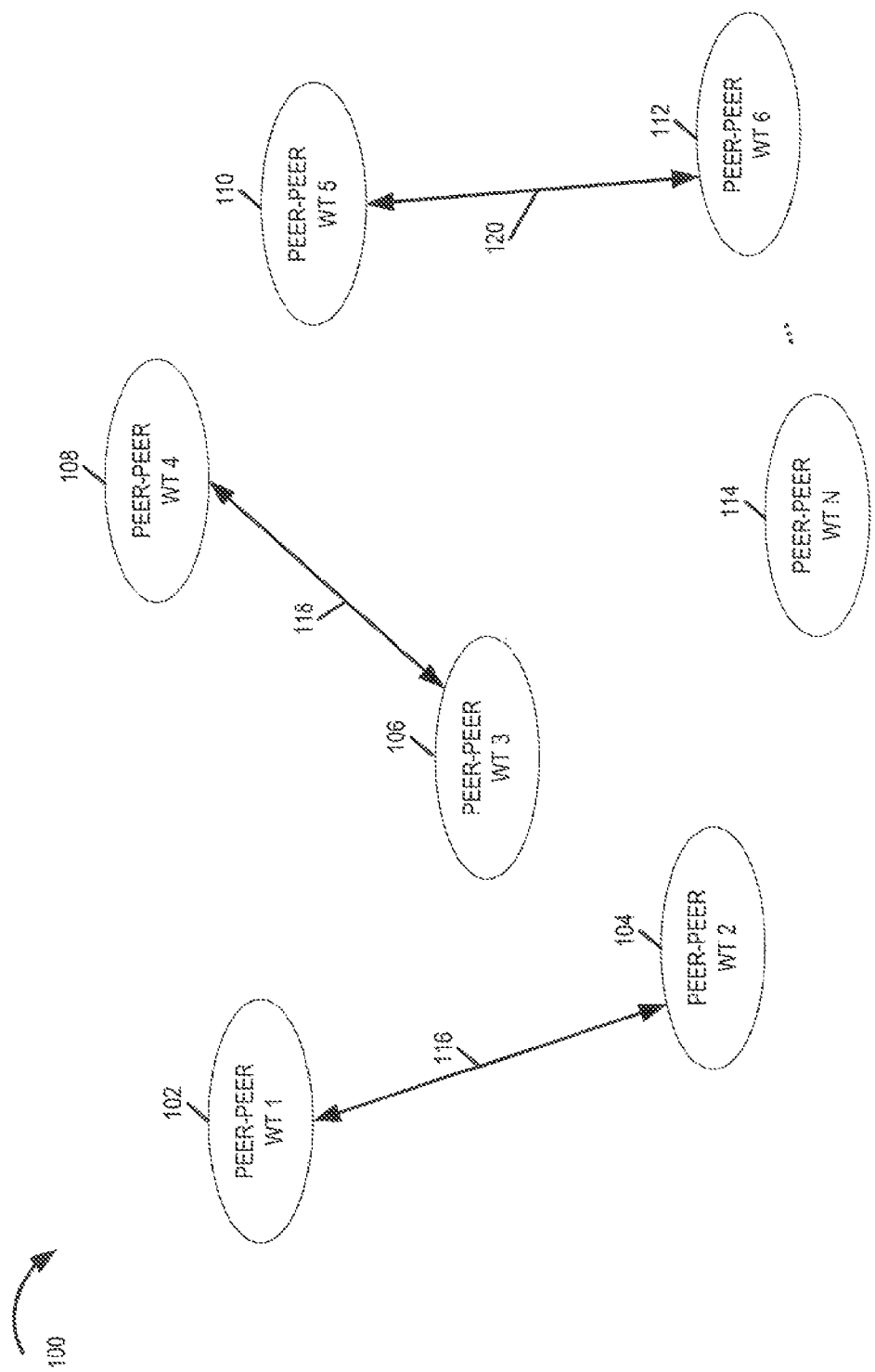
FIG. 1 is a drawing of an exemplary peer to peer wireless communications system in accordance with various embodiments.

FIG. 1 is a drawing of an exemplary peer to peer wireless communications system 100 in accordance with various embodiments. Exemplary wireless communications system 100 includes a plurality of wireless terminals, e.g., mobile nodes, supporting peer to peer communications (peer to peer wireless terminal 1 102, peer to peer wireless terminal 2 104, peer to peer wireless terminal 3 106, peer to peer wireless terminal 4 108, peer to peer wireless terminal 5 110, peer to peer wireless terminal 6 112, . . . , peer to peer wireless terminal N 114). In this example, at the time represented by FIG. 1, peer to peer wireless terminal 1 102 has an active connection with peer to peer wireless terminal 2 104 as indicated by arrow 116; peer to peer wireless terminal 3 106 has an active connection with peer to peer wireless terminal 4 108 as indicated by arrow 118; and peer to peer wireless terminal 5 110 has an active connection with peer to peer wireless terminal 6 112 as indicated by arrow 120.

In accordance with a feature of various embodiments, a decision whether or not to transmit on a peer to peer air link traffic resource, e.g., a peer to peer traffic segment, is performed in a distributed manner with both the transmission node and receiving node having an input into the decision process. In various embodiments, interference considerations regarding other peer to peer communications devices which may desire to transmit on the same peer to peer air link traffic resource are considered in making a transmission decision. In some such embodiments, monitored peer to peer signals from peer to peer devices with which a peer to peer device does not have an active connection are used in the transmission decision process.

In some embodiments, following a transmission request to transmit traffic signals, both the intended receiving device and the intended transmission device have an opportunity to yield to other peer to peer devices and refrain from allowing the requested peer to peer traffic signaling to proceed.

In some embodiments, following the transmission device's final round decision to transmit traffic and prior to transmission of said traffic, the transmission device transmits a peer to peer pilot signal. In some such embodiments, the peer to peer pilot signal is utilized by the receiving device to determine information, which is to be used to determine a data rate for the traffic data. In some embodiments, the air link resource conveying the traffic signals also conveys data rate information of the traffic.

In accordance with a feature of various embodiments, a user scheduling interval includes a plurality of transmission request/transmission request response rounds, e.g., three transmission request/transmission request response rounds. In some such embodiments, the transmission decision reached by the device which wants to transmit at the end of the last round determines whether or not the device transmits traffic in the corresponding traffic interval.

Figure 2:
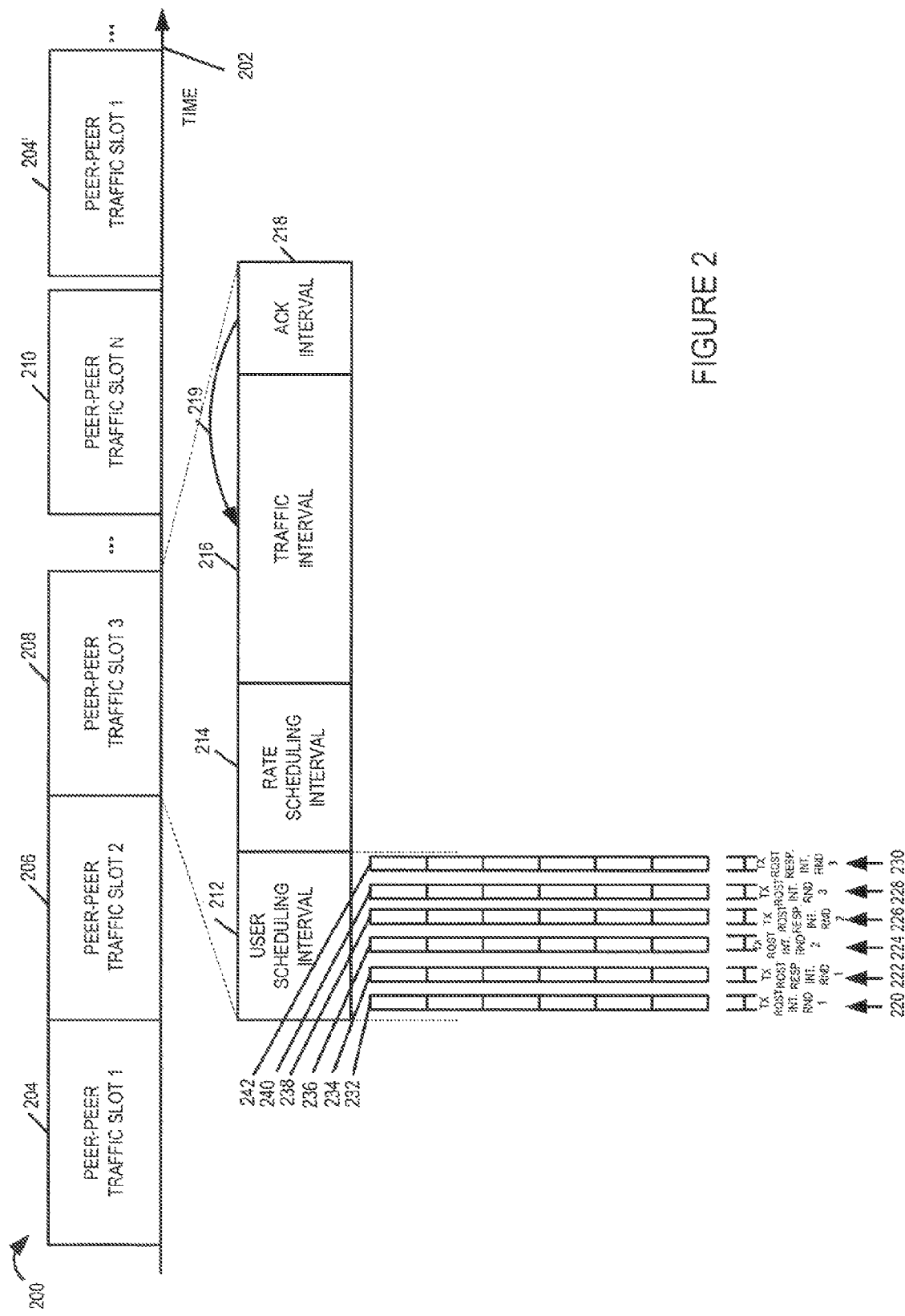
FIG. 2 is a drawing of exemplary peer to peer traffic slots in accordance with various embodiments.

FIG. 2 is a drawing 200 of exemplary peer to peer traffic slots in accordance with various embodiments. Drawing 200 illustrates an exemplary sequence of peer to peer traffic slots (peer to peer traffic slot 1 204, peer to peer traffic slot 2 206, peer to peer traffic slot 3 208, . . . , peer to peer traffic slot N 210) along time axis 202. In this exemplary embodiment, the sequence repeats as part of a recurring timing structure as indicated by peer to peer traffic slot 1 204' following peer to peer traffic slot N 210.

The exemplary drawing 200 is, e.g., a logical representation. In some embodiments, logical structure communications resources are mapped to physical air link resources. For example, peer-to-peer traffic slot 3 208 is shown to include user scheduling interval 212, rate scheduling interval 214, traffic interval 216, and acknowledgment interval 218, and those portions are adjacent to each other. The physical air link resources associated with those portions may have time gaps between them, e.g., to allow processing time. In some embodiments, tone hopping is implemented as part of the mapping.

Each exemplary peer to peer traffic slot, in some embodiments, includes a user scheduling interval, a rate scheduling interval, a traffic interval and an acknowledgement interval. In one exemplary embodiment, an exemplary peer to peer traffic slot, e.g., peer to peer traffic slot 3 208 includes user scheduling interval 212, rate scheduling interval 214, traffic interval 216 and acknowledgement interval 218. Acknowledgement interval 218 corresponds to traffic interval 216 as indicated by arrow 219.

The user scheduling interval 212 includes a plurality of transmission request intervals and a plurality of transmission request/transmission request response rounds response (round 1 including: transmission request interval for round 1 220 and transmission request response interval for 1 222; round 2 including: transmission request interval for round 2 224 and transmission request response interval for round 2 226; round 3 including: transmission request interval for round 3 228 and transmission request response interval for round 3 230). During the user scheduling interval 212 at least some symbols are designated for conveying traffic transmission request signals, e.g., a TX request signal, and at least some symbols are designated for conveying traffic transmission request response signals, e.g., an RX echo signal. Exemplary symbol 232, is designated to be conveyed during TX request interval for round 1 220. Exemplary symbol 234 is designated to be conveyed during transmission request response interval for round 1 222. A request response conveyed in symbol 234 corresponds to a request communicated in symbol 232. Exemplary symbol 236 is designated to be conveyed during TX request interval for round 2 224. Exemplary symbol 238 is designated to be conveyed during transmission request response interval for round 2 226. A request response conveyed in symbol 238 corresponds to a request communicated in symbol 236. Exemplary symbol 240 is designated to be conveyed during TX request interval for round 3 228. Exemplary symbol 242 is designated to be conveyed during transmission request response interval 3 230. A request response conveyed in symbol 242 corresponds to a request communicated in symbol 240.

In some embodiments, a transmission request signal corresponding to a connection utilizes one tone for one symbol transmission time interval for one round. In some embodiments, a transmission request response signal corresponding to a connection utilizes one tone for one symbol transmission time interval for one round. In various embodiments, different positions for different connections during the same transmission request interval, e.g. TX request interval round 2 224, are associated with different priority level designations. In various embodiments, different positions for different connections during the same transmission request response interval, e.g. TX request response interval for round 2 226, are associated with different priority level designations.

In some embodiments, there are different numbers of request/request response rounds in the user scheduling interval 212, e.g. two rounds or more than two rounds.

Figure 3:
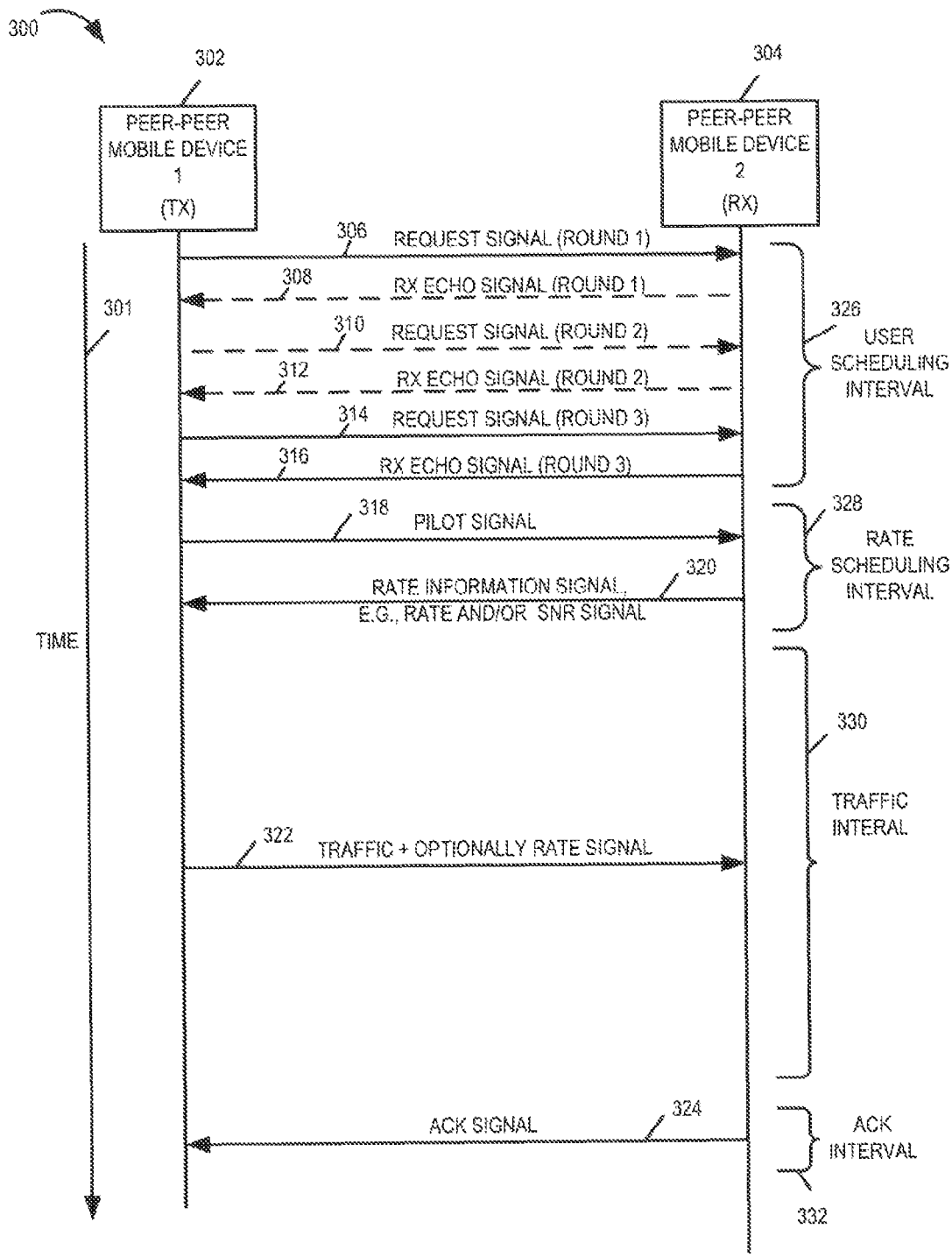
FIG. 3 is a drawing illustrating peer to peer mobile communications devices and exemplary signaling exchanged between the devices to support peer to peer traffic in accordance with various embodiments, e.g., under the situation where the first device wants to send traffic in the slot to the second device and is allowed to proceed in accordance with priority considerations and interference considerations.

FIG. 3 is a drawing 300 illustrating peer to peer mobile communications devices (302, 304) and exemplary signaling exchanged between the devices (302, 304) to support peer to peer traffic in accordance with various embodiments, e.g., under the situation where the first device wants to send traffic in the slot to the second device and is allowed to proceed in accordance with priority considerations and interference considerations. Additional signals from other peer to peer devices in the local vicinity may be, and sometimes are, considered and utilized. The communications devices (302, 304) may be any of the peer to peer wireless terminals of FIG. 1. In this example, peer to peer mobile device 1 302 desires to transmit traffic signals to peer to peer mobile device 2 304. Line 301 indicates time; and there is a user scheduling interval 326, followed by a rate scheduling interval 328, followed by a traffic interval 330, followed by an acknowledgment interval 332. Intervals (326, 328, 330, 332) of FIG. 3 are, e.g., intervals (212, 214, 216, 218) of FIG. 2.

During the user scheduling interval 326, peer to peer mobile device 1 302 generates and transmits round 1 transmission request signal 306. Peer to peer mobile device 2 304, the intended recipient of transmission request signal 306 receives transmission request signal 306, processes the signal, considers the request, and sends a round 1 transmission request response signal, otherwise known as a round 1 RX echo signal 308, if it approves of the request. If it does not approve the request, the peer to peer mobile device 2 304 does not send a response. Device 1 302 receives round 1 request response signals, and determines whether or not to transmit round 2 transmission request signal 310 as a function of the received round 1 request response signals. Assuming device 1 302 decides to transmit and transmits round 2 transmission request signal 310, peer to peer mobile device 2 304, the intended recipient of transmission request signal 310 receives transmission request signal 310, processes the signal, considers the request, and sends a round 2 transmission request response signal, otherwise known as a round 2 RX echo signal 312, if it approves of the request. If it does not approve the request, the peer to peer mobile device 2 304 does not send a response. Device 1 302 receives round 2 request response signals, and determines whether or not to transmit round 3 transmission request signal 312 as a function of the received round 2 request response signals. Assume for the purposes of this example, that device 1 302 has decided to transmit round 3 transmission request signal 314 to device 2 304. Device 2 304 receives round 3 transmission request signals including signal 314 and makes a decision whether or not to transmit a round 3 transmission request response signal 316 to device 1 302. Assume for the purpose of this example, that device 2 304 decides to transmit RX echo signal 316 and transmit signal 316 to device 1 302. Device 1 302 receives round 3 transmission request response signal including signal 316, and makes a decision whether or not to transmit traffic signals 322 in the traffic interval 330 as a function of the received round 3 request response signals. Assume peer to peer mobile device 1 302 decides to proceed with transmission of peer to peer traffic signals 322 to device 2 304.

During rate scheduling interval 328, the peer to peer mobile communications device 1 302 sends pilot signal 318. Peer to peer mobile device 2 304 receives the pilot signal 318, measures the received signal strength, and generates a rate information signal 320. The rate information signal 320 communicates, e.g., a rate, an SNR value, an interference value, and/or an SIR value, so that peer to peer mobile device 1 302 can determine a maximum allowable data rate to be used during subsequent traffic interval 330. Peer to peer mobile device 2 304 transmits the generated rate information signal 320 to peer to peer mobile device 1 302.

Peer to peer mobile device 1 302 receives the rate information signal 320 and determines a maximum allowed transmission rate to be used for traffic portion 330. Peer to peer mobile device 1 302 determines an actual data rate to use as a function of the determined maximum allowed transmission rate, wherein the actual data rate is less than or equal to the maximum allowed transmission rate. In various embodiments, the peer to peer mobile device 1 302 also considers (i) the amount of traffic data waiting to be communicated and/or (ii) its power status, e.g., remaining battery power and/or mode of operation, in determining the actual transmission data rate to use for the traffic.

Peer to peer mobile device 1 302 generates and transmits traffic signals 322 during traffic interval 330. The traffic signals communicate data at the determined actual data rate. In some embodiments, the traffic signals also carry an indication of the actual data rate. In one such embodiment, the rate information is communicated using a subset of the resources allocated for the traffic, e.g., the traffic resource includes a first portion, e.g., a first set of OFDM tone symbols, allocated to carry rate information, and a second portion, e.g., a second set of OFDM tone symbols, allocated to carry the traffic, e.g., user data, wherein the first and second sets are non-overlapping. In another such embodiment, the rate information is communicated using the same resources carrying traffic, e.g., the rate information is communicated via varying the transmit power of modulation symbols carrying traffic signals, e.g., some OFDM tone-symbols carrying the traffic are scaled at a first power level and others are scaled at a second power level, and the rate information is communicated by which positions are scaled at which levels.

Peer to peer mobile device 2 304 receives traffic signals 322 during traffic interval 330 and recovers the data being communicated. In some embodiments, rate information is also communicated with the traffic data. In some such embodiments, peer to peer mobile device 2 304 recovers the communicated rate information being communicated, and then decodes the traffic data signals. The peer to peer mobile device 2 304 determines whether or not the communicated data of the traffic signals 322 has been successfully recovered and generates a positive or negative acknowledgement signal.

During acknowledgment interval 332, the peer to peer mobile device 2 304 transmits the generated ACK signal 324 to mobile peer to peer device 1 302. Peer to peer mobile device 1 302 receives the ACK signal 324, and updates transmission queue information based on the information conveyed by ACK signal 324.

Note that if peer to peer mobile device 1 302 does not receive an RX echo signal 316 in the final round, e.g., round 3, or subsequently decides not to proceed with transmission, the device 302 does not transmit pilot signal 318 and can terminate operation with regard to this traffic slot. Similarly, if peer to peer mobile device 304 decides not to proceed with transmission in the final round, e.g., round 3, after it receives the round 3 request signal 314, the mobile device 304 does not transmit an RX echo signal 316 and can terminate operation with regard to this traffic slot.

The process is repeated for additional traffic slots, e.g., as a function of traffic transmission needs of peer to peer mobile device 1 302.

Figure 4:
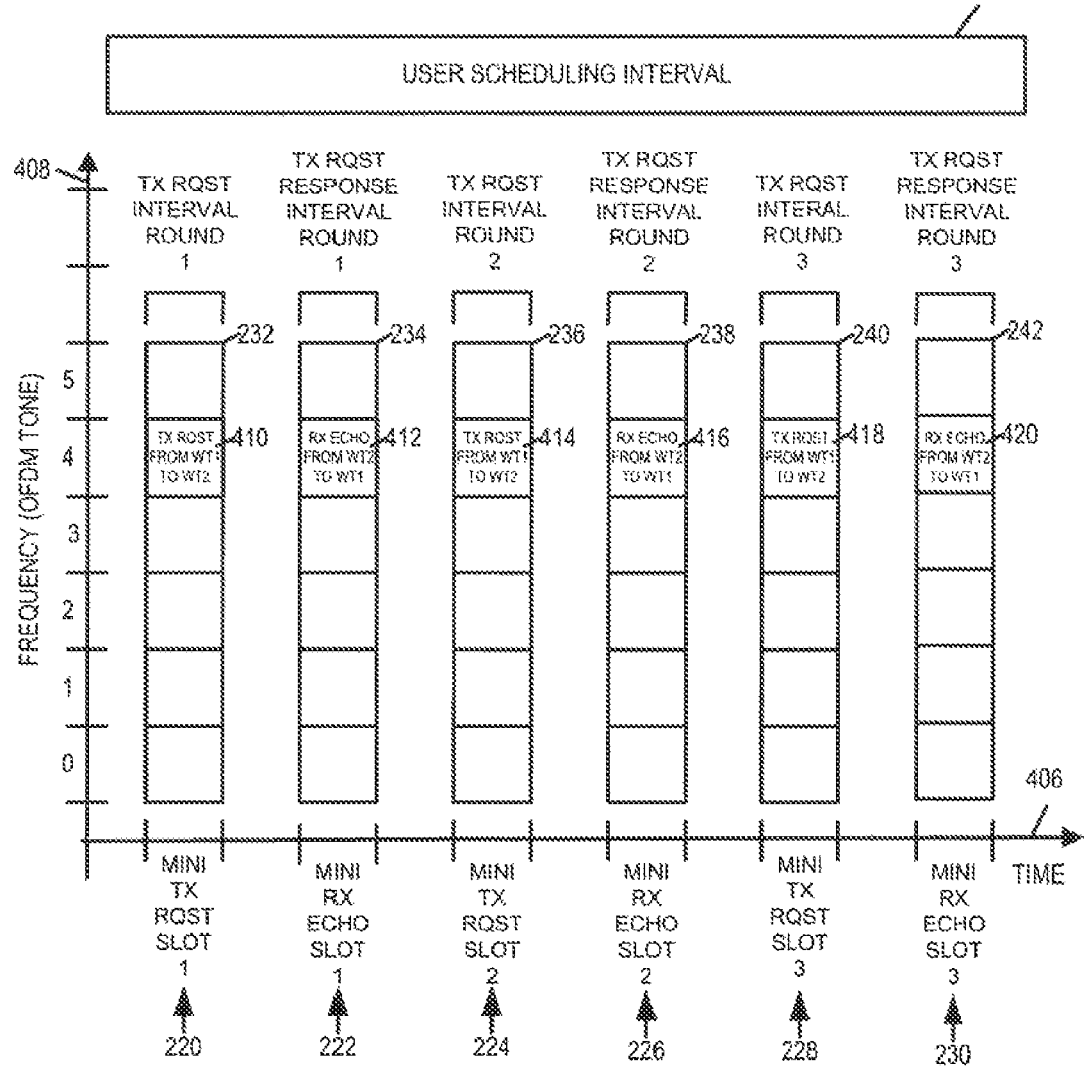
FIG. 4 is a drawing illustrating an exemplary user scheduling interval in a peer to peer recurring timing structure and an exemplary partition of air link resources of the user scheduling portion.

FIG. 4 is a drawing 400 illustrating an exemplary user scheduling interval 212 in a peer to peer recurring timing structure and an exemplary partition of air link resources of the user scheduling portion. The exemplary user scheduling interval 212 includes: (i) transmission request interval 1 for round 1 220 otherwise referred to as mini TX request slot 1; (ii) transmission request response interval for round 1 222 otherwise referred to as mini RX echo slot 1; (iii) transmission request interval for round 2 224 otherwise referred to as mini TX request slot 2; (iv) transmission request response interval for round 2 226 otherwise referred to as mini RX echo slot 2; (v) transmission request interval for round 3 228 otherwise referred to as mini TX request slot 3; (iv) transmission request response interval for round 3 230 otherwise referred to as mini RX echo slot 3.

Intervals (220, 224, 228) are designated to carry transmission request signals (TX request signals) while intervals (222, 226, 230) are designated to carry transmission request response signals (RX echo signals).

Horizontal axis 406 represents time corresponding to blocks, while vertical axis 408 represents frequency, e.g., OFDM tones. OFDM symbol 232 carries transmission request signals for first round requests for connections mapped into a position in the first transmission request interval 220. OFDM symbol 234 carries first round transmission request response signals for connections mapped into a position in the first transmission request response interval 222. OFDM symbol 236 carries transmission request signals for second round requests for connections mapped into a position in the second transmission request interval 224. OFDM symbol 238 carries transmission request response signals for second round request responses for connections mapped into a position in the second transmission request response interval 226. OFDM symbol 240 carries transmission request signals for third round requests for connections mapped into a position in the third transmission request interval 228. OFDM symbol 242 carries transmission request response signals for third round request responses for connections mapped into a position in the third transmission request response interval 230.

In this example, the position designated to carry a first round transmission request from WT 1 to WT 2 for transmission in traffic interval 216 of peer to peer traffic signals from wireless terminal 1 to wireless terminal 2 is designated as OFDM tone-symbol 410 of OFDM symbol 232, which corresponds to tone with index number=4 in transmission request interval for round 1 220. In this example, the position designated to carry a first round transmission request response signal, e.g., an RX echo signal, from WT 2 to WT 1 is designated as OFDM tone-symbol 412 of OFDM symbol 234, which corresponds to tone with index number=4 in transmission request response interval for round 1 222.

In this example, the position designated to carry a second round transmission request from WT 1 to WT 2 for transmission in traffic interval 216 of peer to peer traffic signals from wireless terminal 1 to wireless terminal 2 is designated as OFDM tone-symbol 414 of OFDM symbol 236, which corresponds to tone with index number=4 in transmission request interval for round 2 224. In this example, the position designated to carry a second round transmission request response signal, e.g., an RX echo signal, from WT 2 to WT 1 is designated as OFDM tone-symbol 416 of OFDM symbol 238, which corresponds to tone with index number=4 in transmission request response interval for round 2 226.

In this example, the position designated to carry a third round transmission request from WT 1 to WT 2 for transmission in traffic interval 216 of peer to peer traffic signals from wireless terminal 1 to wireless terminal 2 is designated as OFDM tone-symbol 418 of OFDM symbol 240, which corresponds to tone with index number=4 in transmission request interval for round 3 228. In this example, the position designated to carry a third round transmission request response signal, e.g., an RX echo signal, from WT 2 to WT 1 is designated as OFDM tone-symbol 420 of OFDM symbol 242, which corresponds to tone with index number=4 in transmission request response interval for round 3 230.

Wireless terminal 1, when it has traffic data that it would like to transmit to WT 2, when deciding whether or not to transmit a transmission request signal in tone-symbol 414 considers higher priority transmission request response signals corresponding to other connections which have been detected, e.g., request response signals detected during TX request response interval for round 1 222. Wireless terminal 1, when it has traffic data that it would like to transmit to WT 2, when deciding whether or not to transmit a transmission request signal in tone-symbol 418 considers higher priority transmission request response signals corresponding to other connections which have been detected, e.g., request response signals detected during TX request response interval for round 2 226.

Wireless terminal 2, when it has received a transmission request signal from WT 1 data in tone-symbol 410 indicating that WT 1 would like to transmit to WT 2, when deciding whether or not to transmit a transmission request response signal in tone-symbol 412 considers higher priority transmission request signals corresponding to other connections which have been detected, e.g., request signals detected during TX request interval for round 1 220. Wireless terminal 2, when it has received a transmission request signal from WT 1 data in tone-symbol 414 indicating that WT 1 would like to transmit to WT 2, when deciding whether or not to transmit a transmission request response signal in tone-symbol 416 considers higher priority transmission request signals corresponding to other connections which have been detected, e.g., request signals detected during TX request interval for round 2 224. Wireless terminal 2, when it has received a transmission request signal from WT 1 data in tone-symbol 418 indicating that WT 1 would like to transmit to WT 2, when deciding whether or not to transmit a transmission request response signal in tone-symbol 420 considers higher priority transmission request signals corresponding to other connections which have been detected, e.g., request signals detected during TX request interval for round 3 228.

Figure 5:
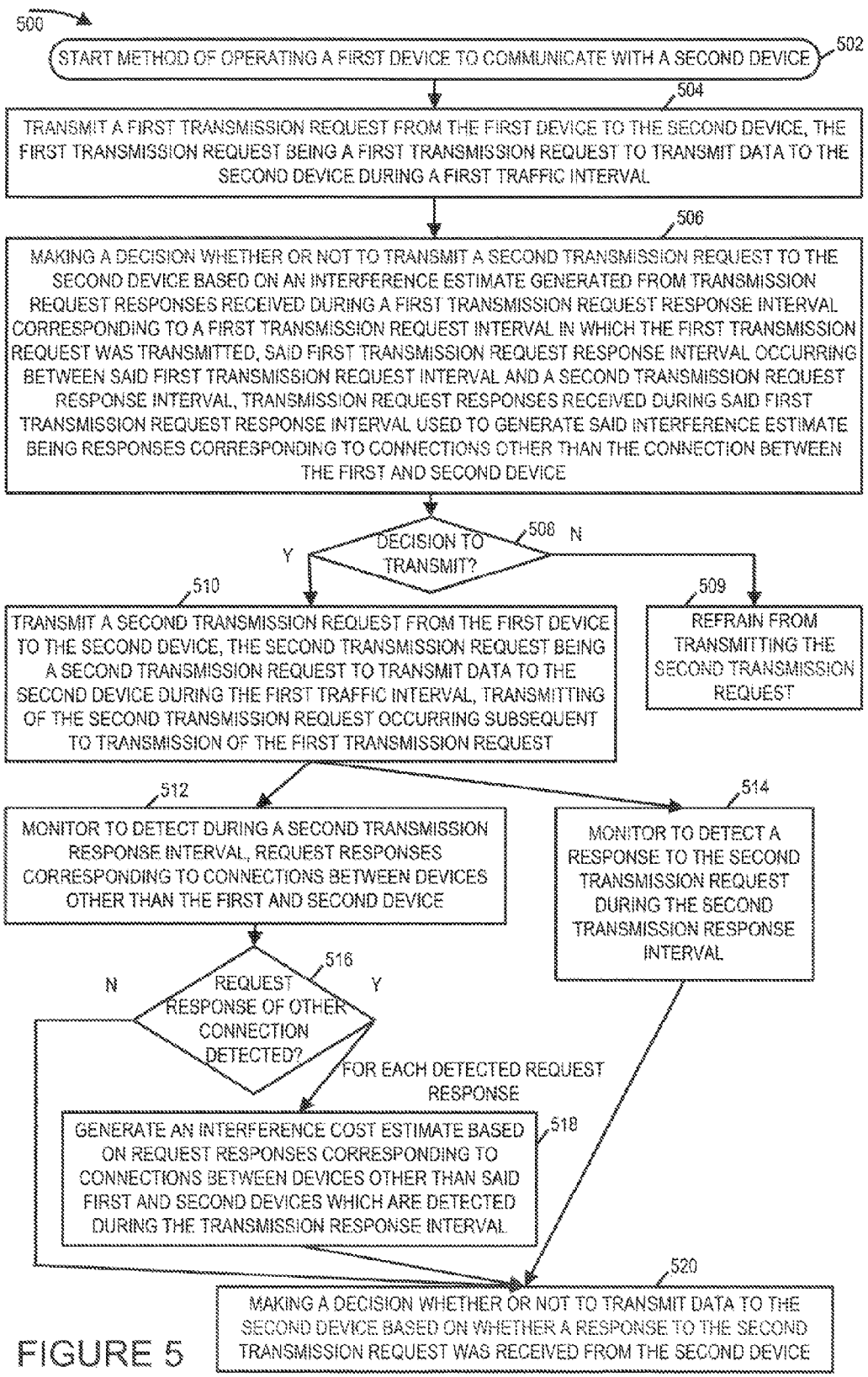
FIG. 5 is a flowchart of an exemplary method of operating a first device to communicate with a second device in accordance with various embodiments.

FIG. 5 is a flowchart 500 of an exemplary method of operating a first device to communicate with a second device in accordance with various embodiments. The first and second devices are, e.g., peer to peer wireless communications devices having an existing connection. In various embodiments, the first and second devices are using a timing structure including multiple transmission request/transmission request response rounds corresponding to a traffic interval.

Operation of the exemplary method starts in step 502 and proceeds to step 504, in which the first device transmits a first transmission request from to the second device, the first transmission request being a first transmission request to transmit data to the second device during a first traffic interval. Operation proceeds from step 504 to step 506.

In step 506, the first device makes a decision whether or not to transmit a second transmission request to the second device based on an interference estimate generated from transmission request responses received during a first transmission request response interval corresponding to a first transmission request interval in which the first transmission request was transmitted, said first transmission request response interval occurring between the first transmission request interval and a second transmission request response interval, transmission request responses received during said first transmission request response interval used to generate said interference estimate being responses corresponding to connection other than said connection between the first and second device. Operation proceeds from step 506 to step 508.

In step 508, the first device proceeds as a function of the decision of step 506. If the decision is a decision not to transmit a second transmission request, then operation proceeds from step 508 to step 509, where the first device refrains from transmitting the second transmission request to the second device. If the decision is a decision to transmit a second transmission request, then operation proceeds from step 508 to step 510. In step 510, the first device transmits a second transmission request from the first device to the second device, the second transmission request being a second transmission request to transmit data to the second device during the first traffic interval, transmission of the second transmission request occurring subsequent to the transmission of the first transmission request. Operation proceeds from step 510 to steps 512 and 514.

In step 512, the first device monitors to detect during a second transmission request response interval, request responses corresponding to connections between devices other than said first and second device. Operation proceeds from step 512 to step 516. In step 516, the first device proceeds as a function of whether or not one or more request responses of other connections were detected in the monitoring of step 512. If a request response of an other connection was detected in step 512, then operation proceeds from step 516 to step 518 for each detected request response of an other connection which has been detected.

In step 518 the first device generates an interference cost estimate based on request responses corresponding to connections between devices other than said first and second device which are detected during the transmission request response interval. For example, a generated interference cost estimate is an estimate of the amount of interference from the first device that the receiver of the second connection is expected to experience if the first device transmits data to the second device in the traffic interval. Operation proceeds from step 518 to step 520. If the first device did not detect request responses of other connection in the monitoring of step 512, then operation proceeds from step 516 to step 520, and the first device considers that there is no interference cost or a negligible interference cost to other devices. For example, no other peer to peer devices in the local vicinity may have transmitted request response signals, e.g., RX echo signals, in the second transmission request response interval.

Returning to step 514, in step 514, the first device monitors to detect a response, e.g., an RX echo signal, to the second transmission request during the second transmission request response interval. Operation proceeds from step 514 to step 520.

In step 520, the first device makes a decision whether or not to transmit data to the second device based on whether a response to the second transmission request was received from the second device. At times, the first device when making a decision, whether or not to transmit data also utilizes interference cost estimate information. For example, if the first device has not received a request response signal from the second device in step 514, then in step 520, the first device decides not to transmit data to the second device. If the first device has received a request response signal from the second device in step 514 and has not received any request responses in step 512, then the first device decides to transmit data to the second device. If the first device has received a request response from the second device in step 514 and the first device has received at least one request response in step 512, then the first device conditionally transmits data to the second device. The condition is based upon the generated interference cost estimate or estimates of step 518. If a cost estimate of step 518 is above a threshold then the first device decided not to transmit to the second device. If the cost estimate or estimates of step 518 are each below the threshold then, the first device decides to transmit data to the second device. Thus, at times, making a decision whether of not to transmit in step 520 includes comparing an interference cost estimate to a transmission determination threshold.

Figure 6:
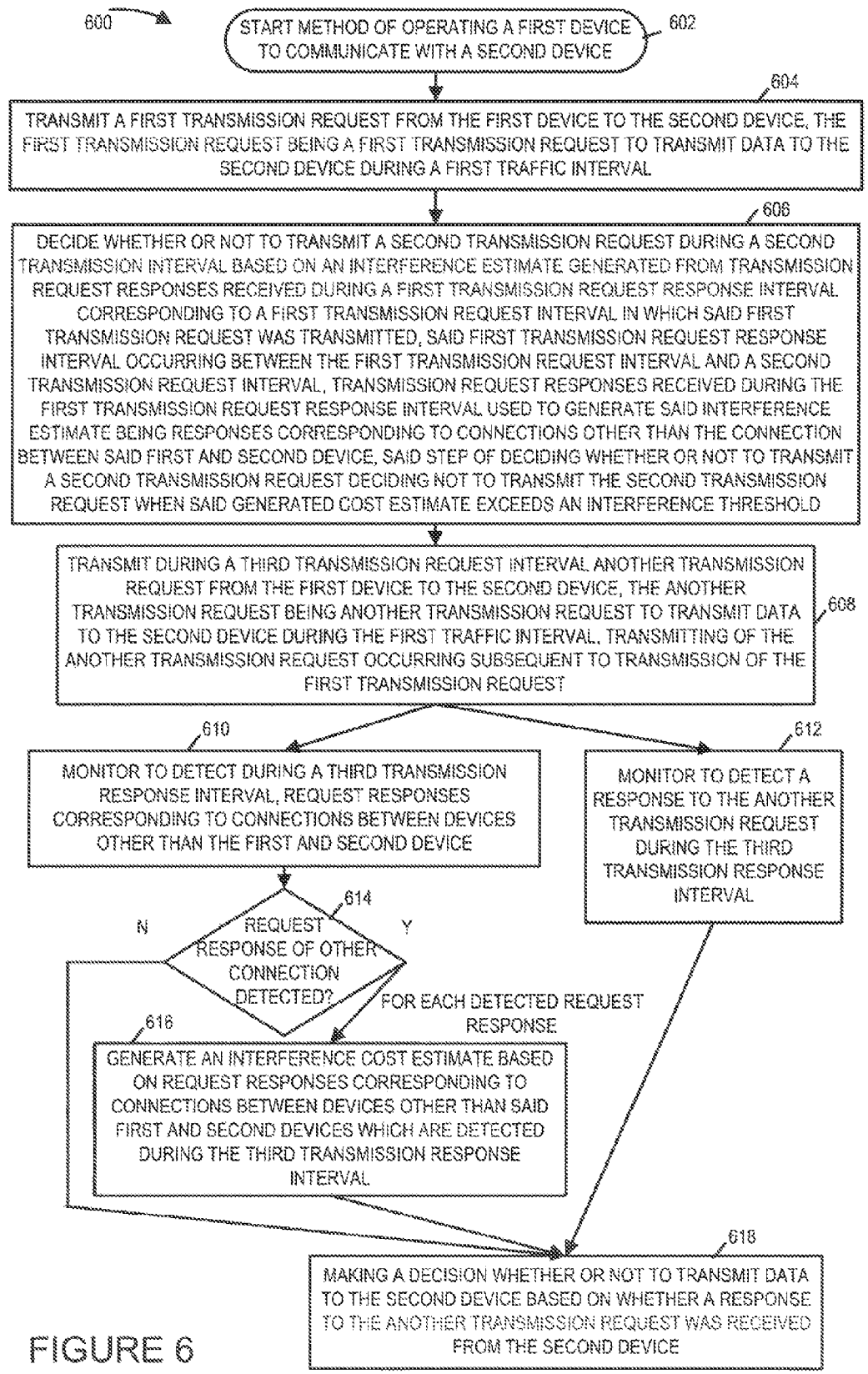
FIG. 6 is a flowchart of an exemplary method of operating a first device to communicate with a second device in accordance with various embodiments.

FIG. 6 is a flowchart 600 of an exemplary method of operating a first device to communicate with a second device in accordance with various embodiments. The first and second devices are, e.g., peer to peer wireless communications devices having an existing connection. In various embodiments, the first and second devices are using a timing structure including multiple transmission request/transmission request response rounds, e.g. three or more rounds, corresponding to a traffic interval. For example, the timing structure includes a first transmission request interval, a first transmission request response interval, a second transmission request interval, a second transmission request response interval, a third transmission request interval, a third transmission request response interval, and a corresponding traffic interval, which occur in time order as listed. In some such embodiments, corresponding to the first connection between the first and second devices, there is an air link resource, e.g., an OFDM tone-symbol, allocated for the connection in each of the first transmission request interval, first transmission request response interval, second transmission request interval, second transmission request response interval, third transmission request interval, third transmission request response interval.

Operation of the exemplary method starts in step 602 and proceeds to step 604, in which the first device transmits a first transmission request from the first device to the second device, the first transmission request being a first transmission request to transmit data to the second device during a first traffic interval. Operation proceeds from step 604 to step 606.

In step 606, the first device decides whether or not to transmit a second transmission request during a second transmission interval based on an interference estimate generated from interference request responses received during a first transmission request response interval corresponding to a first transmission request interval in which said first transmission request was transmitted, said first transmission request response interval occurring between said first transmission request interval and a second transmission request interval, transmission request responses received during the first transmission request response interval used to generate said interference estimate being responses corresponding to connection other than said connection between said first and second deice, said step of deciding whether or not to transmit a second transmission request deciding not to transmit the second transmission request when said generated cost estimate exceeds an interference threshold. Operation proceeds from step 606 to step 608.

In step 608, the first device transmits during a third transmission request interval another transmission request from the first device to the second device, the another transmission request being another transmission request to transmit data to the second device during the first traffic interval, transmitting of the another transmission request being another transmission request to transmit data to the second device during the first traffic interval, transmitting of the another transmission request occurring subsequent to transmission of the first transmission request. Operation proceeds from step 608 to steps 610 and 612.

In step 610, the first device monitors to detect during a third transmission request response interval, request responses corresponding to connections between devices other than said first and second device. Operation proceeds from step 610 to step 614. In step 614, the first device proceeds as a function of whether or not one or more request responses of other connections were detected in the monitoring of step 610. If a request response of an other connection was detected in step 610, then operation proceeds from step 614 to step 616 for each detected request response of an other connection which has been detected.

In step 616 the first device generates an interference cost estimate based on request responses corresponding to connections between devices other than said first and second device which are detected during the third transmission request response interval. For example, a generated interference cost estimate is an estimate of the amount of interference from the first device that the receiver of another connection is expected to experience if the first device transmits data to the second device in the traffic interval. Operation proceeds from step 616 to step 620. If the first device did not detect request responses of other connection in the monitoring of step 612, then operation proceeds from step 614 to step 618, and the first device considers that there is no interference cost or a negligible interference cost to other devices. For example, no other peer to peer devices in the local vicinity may have transmitted request response signals, e.g., RX echo signals, in the second transmission request response interval.

Returning to step 612, in step 612, the first device monitors to detect a response, e.g., an RX echo signal, to the another transmission request of step 608 during the third transmission request response interval. Operation proceeds from step 612 to step 618.

In step 618, the first device decides whether or not to transmit data to the second device based on whether a response to the another transmission request of step 608 was received from the second device. At times, the first device when making a decision, whether or not to transmit data also utilizes interference cost estimate information. For example, if the first device has not received a request response signal from the second device in step 612, then in step 618, the first device decides not to transmit data to the second device. If the first device has received a request response signal from the second device in step 612 and has not received any request responses in step 610, then the first device decides to transmit data to the second device. If the first device has received a request response from the second device in step 612 and the first device has received at least one request response in step 610, then the first device conditionally transmits data to the second device. The condition is based upon the generated interference cost estimate or estimates of step 616. If a cost estimate of step 616 is above a threshold then the first device decided not to transmit to the second device. If the cost estimate or estimates of step 618 are each below the threshold then, the first device decides to transmit data to the second device. Thus, at times, making a decision whether of not to transmit in step 618 includes comparing an interference cost estimate to a transmission determination threshold.

Figures 7, 7A, 7B:
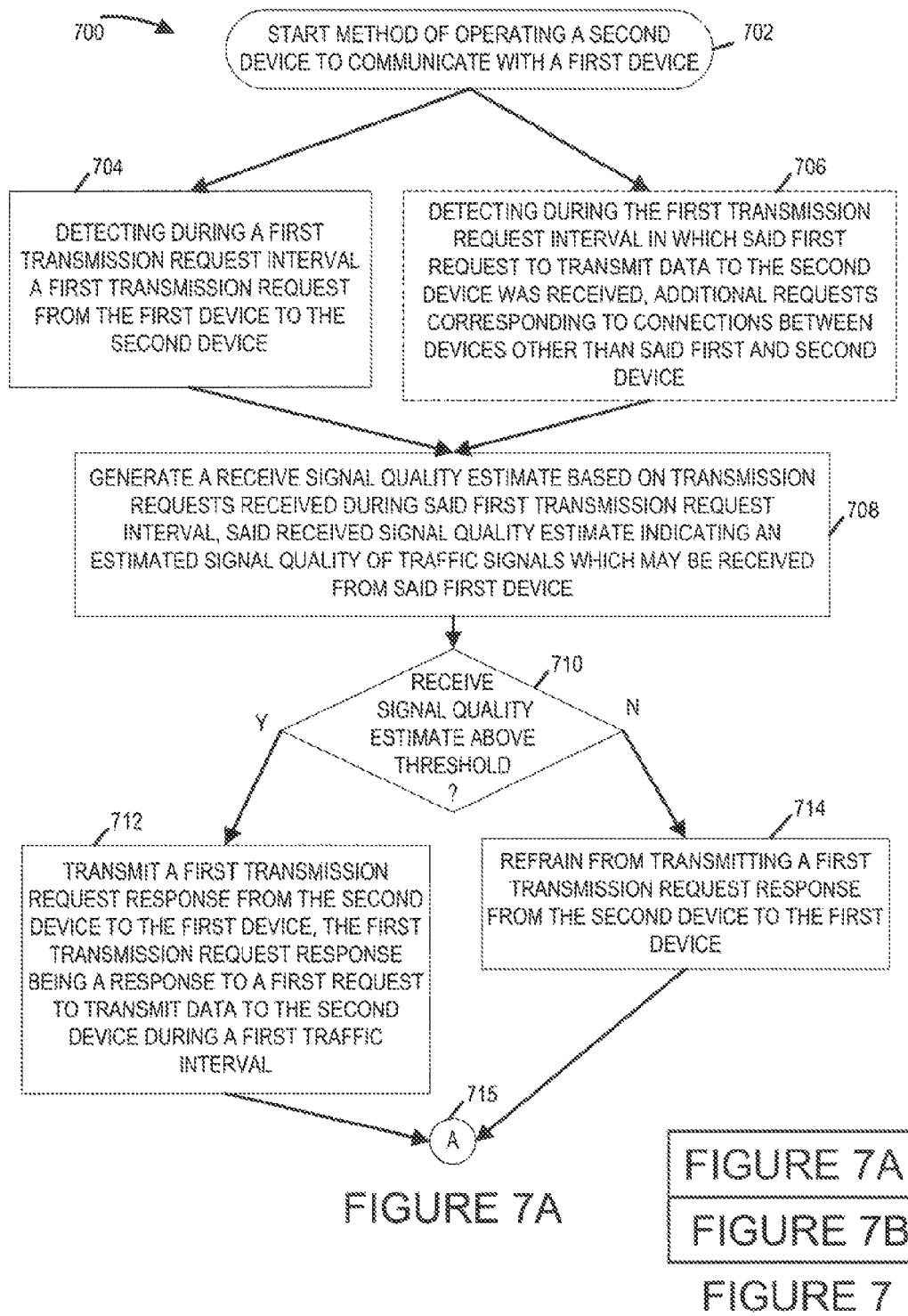
FIG. 7 comprising the combination of FIG. 7A
FIG. 7B is a flowchart of an exemplary method of operating a second communications device to communicate with a first communications device.
Figure 7B:
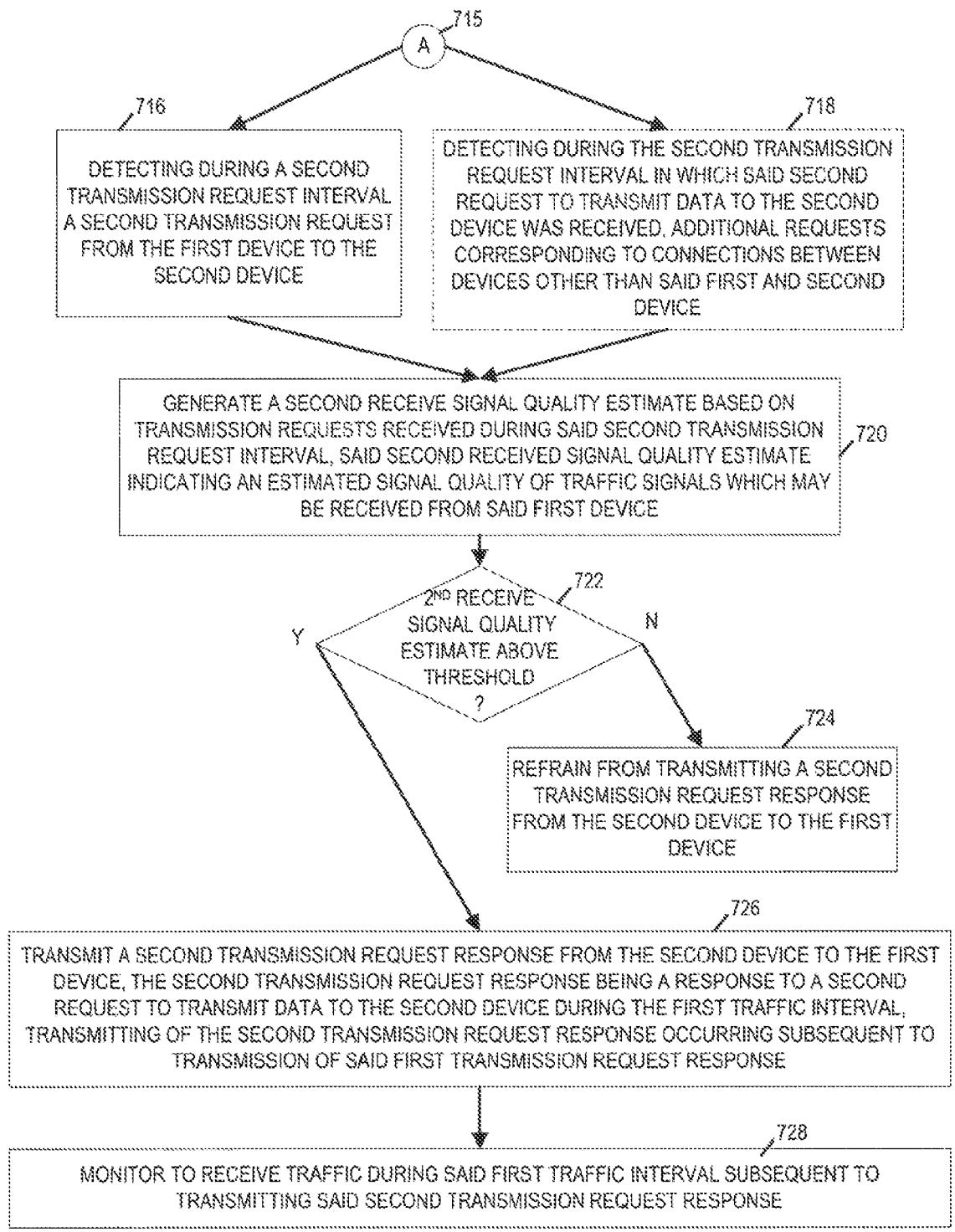

FIG. 7 comprising the combination of FIG. 7A and FIG. 7B is a flowchart 700 of an exemplary method of operating a second communications device to communicate with a first communications device. The first and second devices are, e.g., peer to peer wireless communications devices having an existing connection. In various embodiments, the first and second devices are using a timing structure including multiple transmission request/transmission request response rounds corresponding to a traffic interval.

Operation of the exemplary method starts in step 702 and proceeds to step 704, and at times to step 706. In step 704, the second device detects during a first transmission request interval a first transmission request from the first device to the second device. In step 706, the second device detects during the first transmission request interval in which said first transmission request to transmit data to the second device was received, additional requests corresponding to connection between other devices other than said first and second device. Operation proceeds from step 704, and, at times, from step 706 to step 708.

In step 708, the second device generates a receive signal quality estimate based on transmission requests received during the first transmission request interval, said received signal quality estimate indicating an estimated signal quality of traffic signals which may be received from said first device. In various embodiments, the generated received signal quality estimate is one of a signal to noise ratio and a signal to interference ratio. Operation proceeds from step 708 to step 710.

In step 710 the second device determines whether or not the generated received signal quality estimate is above a threshold and proceeds as a function of the determination. If the receive signal quality estimate is above the threshold, then operation proceeds from step 710 to step 712. However, if the receive signal quality estimate is not above a threshold, then operation proceeds to step 714.

Returning to step 712, in step 712, the second device transmits a first transmission request response from the second device to the first device, the first transmission request response, e.g., an RX echo signal, being a response to a first request to transmit data to the second device during a first traffic interval. Operation proceeds from step 712 to connecting node A 715.

Returning to step 714, in step 714 the second device is controlled to refrain from transmitting a first transmission request response from the second device to the first device. Operation proceeds from step 714 to connecting node A 715.

Operation proceeds from connecting node A 715 to step 716 and, at times, to step 718. In step 716, the second device detects during a second transmission request interval a second transmission request from the first device to the second device. In step 718, the second device detects during the second transmission request interval in which said second request to transmit data to the second device was received, additional requests corresponding to connections between devices other than said connection between said first and second device.

Operation proceeds from step 716 and, at times, from step 718 to step 720. In step 720, the second device generates a second receive signal quality estimate based on transmission requests received during said second transmission request interval, said second received signal quality estimate indicating an estimated signal quality of traffic signal which may be received by said first device. In various embodiments, the generated second received signal quality estimate is one of a signal to noise ratio and a signal to interference ratio. Operation proceeds from step 720 to step 722.

In step 722, the second device determines whether or not the generated second receive signal quality estimate is above a threshold. If the $2^{nd}$ receive signal quality estimate is not above the threshold, then operation proceeds from step 722 to step 724, where the second device is controlled to refrain from transmitting a second transmission request response from the second device to the first device. However, if the generated second receive signal quality estimate is above the threshold, then operation proceeds from step 722 to step 726.

In step 726, the second device transmits a second transmission request response from the second device to the first device, the second transmission request response being a response to a second request to transmit data to the second device during a first traffic interval. The transmitting of the second transmission request response of step 726 occurs subsequent to the transmitting of the first transmission request response of step 712. Operation proceeds from step 726 to step 728. In step 728, the second device monitors to receive traffic during the first traffic interval which is subsequent to transmitting of the second transmission request response.

Figures 8, 8A:
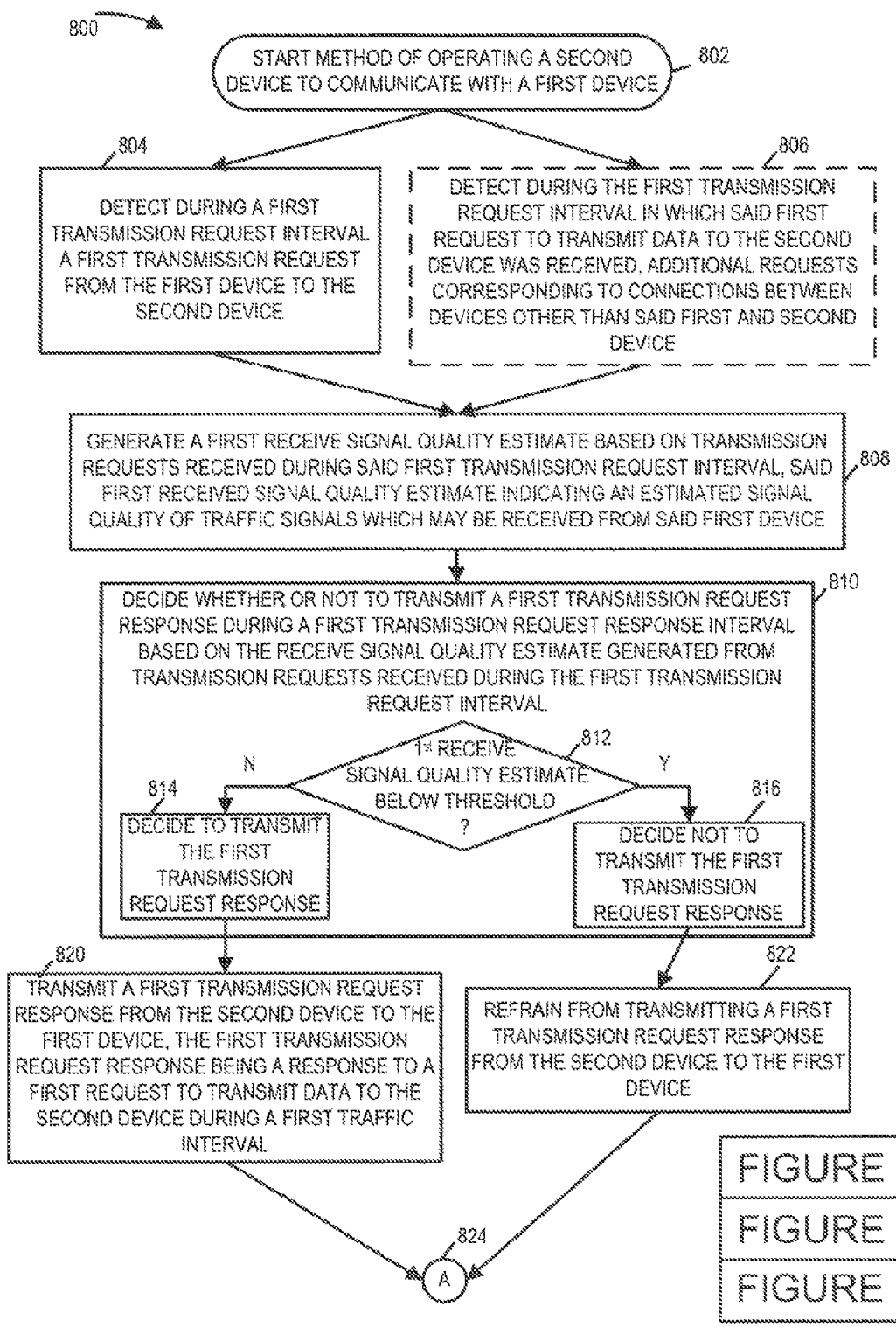
FIG. 8 comprising the combination of FIG. 8A, FIG. 8B
Figure 8B:
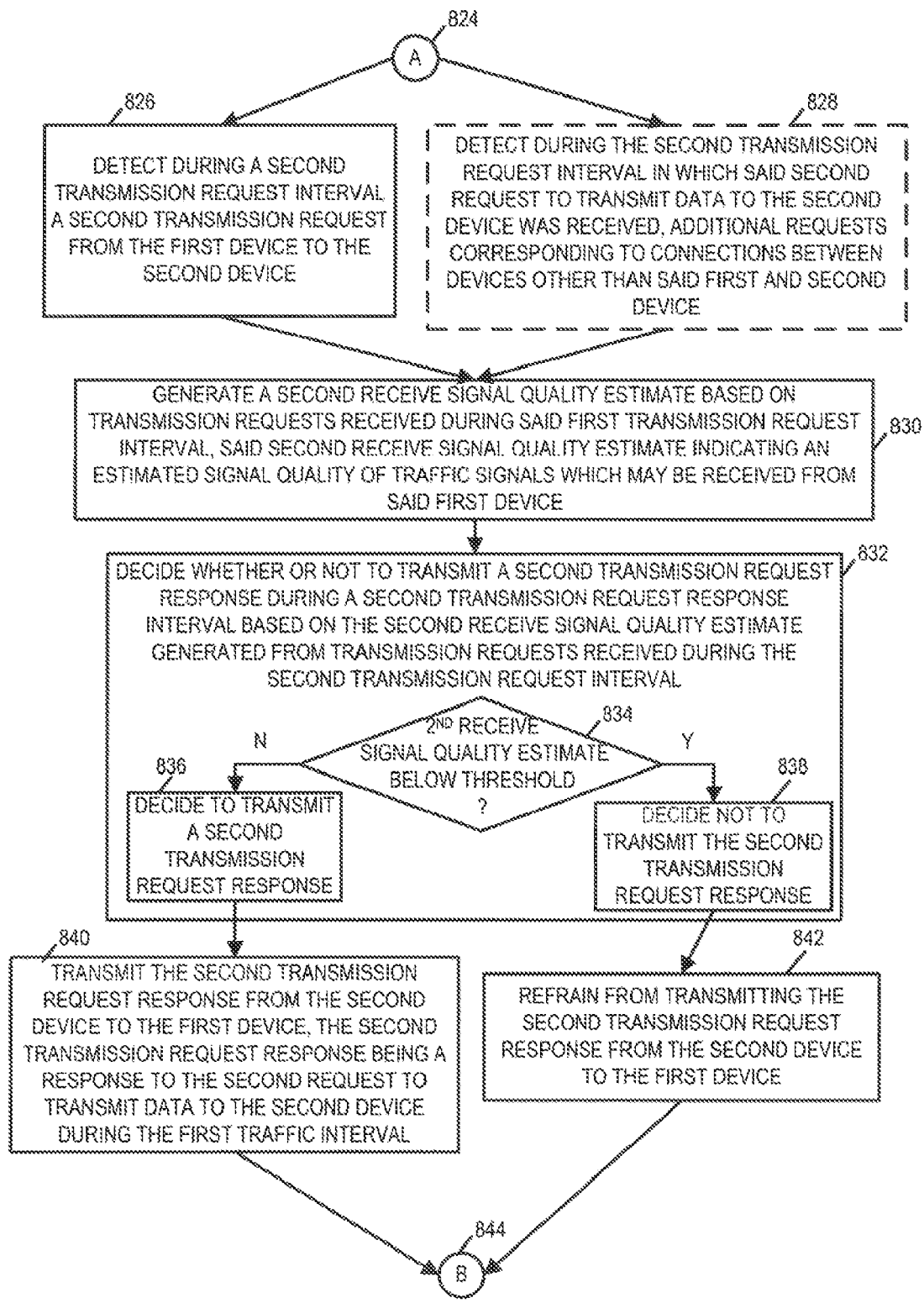
FIG. 8C is a flowchart of an exemplary method of operating a second communications device to communicate with a first communications device.
Figure 8C:
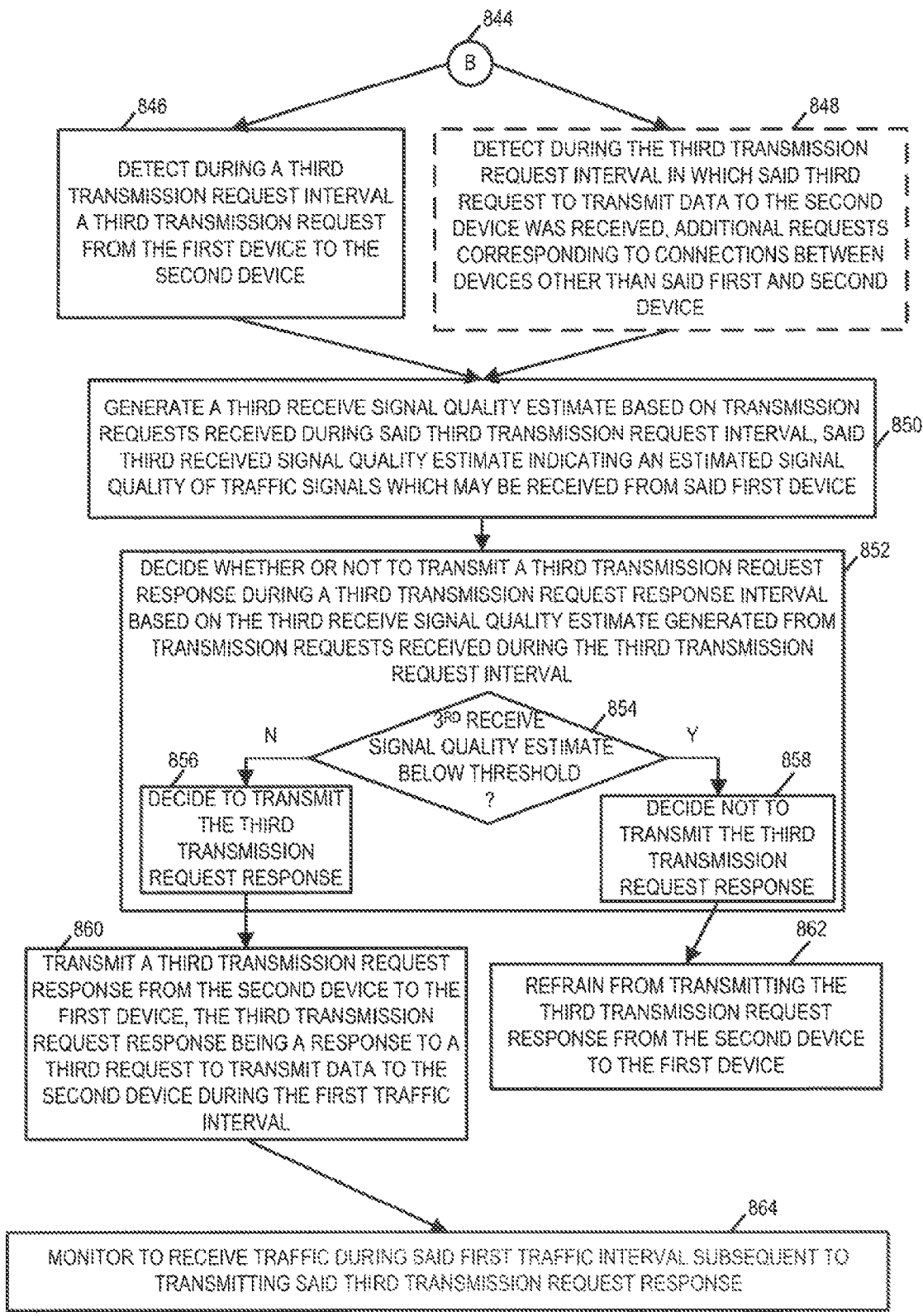

FIG. 8 comprising the combination of FIG. 8A, FIG. 8B and FIG. 8C is a flowchart 800 of an exemplary method of operating a second communications device to communicate with a first communications device. The first and second devices are, e.g., peer to peer wireless communications devices having an existing connection. In various embodiments, the first and second devices are using a timing structure including multiple transmission request/transmission request response rounds corresponding to a traffic interval, e.g., three transmission request/transmission request response rounds corresponding to a traffic interval.

Operation of the exemplary method starts in step 802 and proceeds to step 804, and at times to step 806. In step 804, the second device detects during a first transmission request interval a first transmission request from the first device to the second device. In step 806, the second device detects during the first transmission request interval in which said first transmission request to transmit data to the second device was received, additional requests corresponding to connection between other devices other than said first and second device. Operation proceeds from step 804, and, at times, from step 806 to step 808.

In step 808, the second device generates a first receive signal quality estimate based on transmission requests received during the first transmission request interval, said first received signal quality estimate indicating an estimated signal quality of traffic signals which may be received from said first device. In various embodiments, the generated first received signal quality estimate is one of a signal to noise ratio and a signal to interference ratio. Operation proceeds from step 808 to step 810.

In step 810 the second device decides whether or not to transmit a first transmission request response during the first transmission request response interval based on the first received signal quality estimate generated from transmission requests received during the first transmission request interval. Step 810 includes sub-steps 812, 814 and 816. In sub-step 812, the second device determines if the generated $1^{st}$ receive signal quality estimate is below a threshold. If the generated first received signal quality estimate is below the threshold, then operation proceeds from sub-step 812 to sub-step 816, in which the second device decides not to transmit the first transmission request response. However, if the generated first received signal quality estimate is not below the threshold, then operation proceeds from sub-step 812 to sub-step 814 in which the second device decides to transmit the first transmission request response.

Operation proceeds from sub-step 814 to step 820, in which the second device transmits a first transmission request response from the second device to the first device, the first transmission request response being a response to a first request to transmit data to the second device during a first traffic interval. Operation proceeds from step 820 to connecting node A 824.

Returning to sub-step 816, operation proceeds from sub-step 816 to step 822. In step 822, the second device is operated to refrain from transmitting a first transmission request response from the second device to the first device. Operation proceeds from step 822 to connecting node A 824.

Operation proceeds from connecting node A 824 to step 826, and at times to step 828. In step 826, the second device detects during a second transmission request interval a second transmission request from the first device to the second device. In step 828, the second device detects during the second transmission request interval in which said second transmission request to transmit data to the second device was received, additional requests corresponding to connection between other devices other than said first and second device.

Operation proceeds from step 826, and, at times, from step 828 to step 830.

In step 830, the second device generates a second receive signal quality estimate based on transmission requests received during the second transmission request interval, said second received signal quality estimate indicating an estimated signal quality of traffic signals which may be received from said first device. In various embodiments, the generated second received signal quality estimate is one of a signal to noise ratio and a signal to interference ratio. Operation proceeds from step 830 to step 832.

In step 832 the second device decides whether or not to transmit a second transmission request response during a second transmission request response interval based on the second received signal quality estimate generated from transmission requests received during the second transmission request interval. Step 832 includes sub-steps 834, 836 and 838. In sub-step 834, the second device determines if the generated second received signal quality estimate is below a threshold. If the generated second received signal quality estimate is below the threshold, then operation proceeds from sub-step 834 to sub-step 838, in which the second device decides not to transmit the second transmission request response. However, if the generated second received signal quality estimate is not below the threshold, then operation proceeds from sub-step 834 to sub-step 836 in which the second device decides to transmit the second transmission request response.

Operation proceeds from sub-step 836 to step 840, in which the second device transmits the second transmission request response from the second device to the first device, the second transmission request response being a response to the second request to transmit data to the second device during a first traffic interval. Operation proceeds from step 840 to connecting node B 844.

Returning to sub-step 838, operation proceeds from sub-step 838 to step 842. In step 842, the second device is operated to refrain from transmitting the second transmission request response from the second device to the first device. Operation proceeds from step 842 to connecting node B 844.

Operation proceeds from connecting node B 844 to step 846, and at times to step 848. In step 846, the second device detects during a third transmission request interval a third transmission request from the first device to the second device. In step 848, the second device detects during the third transmission request interval in which said third transmission request to transmit data to the second device was received, additional requests corresponding to connection between other devices other than said first and second device. Operation proceeds from step 846, and, at times, from step 848 to step 850.

In step 850, the second device generates a third receive signal quality estimate based on transmission requests received during the third transmission request interval, said third received signal quality estimate indicating an estimated signal quality of traffic signals which may be received from said first device. In various embodiments, the generated third received signal quality estimate is one of a signal to noise ratio and a signal to interference ratio. Operation proceeds from step 850 to step 852.

In step 852 the third device decides whether or not to transmit a third transmission request response during a third transmission request response interval based on the third received signal quality estimate generated from transmission requests received during the third transmission request interval. Step 852 includes sub-steps 854, 856 and 858. In sub-step 854, the second device determines if the generated second received signal quality estimate is below a threshold. If the generated second received signal quality estimate is below the threshold, then operation proceeds from sub-step 854 to sub-step 858, in which the second device decides not to transmit the third transmission request response. However, if the generated third received signal quality estimate is not below the threshold, then operation proceeds from sub-step 854 to sub-step 856 in which the second device decides to transmit the third transmission request response.

Operation proceeds from sub-step 856 to step 860, in which the second device transmits the third transmission request response from the second device to the first device, the third transmission request response being a response to the third request to transmit data to the second device during the first traffic interval. Operation proceeds from step 860 to step 864. In step 864, the second device monitors to receive traffic during the first traffic interval subsequent to transmitting said third transmission request response.

Returning to sub-step 858, operation proceeds from sub-step 858 to step 862. In step 862, the third device is operated to refrain from transmitting the third transmission request response from the second device to the first device.

Figure 9:
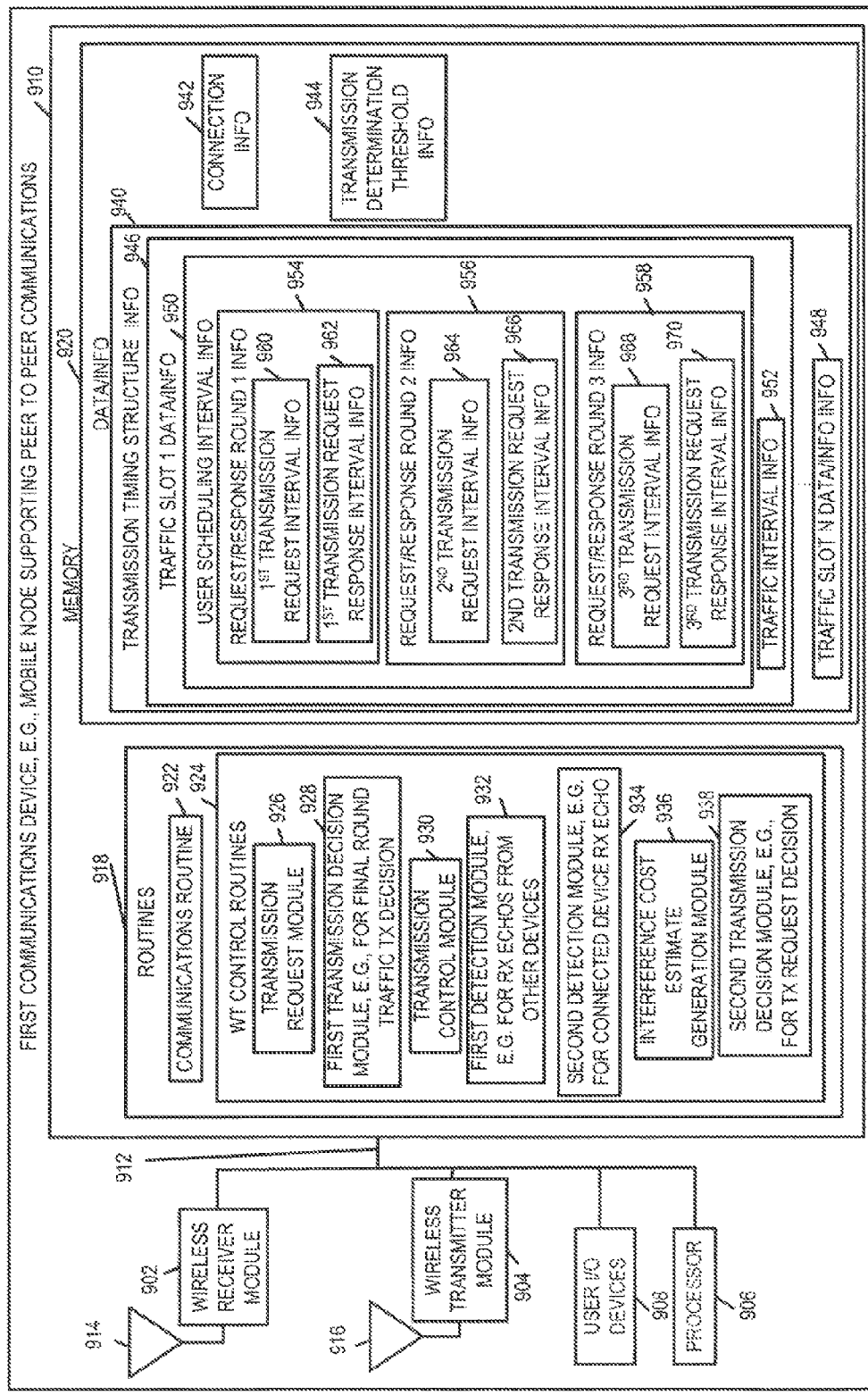
FIG. 9 is a drawing of an exemplary first communications device, e.g., a mobile node supporting peer to peer communications, in accordance with various embodiments.

FIG. 9 is a drawing of an exemplary first communications device 900, e.g., a mobile node supporting peer to peer communications, in accordance with various embodiments. Exemplary first communications device 900 has, at times, a connection, e.g., a peer to peer connection, with a second communications device. Exemplary first communications device 900 includes a wireless receiver module 902, a wireless transmitter module 904, user I/O devices 908, a processor 906 and a memory 910 coupled together via a bus 912 over which the various elements may interchange data and information.

Memory 910 includes routines 918 and data/information 920. The processor 906, e.g., a CPU, executes the routines 918 and uses the data/information 920 in memory 910 to control the operation of the first communications device 900 and implement methods, e.g., the method of flowchart 500 of FIG. 5 or the method of flowchart 600 of FIG. 6.

Wireless receiver module 902, e.g., an OFDM receiver, is coupled to receive antenna 914, via which the communications device receives signals from other devices. Received signals include, e.g., transmission request response signals from a second communications device with which the first communications device 900 has a connection and transmission request response signals from other communications device with which the first communications device 900 does not have a connection.

Wireless transmitter module 904, e.g., an OFDM transmitter, is coupled to transmit antenna 916 via which the first communications device transmits signals, e.g., transmission request signals intended for a second communications device with which the first device has a connection and peer to peer traffic signals intended for a second device with which the first device has a connection. In some embodiments, the same antenna is used for both receiver and transmitter. Wireless transmitter module 904 transmits generated transmission request, e.g., a generated first and second transmission request to a second device with which the first device 900 has a connection, the generated transmission requests being requests to transmit traffic data to the second device during a traffic interval.

User I/O device 908 include, e.g., a microphone, a keyboard, a keypad, switches, a camera, a mouse, a speaker, a display, etc. User I/O devices 908 allow a user of first communications device 900 to input data/information, access output data/information, and control at least some functions of the first communications device 900.

Routines 918 include a communications routine 922 and wireless terminal control routines 924. The communications routine 922 implements the various communications protocols used by the first communications device 900. The wireless terminal control routines 924 include a transmission request module 926, a first transmission decision module 928, a transmission control module 930, a first detection module 932, a second detection module 934, an interference cost estimate generation module 936 and a second transmission decision module 938.

Data/information 920 includes transmission timing structure information 940, connection information 942, and transmission determination threshold information 944. The transmission timing structure information includes a plurality of sets of traffic slot information, e.g., in accordance with a recurring peer to peer timing structure, (traffic slot 1 data/information 946, ..., traffic slot N data/information 948. Traffic slot 1 data/information 946 includes user scheduling interval information 950 and traffic interval information 952. The traffic slot 1 interval information 950 of the transmission timing structure information 940 includes information indicating the relative timing relationship between three ordered transmission request intervals and three transmission request response intervals which correspond to the traffic interval identified by information 952. In some other embodiments, there a different number of request/response rounds corresponding to a traffic interval, e.g., two rounds or more than 3 rounds. The user scheduling interval information 950 includes request response round 1 information 954, request/response round 2 information 956 and request/response round 3 information 958. Request/response round 1 information 954 includes $1^{st}$ transmission request interval information 960 and $1^{st}$ transmission request response interval information 962. Request/response round 2 information 956 includes $2^{nd}$ transmission request interval information 964 and $2^{nd}$ transmission request response interval information 966. Request/response round 3 information 958 includes $3^{rd}$ transmission request interval information 968 and $3^{rd}$ transmission request response interval information 970.

Connection information 942 includes information identifying device with which said first device 900 has a current connection, e.g., a current peer to peer connection. Connection information 942 also includes information used to identify a set of air link resources associated with a connection, e.g., an OFDM tone-symbol during the $1^{st}$ transmission request interval, an OFDM tone-symbol during the $1^{st}$ transmission request response interval, an OFDM tone-symbol during the $2^{nd}$ transmission request interval, an OFDM tone-symbol during the $2^{nd}$ transmission request response interval, an OFDM tone-symbol during the $3^{rd}$ transmission request interval, and an OFDM tone-symbol during the $3^{rd}$ transmission request response interval used for control signaling related to the connection.

Transmission determination threshold information 944 includes, e.g., a stored threshold used by said first transmission decision module 928 and a stored threshold used by said second transmission decision module 938.

Transmission request module 926 generates transmission requests. For example, generated transmission requests include a first transmission request and a second transmission request from the first device 900 to a second device, the first transmission request being a first request to transmit data to the second device during a first traffic interval and the second transmission request being a second transmission request to transmit data to the second device during the first traffic interval.

Although the first device 900 may desire to transmit traffic signals to the second device in the traffic interval, the first deice 900 does not necessarily transmit a transmission request to the second device in each of the rounds. For example, in one case, the first transmission request is transmitted in the $1^{st}$ transmission request interval identified by information 960 and the second transmission request is transmitted in the $3^{rd}$ transmission request interval identified by information 968.

First transmission decision module 928 determines whether or not to transmit data to a second device with which the first device has a connection, based on whether a response to a transmission request was received from the second device. For example, first transmission decision module 928 makes a traffic data transmission decision following monitoring of the transmission request response interval of the final round, e.g., $3^{rd}$ transmission request response interval identified by information 970. For example, as a function of whether or not a transmission request response was received from the second device in the $3^{rd}$ transmission request response interval identified by information 970, the first device decides whether or not to transmit data to the second device in the traffic interval identified by information 952.

Transmission control module 930 controls the wireless transmitter module 904 to transmit data to the second device when said first transmission decision module 928 determines to transmit data to the second device, e.g., during a traffic interval identified by information 952. Transmission control module 930 also controls the wireless transmitter module to transmit a second transmission request to the second device when the second transmission decision module 938 determines that an additional transmission request should be transmitted to the second device, e.g., during a $3^{rd}$ transmission request interval identified by information 968.

First detection module 932 detects transmission request responses, e.g., RX echo signals, received during a transmission request response interval that correspond to connections between device other than said first device and a second deice with which the first device has a connection. These detected responses identify connections that the first device may cause interference to if the first device transmits traffic signals to the second device in the traffic interval.

Interference cost estimate generation module 936 generates an interference cost estimate based on request responses corresponding to connections other than said connection between said first device and said second device, wherein said first device has a connection with said second device.

Second detection module 934 detects a response to a transmission request transmitted by the first device to a second device with which said first device has a connection. For example, if the first device transmitted a transmission request during $1^{st}$ request transmission interval identified by information 960, the second detection module 934 detects for a request response, e.g., RX echo, from the second device during the $1^{st}$ transmission request response interval identified by information 962. If the first device transmitted a transmission request during $2^{nd}$ request transmission interval identified by information 964, the second detection module 934 detects for a request response, e.g., RX echo, from the second device during the $2^{nd}$ transmission request response interval identified by information 966. If the first device transmitted a transmission request during $3^{rd}$ request transmission interval identified by information 968, the second detection module 934 detects for a request response, e.g., RX echo, from the second device during the 3$^{rd}$ transmission request response interval identified by information 970. When, a response is detected a transmission request by the second detection module 934 in the final request/response round, the first transmission decision module 928 makes a decision whether or not to transmit, wherein making a decision whether or not to transmit includes comparing a generated interference cost estimate to a transmission determination threshold, e.g., a threshold from information 944.

Second transmission decision module 938 determines whether or not to transmit a transmission request based on an interference cost estimate generated by the interference cost estimate generation module. For example, second transmission decision module 938 makes a decision whether or not to transmit a transmission request to the second device in the 2$^{nd}$ transmission request interval identified by information 964 based on an interference cost estimate generated using request response signals detected in the 1$^{st}$ transmission request response interval identified by information 962. Continuing with the example, second transmission decision module 938 makes a decision whether or not to transmit a transmission request to the second device in the 3$^{rd}$ transmission request interval identified by information 968 based on an interference cost estimate generated using request response signals detected in the 2$^{nd}$ transmission request response interval identified by information 966.

Figure 10:
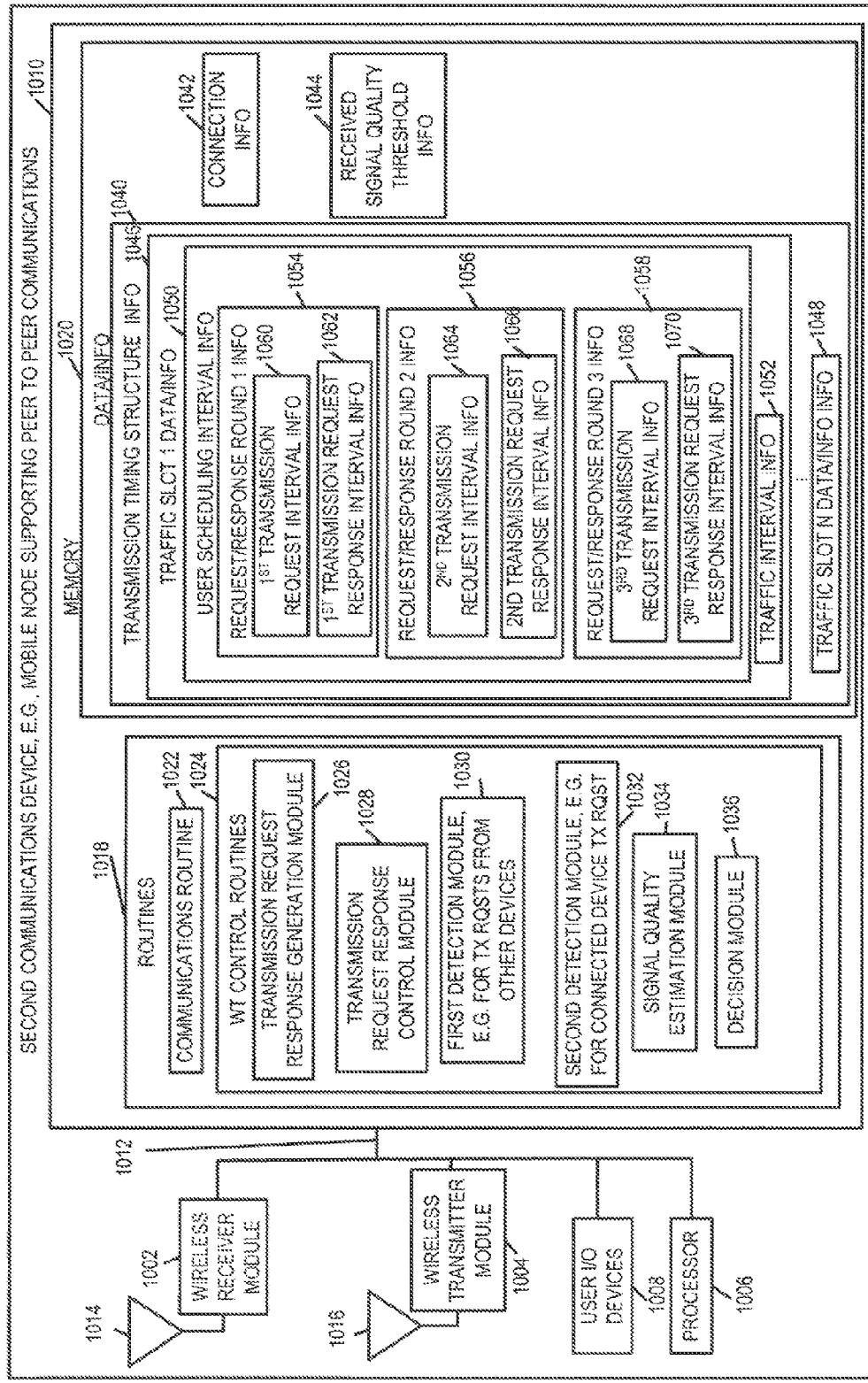
FIG. 10 is a drawing of an exemplary second communications device, e.g., a mobile node supporting peer to peer communications, in accordance with various embodiments.

FIG. 10 is a drawing of an exemplary second communications device 1000, e.g., a mobile node supporting peer to peer communications, in accordance with various embodiments. Exemplary second communications device 1000 has, at times, a connection, e.g., a peer to peer connection, with a first communications device. Exemplary second communications device 1000 includes a wireless receiver module 1002, a wireless transmitter module 1004, user I/O devices 1008, a processor 1006 and a memory 1010 coupled together via a bus 1012 over which the various elements may interchange data and information.

Memory 1010 includes routines 1018 and data/information 1020. The processor 1006, e.g., a CPU, executes the routines 1018 and uses the data/information 1020 in memory 1010 to control the operation of the second communications device 1000 and implement methods, e.g., the method of flowchart 700 of FIG. 7 or the method of flowchart 800 of FIG. 8.

Wireless receiver module 1002, e.g., an OFDM receiver, is coupled to receive antenna 1014, via which the second communications device 1000 receives signals from other devices. Received signals include, e.g., transmission request signals from a first communications device with which the second communications device 1000 has a connection and transmission request signals from other communications device with which the second communications device 1000 does not have a connection. Wireless receiver module 1002 also receives traffic signals from the first communications device, e.g., peer to peer traffic signals. For example, subsequent to the transmission of a request response signal to the first device in the request response interval of the last request/response round, e.g., 3rd transmission request response interval 1070, the wireless receiver module 1002 receives traffic signals in the traffic interval identified by information 1052 from the first device.

Wireless transmitter module 1004, e.g., an OFDM transmitter, is coupled to transmit antenna 1016 via which the second communications device 1000 transmits signals, e.g., transmission request response signals intended for a first communications device with which the second device has a connection. In some embodiments, the same antenna is used for both receiver and transmitter. Wireless transmitter module 1004 transmits generated transmission request response signals, e.g., a generated transmission request response signal to a first device with which the second device 1000 has a connection, the generated transmission request response signal being a positive response to request to transmit traffic data from the first device to the second device during a traffic interval.

User I/O device 1008 include, e.g., a microphone, a keyboard, a keypad, switches, a camera, a mouse, a speaker, a display, etc. User I/O devices 1008 allow a user of second communications device 1000 to input data/information, access output data/information, and control at least some functions of the second communications device 1000.

Routines 1018 include a communications routine 1022 and wireless terminal control routines 1024. The communications routine 1022 implements the various communications protocols used by the second communications device 1000. The wireless terminal control routines 1024 include a transmission request response generation module 1026, a transmission request response control module 1028, a first detection module 1030, a second detection module 1032, a signal quality estimation module 1034 and a decision module 1036.

Data/information 1020 includes transmission timing structure information 1040, connection information 1042, and received signal quality threshold information 1044. The transmission timing structure information 1040 includes a plurality of sets of traffic slot information, e.g., in accordance with a recurring peer to peer timing structure, (traffic slot 1 data/information 1046, . . . , traffic slot N data/information 1048. Traffic slot 1 data/information 1046 includes user scheduling interval information 1050 and traffic interval information 1052. The traffic slot 1 data/information 1046 of the transmission timing structure information 1040 includes information indicating the relative timing relationship between three ordered transmission request intervals and three transmission request response intervals which correspond to the traffic interval identified by information 1052. In some other embodiments, there a different number of request/response rounds corresponding to a traffic interval, e.g., two rounds or more than 3 rounds. The user scheduling interval information 1050 includes request/response round 1 information 1054, request/response round 2 information 1056 and request/response round 3 information 1058. Request/response round 1 information 1054 includes 1$^{st}$ transmission request interval information 1060 and 1$^{st}$ transmission request response interval information 1062. Request/response round 2 information 1056 includes 2$^{nd}$ transmission request interval information 1064 and 2$^{nd}$ transmission request response interval information 1066. Request/response round 3 information 1058 includes 3$^{rd}$ transmission request interval information 1068 and 3$^{rd}$ transmission request response interval information 1070.

Connection information 1042 includes information identifying a device with which said second device 1000 has a current connection, e.g., a current peer to peer connection. Connection information 1042 also includes information used to identify a set of air link resources associated with a connection, e.g., an OFDM tone-symbol during the 1$^{st}$ transmission request interval, an OFDM tone-symbol during the 1$^{st}$ transmission request response interval, an OFDM tone-symbol during the 2$^{nd}$ transmission request interval, an OFDM tone-symbol during the 2$^{nd}$ transmission request response interval, an OFDM tone-symbol during the 3$^{rd}$ transmission request interval, and an OFDM tone-symbol during the 3$^{rd}$ transmission request response interval used for control signaling related to the connection.

Received signal quality threshold information 1044 includes, e.g., a stored threshold limit used by the decision module 1036 to compare against a result from the signal quality estimation module 1034 to decide whether or not to transmit a transmission request response signal, e.g., an RX echo signal.

Transmission request response generation module 1026 generates transmission request responses. Transmission request response generation module 1026 generates a request response, e.g., RX echo signal, in response to a received transmission request from a device with which the second device has a connection, e.g., the first device, and as a function of the decision module 1036 determination. At some times, during some rounds, transmission response generation module 1026 does not generate a request response because a transmission request directed to the second communications device 1000 was not received in the round. At some times, during some rounds, the transmission response generation module 1026 does not generate a response because the decision module 1036 decides to implement receiver yielding based on a signal quality estimation of module 1034. At some times one or more rounds are thus skipped with regard to request response signaling. For example, generated transmission request responses include a first transmission request response and a second transmission request response from the second device 1000 to a first device, the first transmission request response being a response to a first request to transmit data to the second device during a first traffic interval and the second transmission request response being a response to a second transmission request to transmit data to the second device during the first traffic interval. For example, in one case, the first transmission request response is transmitted in the $1^{st}$ transmission request response interval identified by information 1062 in response to a request from the first device received in the first transmission request interval identified by information 1060; and the second transmission request response is transmitted in the $3^{rd}$ transmission request response interval identified by information 1070 in response to a request from the first device which was received in the $3^{rd}$ transmission request interval identified by information 1068.

Decision module 1036 decides whether or not to transmit a transmission request response, e.g., an RX echo signal, based on a received signal quality estimate generated by the signal quality estimation module 1034. In various embodiments, the decision module 1036 makes a decision not to transmit a transmission request response when a received signal quality estimate is below a threshold, e.g., a threshold in information 1044.

Transmission request response control module 1028 controls when a generated transmission request response is transmitted. For example, the transmission request response control module 1028 controls when generated first and second request responses are transmitted by the wireless transmitter module 1004, transmission of the second transmission request response from the second device to the first device occurring subsequent to transmission of the first transmission request response.

First detection module 1030 detects in a transmission request interval, in which a request to transmit data to the second device 1000 was detected, additional requests corresponding to connections between devices other than said first and second device. Thus first detection module 1030 identifies transmission requests of other connections, which may lead to traffic signals of another connection using the same traffic interval that the connection between the first and second device would like to use, and thus would represent interference.

Signal quality estimation module 1034 generates a received signal quality estimate based on received transmission requests, the generated received signal quality estimate indicated an estimated signal quality of traffic signals which may be received by the second device 1000 from a first device with which the second device 1000 has a connection. In some embodiments, the signal quality estimate is one of a signal to noise ratio (SNR) and a signal to interference ratio (SIR).

Second detection module 1032 detects transmission requests from devices with which the second device 1000 has a connection, e.g., from the first device. In various embodiments, a specific air link resource is reserved, for each round, to be used to carry the transmission request corresponding to a connection in each of a plurality of rounds. For example, corresponding to a peer to peer connection between second communications device 1000 and a first communications device, there is an OFDM tone-symbol in the $1^{st}$ transmission request interval, an OFDM tone-symbol in the $2^{nd}$ transmission request interval, and an OFDM tone-symbol in the $3^{rd}$ OFDM tone-symbol reserved to convey a request indicating that the first WT would like to transmit peer to peer traffic signals to the second communications device 1000 in the traffic interval identified by information 1052. Second detection module 1032 monitors those designated air link resources for a transmission request signal.

Figure 11:
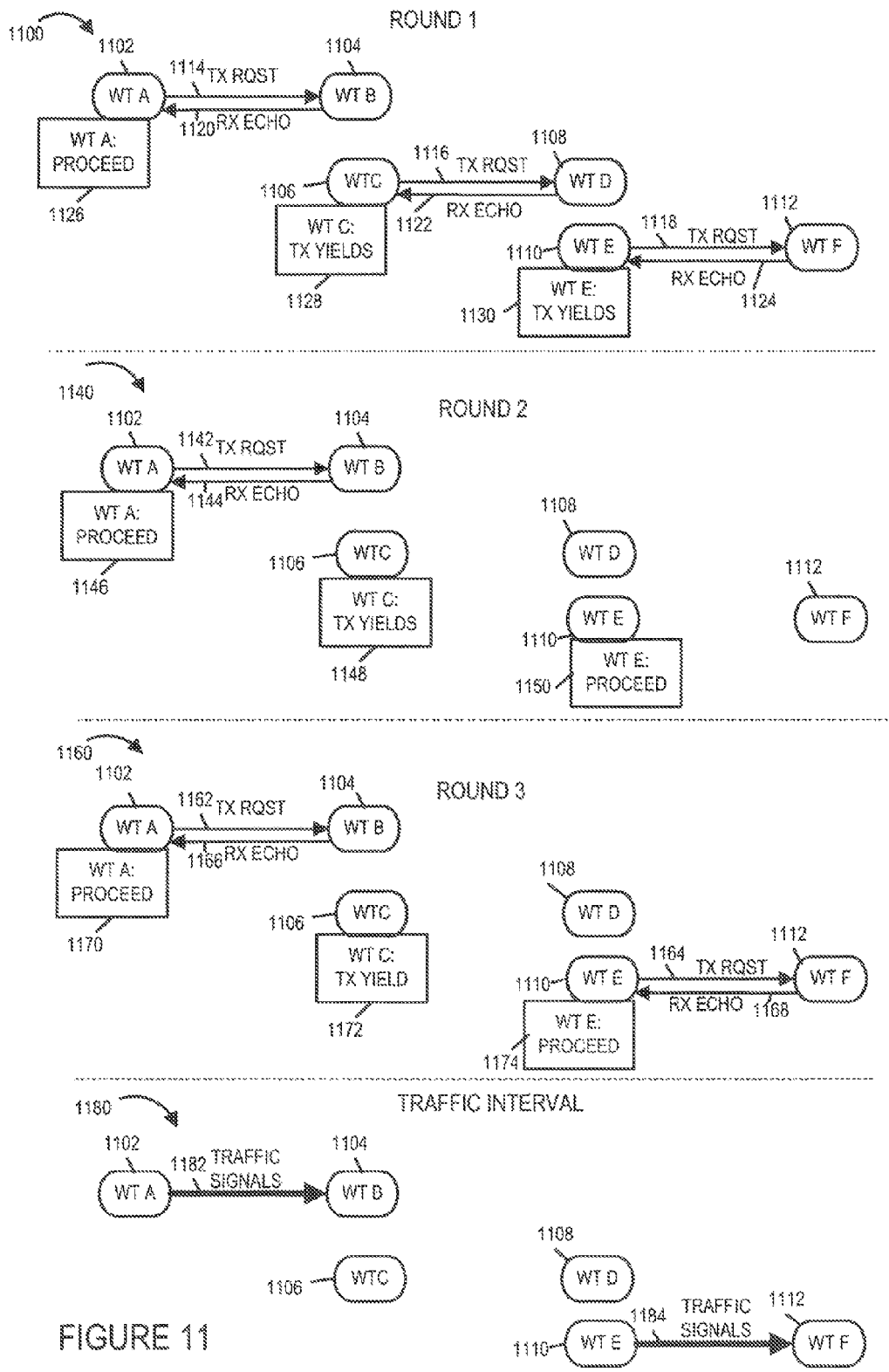
FIG. 11 includes a sequence of drawing illustrating exemplary multi-round request and response signaling in accordance with various embodiments.

FIG. 11 includes a sequence of drawings illustrating exemplary multi-round request and response signaling in accordance with various embodiments. In the example of FIG. 11, there are three transmission request/transmission request response rounds as part of a user scheduling interval for scheduling in a corresponding traffic interval which is subsequent to the three rounds. In this example, assume that WT A 1102, WT B 1104, WT C 1106, WT D 1108, WT E 1110 and WT F 1112 are wireless communications devices such as mobile nodes supporting peer to peer connections. Also assume: (i) that WT A 1102 has a peer to peer connection with WT B 1104 related to traffic signaling from WT A 1102 to WT B 1104; (ii) that WT C 1106 has a peer to peer connection with WT D 1108 related to traffic signaling from WT C 1106 to WT D 1108; (i) that WT E 1110 has a peer to peer connection with WT F 1112 related to traffic signaling from WT E 1110 to WT F 1112. Assume that connection priority is such that the A->B connection priority is greater than the C->D connection priority, and that the C->D connection priority is greater than the E->F connection priority. Further assume, for the purposes of the example, that WT B 1104 is relatively close to WT C 1106, and that WT D is relatively close to WT E 1110. Also assume for the purpose of this example, that WT A 1102 has peer to peer traffic signals that it would like to transmit to WT B in the traffic interval, that that WT C 1106 has peer to peer traffic signals that it would like to transmit to WT D in the same traffic interval, and that WT E 1110 has peer to peer traffic signals that it would like to transmit to WT F 1112 in the same traffic interval.

Drawing 1100 illustrates exemplary round 1 transmission request signaling, round 1 transmission request response signaling, and determinations made from a transmitter perspective. (WT A 1102, WT C 1106, WT E 1110) transmit (TX request 1114, TX request 1116, TX request 1118) to (WT B 1104, WT D 1108, WT F 1112), respectively during the round 1 transmission request interval. (WT B 1104, WT D 1108, WT F 1112) receive request transmission request signals (1114, 1116, 1118), respectively. (WT B 1104, WT D 1108, WT F 1112) generate and transmit request response signals (RX echo 1120, RX echo 1122, RX echo 1124) to (WT A 1102, WT C 1106, WT E 1110), respectively, during the round 1 request response interval.

WT A has detected RX echo signal 1120, which happens to correspond to the highest priority connection, and decides to proceed as indicated by box 1126. WT C 1106 has received RX echo signal 1122 from WT D 1108. However WT C has also received RX echo signal 1120 from WT B 1104, which is associated with a higher priority connection than its own connection. In this example, WT C determines that if it were to transmit, the interference that it would cause at the WT B receiver is above a threshold. Therefore WT C decides to perform transmitter yielding as indicated by box 1128. WT E 1110 has received RX echo signal 1124 from WT F 1112. However WT E has also received RX echo signal 1122 from WT D 1108, which is associated with a higher priority connection than its own connection. In this example, WT E determines that if it were to transmit, the interference that it would cause at the WT D receiver is above a threshold. Therefore WT D decides to perform transmitter yielding as indicated by box 1130.

Drawing 1140 illustrates exemplary round 2 transmission request signaling, round 2 transmission request response signaling, and determinations made from a transmitter perspective. WT A 1102 transmits TX request 1142 to WT B 1104 during the round 2 transmission request interval. Note that WT C 1106 and WT E 1110 refrain from transmitting a transmission request due to the yield decisions of round 1 (1128, 1130). WT B 1104 receive transmission request signal 1142 during the round 2 transmission request interval. WT B 1104 generates and transmit request response signal (RX echo 1144) to WT A 1102 during the round 2 request response interval.

WT A has detected RX echo signal 1144, which happens to correspond to the highest priority connection, and decides to proceed as indicated by box 1146. WT C 1106 has received RX echo signal 1144 from WT B 1104, which is associated with a higher priority connection than its own connection. In this example, WT C determines that if it were to transmit, the interference that it would cause at the WT B receiver is above a threshold. Therefore WT C decides to perform transmitter yielding as indicated by box 1148. WT E 1110 has not received any RX echo signals from higher priority connections which exceed a threshold. Therefore WT E determines that if it were to transmit it would not cause unacceptable interference to receivers corresponding to other connections, so WT E decides to proceed as indicated by box 1150.

Drawing 1160 illustrates exemplary round 3 transmission request signaling, round 3 transmission request response signaling, and determinations made from a transmitter perspective. (WT A 1102, WT E 1110) transmits (TX request 1162, TX request signal 1164) to (WT B 1104, WT F 1112), respectively, during the round 3 transmission request interval. Note that WT C 1106 refrains from transmitting a transmission request due to the yield decisions of round 2 (1148). (WT B 1104, WT F 1112) receive (transmission request signal 1162, transmission request signal 1164), respectively, during the round 3 transmission request interval. (WT B 1104, WT F 1112) generate and transmit (request response signal (RX echo) 1166, request response signal (RX echo) 1168) to (WT A 1102, WT E 1110), respectively, during the round 3 request response interval.

WT A has detected RX echo signal 1166, which happens to correspond to the highest priority connection, and decides to proceed as indicated by box 1170. WT C 1106 has received RX echo signal 1166 from WT B 1104, which is associated with a higher priority connection than its own connection. In this example, WT C determines that if it were to transmit, the interference that it would cause at the WT B receiver is above a threshold. Therefore WT C decides to perform transmitter yielding as indicated by box 1172. In addition WT C decides to perform transmitter yielding for the additional reason that this is the last round and WT C has not previously transmitted a transmission request in this round. WT E 1110 has not received any RX echo signals from higher priority connections which exceed a threshold. Therefore WT E 1110 determines that if it were to transmit it would not cause unacceptable interference to receivers corresponding to other connections, so WT E 1110 decides to proceed as indicated by box 1174.

Drawing 1180 illustrates exemplary traffic in the traffic interval corresponding to the 3 round user scheduling described with respect to drawings (1100, 1140, 1160). WT A 1102 transmits peer to peer traffic signals 1182 to WT B 1104 during the traffic interval since the decision from the third round was to proceed (1170). WT C 1106 refrains from transmitting peer to peer traffic signals to WT D 1108 during the traffic interval since the decision from the third round was to yield (1172). WT E 1110 transmits peer to peer traffic signals 1184 to WT F 1112 during the traffic interval since the decision from the third round was to proceed (1174). Note that the result of the exemplary multi-round request/request response intervals is in the user scheduling interval results in 2 out of the three connection being allowed to transmit traffic signal concurrently using the same air link resource, while if a single round request/request response approach is used in the user scheduling only one connection would be permitted to transmit traffic signals in the traffic interval. Thus, this exemplary multi-round approach leads to more efficient utilization of air link resources.

FIGS. 12, 13, 14 and 15 include a sequence of drawing illustrating exemplary multi-round request and response signaling in accordance with various embodiments. In this example there are three transmission request/transmission request response rounds (FIGS. 12, 13, and 14) as part of a user scheduling interval for scheduling in a corresponding traffic interval (FIG. 15) which is subsequent to the three rounds. In this example, assume that WT A 1202, WT B 1204, WT C 1206, WT D 1208, WT E 1210, WT F 1212, WT G 1214 and WT H 1216 are wireless communications devices such as mobile nodes supporting peer to peer connections. Also assume: (i) that WT A 1202 has a peer to peer connection with WT B 1204 related to traffic signaling from WT A 1202 to WT B 1204; (ii) that WT C 1206 has a peer to peer connection with WT D 1208 related to traffic signaling from WT C 1206 to WT D 1208; (iii) that WT E 1210 has a peer to peer connection with WT F 1212 related to traffic signaling from WT E 1210 to WT F 1212; and (iv) that WT G 1214 has a peer to peer connection with WT H 1216. Assume that connection priority is such that the A->B connection priority is greater than the C->D connection priority, and that the C->D connection priority is greater than the E->F connection priority, and further that the E->F connection priority is greater than the G->H connection priority. Further assume, for the purposes of the example, that WT B 1204 is relatively close to WT C 1206, that WT D is relatively close to WT E 1210, and that WT H 1216 is relatively close to WT C 1206. Also assume for the purpose of this example, that WT A 1202 has peer to peer traffic signals that it would like to transmit to WT B in the traffic interval, that that WT C 1206 has peer to peer traffic signals that it would like to transmit to WT D in the same traffic interval, that WT E 1210 has peer to peer traffic signals that it would like to transmit to WT F 1212 in the same traffic interval, and that WT G 1214 has peer to peer traffic signals that it would like to transmit to WT H 1216 in the same traffic interval.

Drawing 1201 of FIG. 12 illustrates exemplary round 1 transmission request signaling and determinations made from a receiver perspective. (WT A 1202, WT C 1206, WT E 1210, WT G 1214) transmit (TX request 1218, TX request 1220, TX request 1222, TX request 1224) to (WT B 1204, WT D 1208, WT F 1212, WT H 1216), respectively during the round 1 transmission request interval. (WT B 1204, WT D 1208, WT F 1212, WT H 1216) receive request transmission request signals (1218, 1220, 1222, 1224), respectively. WT B 1204 decides to proceed, as indicated by box 1226, since it has not received any higher priority requests than its own connection request signal 1218. WT D 1208 decides to proceed, as indicated by box 1228, since it determined that the expected receive signal quality at its receiver is above a threshold based on received request signals. WT F 1212 decides to proceed, as indicated by box 1230, since it determined that the expected receive signal quality at its receiver is above a threshold based on received request signals. WT H 1232 decides to perform a receiver yield since it determined that its expected receive quality at its receiver is not expected to be above a threshold based on received request signals. The interference expected to be caused by WT C transmission to reception at WT H 1216 is expected to be unacceptable, and since the G->H connection has lower priority than the C->D connection, WT H 1216 yields.

Drawing 1203 of FIG. 12 illustrates exemplary round 1 transmission request response signaling and determinations made from a transmitter perspective. (WT B 1204, WT D 1208, and WT F 1212 transmit (RX echo 1234, RX echo 1236, RX echo 1238) to (WT A 1202, WT C 1206, WT E 1210), respectively during the round 1 transmission request response interval in accordance with decisions (1226, 1228, 1230). WT H 1216 does not transmit an RX echo signal to WT G 1214 since decision 1232 was to yield. (WT A 1202, WT C 1206, WT E 1210) receive transmission request response signals (1234, 1236, 1238), respectively. WT A 1202 decides to proceed, as indicated by box 1240, since it has not received any higher priority request responses than its own connection request response signal 1234. WT C 1206 decides to yield, as indicated by box 1242, since it determined that the expected interference that it will generate to WT B's receiver is above a threshold based on the received RX echo signal 1234. WT E 1210 decides to yield, as indicated by box 1244, since it determined that the expected interference that it will generate to WT D's receiver is above a threshold based on the received RX echo signal 1236. WT G 1214 decides to proceed since it has not received any RX echo signals from other devices which indicate that its own transmissions would create an unacceptable level of interference to a receiver of those other connections.

Drawing 1301 of FIG. 13 illustrates exemplary round 2 transmission request signaling and determinations made from a receiver perspective. (WT A 1202, WT G 1214) transmit (TX request 1302, TX request 1304) to (WT B 1204, WT H 1216), respectively during the round 2 transmission request interval, based on decisions (1240, 1246). (WT C 1206, WT E 1210) do not transmit a transmission request in round 2, based on decisions (1242, 1244). (WT B 1204, WT H 1216) receive request transmission request signals (1302, 1304), respectively. WT B 1204 decides to proceed, as indicated by box 1306, since it has not received any higher priority requests than its own connection request signal 1302. WT H 1216 decides to proceed, as indicated by box 1312, since it determined that the expected receive signal quality at its receiver is above a threshold based on received request signals.

Drawing 1303 of FIG. 13 illustrates exemplary round 2 transmission request response signaling and determinations made from a transmitter perspective. (WT B 1204, WT H 1216 transmit (RX echo 1314, RX echo 1316) to (WT A 1202, WT G 1214), respectively during the round 2 transmission request response interval in accordance with decisions (1306, 1312). (WT A 1202, WT G 1214) receive transmission request response signals (1314, 1316), respectively. WT A 1202 decides to proceed, as indicated by box 1318, since it has not received any higher priority request responses than its own connection request response signal 1314. WT C 1206 decides to yield, as indicated by box 1320, since it determined that the expected interference that it will generate to WT B's receiver is above a threshold based on the received RX echo signal 1314. WT E 1210 decides to proceed, as indicated by box 1322, since it has not received any RX echo signals from other devices which indicate that its own transmissions would create an unacceptable level of interference to a receiver of those other connections. WT G 1214 decides to proceed, as indicated by box 1324, since it has not received any RX echo signals from other devices which indicate that its own transmissions would create an unacceptable level of interference to a receiver of those other connections.

Drawing 1401 of FIG. 14 illustrates exemplary round 3 transmission request signaling and determinations made from a receiver perspective. (WT A 1202, WT E 1210, WT G 1214) transmit (TX request 1402, TX request 1404, TX request 1406) to (WT B 1204, WT F 1212, WT H 1216), respectively during the round 3 transmission request interval, based on decisions (1318, 1322, 1314). WT C 1206 does not transmit a transmission request in round 3, based on decision to yield (1320). (WT B 1204, WT F WT H 1216) receive request transmission request signals (1402, 1404, 1406), respectively. WT B 1204 decides to proceed, as indicated by box 1408, since it has not received any higher priority requests than its own connection request signal 1402. WT F 1212 decides to proceed, as indicated by box 1412, since it has determined that the expected receive signal quality at its receiver is above a threshold based on received request signals. WT H 1316 decides to proceed, as indicated by box 1414, since it determined that the expected receive signal quality at its receiver is above a threshold based on received request signals.

Drawing 1403 of FIG. 14 illustrates exemplary round 3 transmission request response signaling and determinations made from a transmitter perspective. (WT B 1204, WT F 1212, WT H 1216 transmit (RX echo 1416, RX echo 1418, RX echo signal 1420) to (WT A 1202, WT E 1210, WT G 1214), respectively during the round 3 transmission request response interval in accordance with decisions (1408, 1412, 1414). (WT A 1202, WT E 1210, WT G 1214) receive transmission request response signals (1416, 1418, 1420), respectively. WT A 1202 decides to proceed, as indicated by box 1422, since it has not received any higher priority request responses than its own connection request response signal 1416. WT C 1206 decides to yield, as indicated by box 1424, since it determined that the expected interference that it will generate to WT B's receiver is above a threshold based on the received RX echo signal 1416. In addition, WT C 1206 decides to yield since this is the last round, e.g., round 3, and WT C 1206 has not transmitted a transmission request in this round. WT E 1210 decides to proceed, as indicated by box 1426, since it has not received any RX echo signals from other devices which indicate that its own transmissions would create an unacceptable level of interference to a receiver of those other connections. WT G 1214 decides to proceed, as indicated by box 1428, since it has not received any RX echo signals from other devices which indicate that its own transmissions would create an unacceptable level of interference to a receiver of those other connections.

Figure 15:
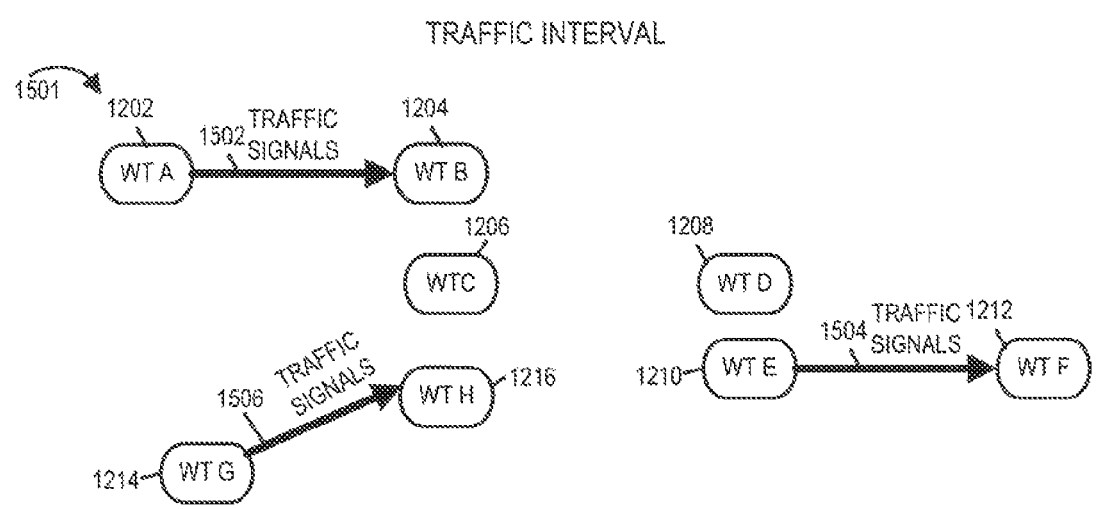

Drawing 1501 of FIG. 15 illustrates exemplary signaling during the traffic interval corresponding to the 3 round user scheduling described with respect to drawings of FIGS. 12, 13 and 14. WT A 1202 transmits peer to peer traffic signals 1502 to WT B 1204 during the traffic interval since the decision from the third round was to proceed (1422). WT C 1206 refrains from transmitting peer to peer traffic signals to WT D 1208 during the traffic interval since the decision from the third round was to yield (1424). WT E 1210 transmits peer to peer traffic signals 1504 to WT F 1212 during the traffic interval since the decision from the third round was to proceed (1426). WT G 1214 transmits peer to peer traffic signals 1506 to WT H 1216 during the traffic interval since the decision from the third round was to proceed (1428). Note that the result of the exemplary multi-round request/request response intervals in the user scheduling interval results in 3 out of the four connections being allowed to transmit traffic signal concurrently using the same air link resource. If instead, a single round request/request response approach is used in the user scheduling only one connection (A->B connection) would be permitted to transmit traffic signals in the traffic interval, which is the only connection in round 1 for which its transmitter received an RX echo and for which its transmitter determined that it was ok to proceed. Thus, this exemplary multi-round approach leads to more efficient utilization of air link resources.

Figure 16:
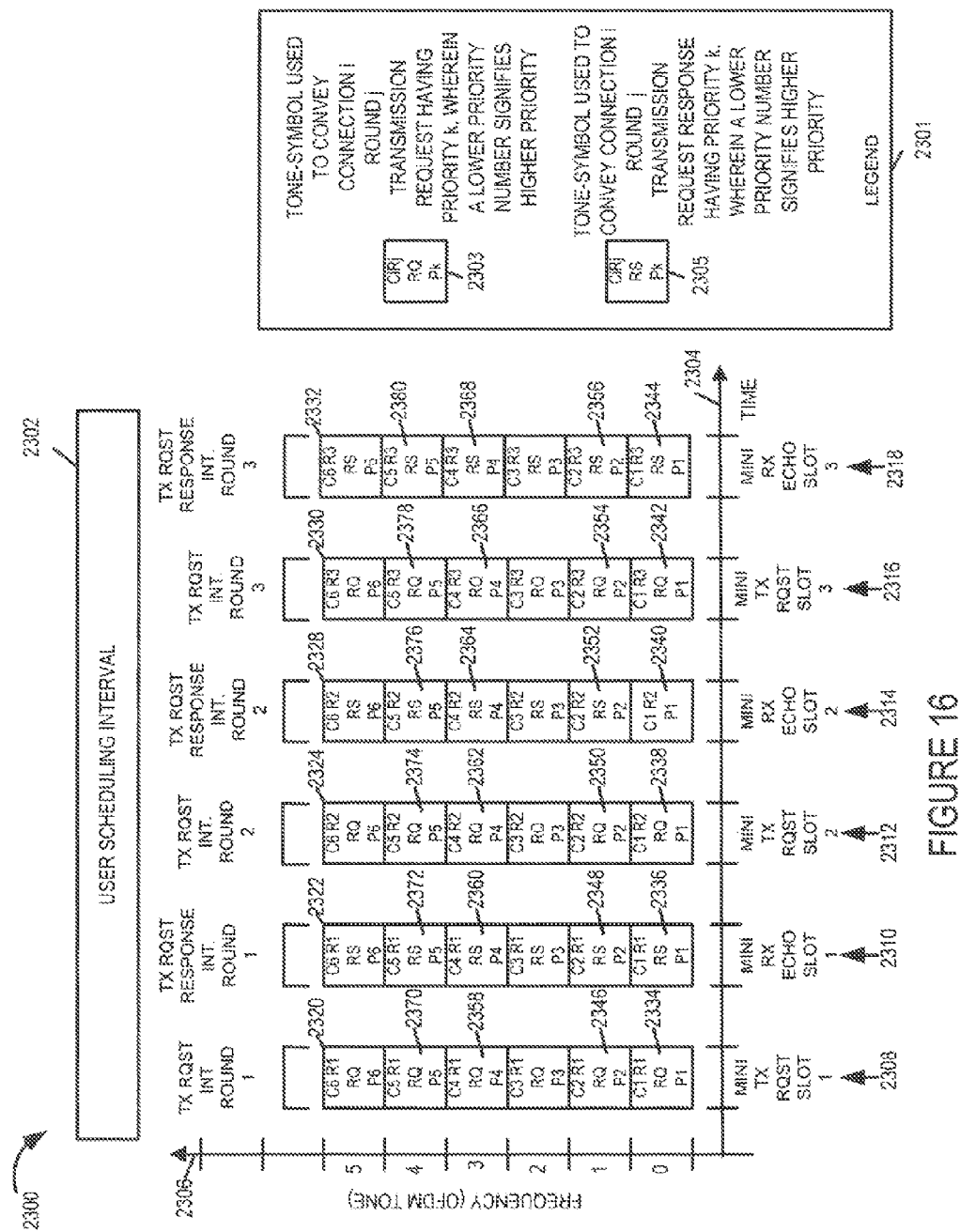
FIG. 16 is a drawing illustrating an exemplary user scheduling interval in a peer to peer recurring timing structure and an exemplary partition of air link resources of the user scheduling portion.

FIG. 16 is a drawing 2300 illustrating an exemplary user scheduling interval 2302 in a peer to peer recurring timing structure and an exemplary partition of air link resources of the user scheduling portion. The WTs which use the resource described in FIG. 16 are, e.g., any of the communications devices described with respect to FIGS. 1, 2, 3, 4, 5, 6, 7, 8, 9, 10, 11, 12, 13, 14, and/or 15. The exemplary user scheduling interval 2302 includes: (i) transmission request interval for round 1 2308 otherwise referred to as mini TX request slot 1; (ii) transmission request response interval for round 1 2310 otherwise referred to as mini RX echo slot 1; (iii) transmission request interval for round 2 2312 otherwise referred to as mini TX request slot 2; (iv) transmission request response interval for round 2 2314 otherwise referred to as mini RX echo slot 2; (v) transmission request interval for round 3 2316 otherwise referred to as mini TX request slot 3; (iv) transmission request response interval for round 3 2318 otherwise referred to as mini RX echo slot 3.

Intervals (2308, 2312, 2316) are designated to carry transmission request signals (TX request signals) while intervals (2310, 2314, 2318) are designated to carry transmission request response signals (RX echo signals).

Horizontal axis 2304 represents time, while vertical axis 2306 represents frequency, e.g., OFDM tones. OFDM symbol 2320 carries transmission request signals for round 1 requests for connections mapped into the structure. OFDM symbol 2322 carries transmission request response signals for round 1 for connections mapped into the structure. OFDM symbol 2324 carries transmission request signals for round 2 requests for connections mapped into the structure. OFDM symbol 2326 carries transmission request response signals for round 2 for connections mapped into the structure. OFDM symbol 2330 carries transmission request signals for round 3 requests for connections mapped into the structure. OFDM symbol 2332 carries transmission request response signals for round 3 for connections mapped into the structure.

Legend 2301 includes an exemplary OFDM tone-symbol 2303 used to carry a transmission request for the traffic interval for the connection designated "i" for a round "j" transmission request with the connection being designated to have priority "k", wherein a lower priority designation number signifies a higher priority level. Legend 2301 also includes an exemplary OFDM tone-symbol 2305 used to carry a transmission request response for the traffic interval for the connection designated "i" for a round "j" transmission request response with the connection being designated to have priority "k". In this example, i is an integer in the range of 1 to 6, and j is an integer in the range of 1 to 3, and k is an integer in the range of 1 to 6.

In this example, there are positions available to support control user scheduling signaling corresponding to 6 peer to peer one-way connections for a traffic interval. For example, consider exemplary connection C1. Assume that connection C1 is currently associated with traffic signals from WT A to WT B (see FIG. 11 or 12-15). Tone symbol 2334 is reserved to carry a round 1 transmission request from WT A to WT B, while tone-symbol 2336 is reserved to carry a round 1 transmission request response signal, e.g., RX echo signal, from WT B to WT A. Tone symbol 2338 is reserved to carry a round 2 transmission request from WT A to WT B, while tone-symbol 2340 is reserved to carry a round 2 transmission request response signal, e.g., RX echo signal, from WT B to WT A. Tone symbol 2342 is reserved to carry a round 3 transmission request from WT A to WT B, while tone-symbol 2344 is reserved to carry a round 3 transmission request response signal, e.g., RX echo signal, from WT B to WT A.

Continuing with the example, consider exemplary connection C2. Assume that connection C1 is currently associated with traffic signals from WT C to WT D (see FIG. 11 or 12-15). Tone symbol 2346 is reserved to carry a round 1 transmission request from WT C to WT D, while tone-symbol 2348 is reserved to carry a round 1 transmission request response signal, e.g., RX echo signal, from WT D to WT C. Tone symbol 2350 is reserved to carry a round 2 transmission request from WT C to WT D, while tone-symbol 2352 is reserved to carry a round 2 transmission request response signal, e.g., RX echo signal, from WT D to WT C. Tone symbol 2354 is reserved to carry a round 3 transmission request from WT C to WT D, while tone-symbol 2356 is reserved to carry a round 3 transmission request response signal, e.g., RX echo signal, from WT D to WT E.

Continuing with the example, consider exemplary connection C4. Assume that connection C4 is currently associated with traffic signals from WT E to WT F (see FIG. 11 or 12-15). Tone symbol 2358 is reserved to carry a round 1 transmission request from WT E to WT F, while tone-symbol 2360 is reserved to carry a round 1 transmission request response signal, e.g., RX echo signal, from WT F to WT E. Tone symbol 2362 is reserved to carry a round 2 transmission request from WT E to WT F, while tone-symbol 2364 is reserved to carry a round 2 transmission request response signal, e.g., RX echo signal, from WT F to WT E. Tone symbol 2366 is reserved to carry a round 3 transmission request from WT E to WT F, while tone-symbol 2368 is reserved to carry a round 3 transmission request response signal, e.g., RX echo signal, from WT F to WT E.

Further continuing with the example, consider exemplary connection C5. Assume that connection C5 is currently associated with traffic signals from WT G to WT H (see FIG. 12-15). Tone symbol 2370 is reserved to carry a round 1 transmission request from WT G to WT H, while tone-symbol 2372 is reserved to carry a round 1 transmission request response signal, e.g., RX echo signal, from WT H to WT G. Tone symbol 2374 is reserved to carry a round 2 transmission request from WT G to WT H, while tone-symbol 2376 is reserved to carry a round 2 transmission request response signal, e.g., RX echo signal, from WT H to WT G. Tone symbol 2378 is reserved to carry a round 3 transmission request from WT G to WT H, while tone-symbol 2380 is reserved to carry a round 3 transmission request response signal, e.g., RX echo signal, from WT H to WT G.

In other embodiments, there may be a different number of multiple rounds, e.g. two rounds or more than two rounds. In other embodiments, there may be a different number of multiple connections supported, and at least some of the multiple connections supported are allocated resources in more than one of the multiple rounds. In some embodiments, there are a different number of tones/symbol in the user scheduling interval. In various embodiments, the spacing between a TX request round interval and a TX transmission request response round interval is sufficiently long to allow a peer to peer wireless communications device to reconfigure from a transmitter mode to a receiver mode and/or to allow a peer to peer wireless communications device to reconfigure from a receiver mode to a transmitter mode.

Figure 17A:
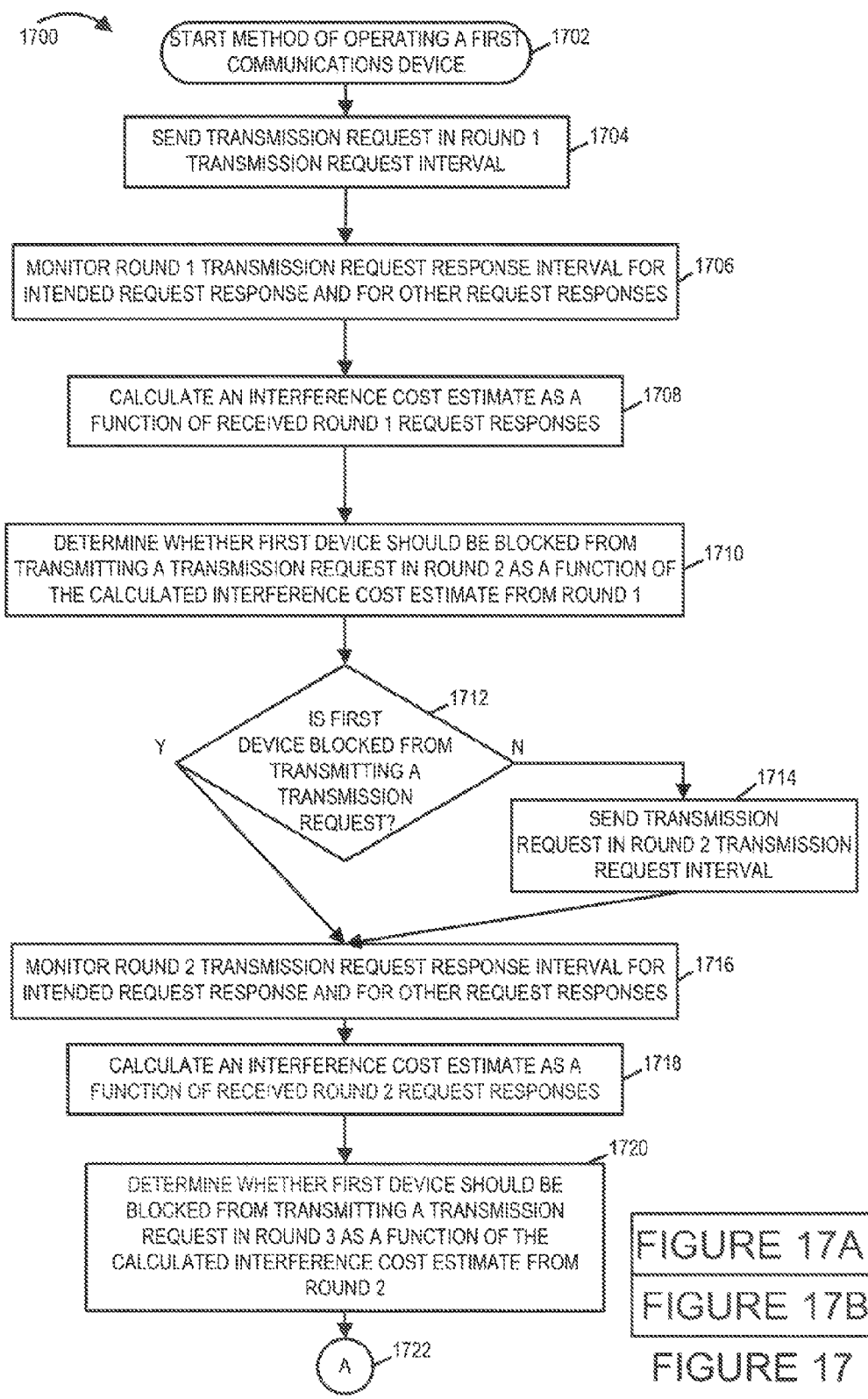
FIG. 17 comprising the combination of FIG. 17A
FIG. 17B is a flowchart of an exemplary method of operating a first communications device in accordance with various embodiments.
Figure 17B:
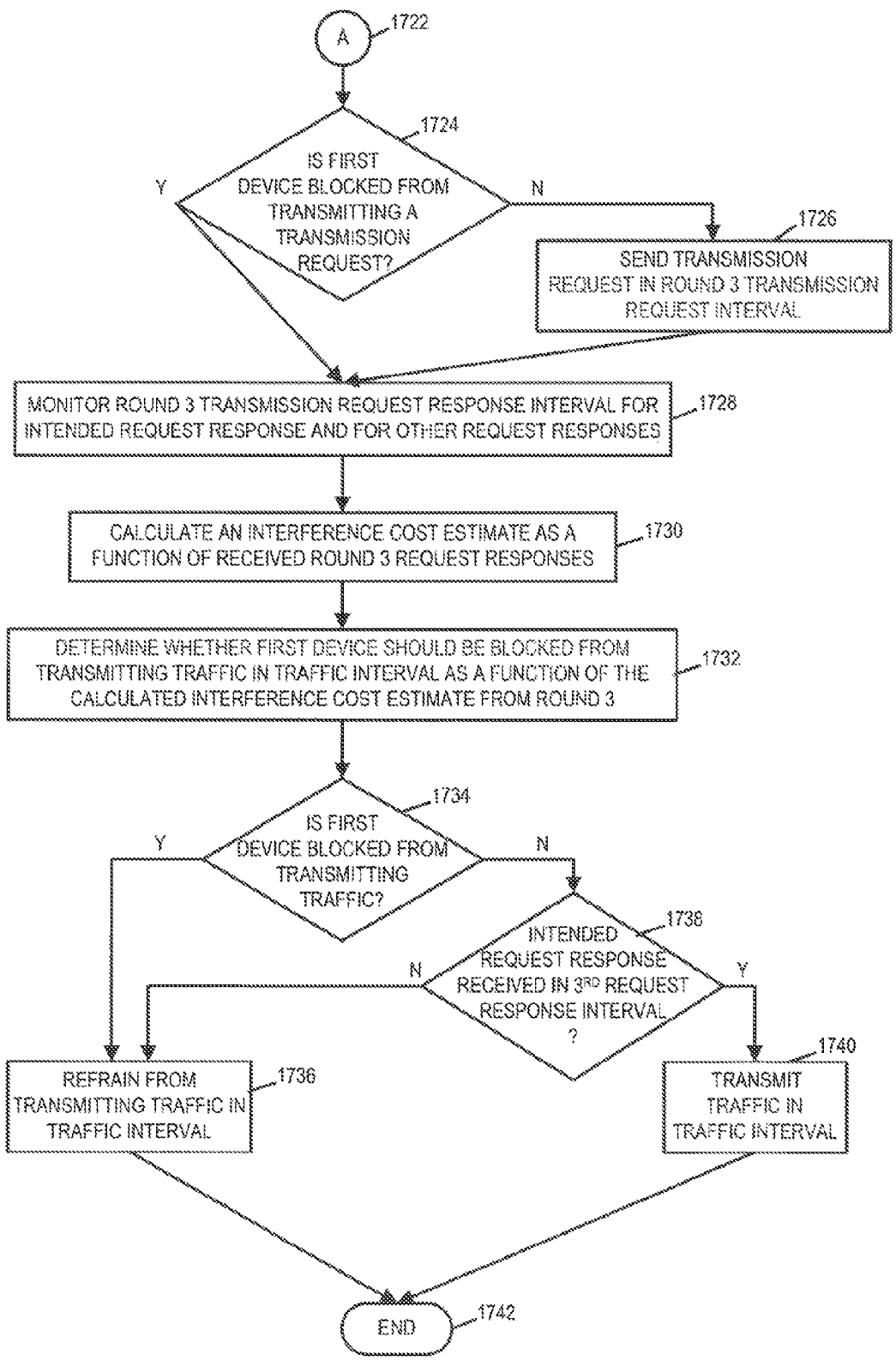

FIG. 17 comprising the combination of FIG. 17A and FIG. 17B is a flowchart 1700 of an exemplary method of operating a first communications device in accordance with various embodiments. The first communications device is, e.g., a wireless terminal such as a mobile node, the first communications device supporting peer to peer communications with a second communications device. The second communications device is, e.g., another wireless terminal such as a mobile node supporting peer to peer communications, with which the first communications device has a peer to peer connection. The first and second communications, in various embodiments, use a peer to peer timing structure including a user scheduling intervals, said user scheduling interval including a plurality of transmission request/transmission request response rounds, e.g., three rounds, which correspond to a traffic interval.

Operation of the exemplary method starts in initial step 1702 where the first device which has a connection with a second device decides that it has traffic data that it would like to communicate to the second device in a traffic interval of a current traffic slot in the peer to peer timing structure. Operation proceeds from start step 1702 to step 1704. In step 1704, the first device sends a transmission request in the round 1 transmission request interval, the transmission request intended for the second device with which the first device has a connection. Then, in step 1706, the first device monitors the round 1 transmission request response interval for an intended request response, e.g., an RX echo signal from the second device, and for other request responses, e.g., RX echo signals from other wireless terminals with which the first device does not have a connection. Operation proceeds from step 1706 to step 1708.

In step 1708, the first device calculates an interference cost estimate as a function of received round 1 request responses. For example, the first device uses a received request response signal corresponding to a connection other than its own, which is a higher priority connection than its own, to determine a measure of the interference that the first wireless terminal is expected to cause to the higher priority connection's receiver, if the first device transmits traffic in the traffic interval. Operation proceeds from step 1708 to step 1710.

In step 1710, the first device determines whether the first device should be blocked from transmitting a transmission request in round 2 as a function of the calculated interference cost from round 1. For example, if each of the interference cost estimates of step 1708 corresponding to higher priority connections are below a threshold, then, the first device is not blocked; otherwise the first device is blocked. Operation proceeds from step 1710 to step 1712.

In step 1712, if the determination of step 1710 was that the first device is blocked from transmitting a transmission request in the second round, then operation proceeds from step 1712 to step 1716; otherwise operation proceeds from step 1712 to step 1714. In step 1714, the first device sends a transmission request in the round 2 transmission request interval. Operation proceeds from step 1714 to step 1716.

In step 1716, the first device monitors the round 2 transmission request response interval for an intended request response, e.g., an RX echo signal from the second device with which the first device has a connection if the first device performed step 1714 and transmitted a second round request. In step 1716 the first device also monitors the round 2 transmission request response signal for other request response signals, e.g., for RX echo signals corresponding to other connections. Operation proceeds from step 1716 to step 1718.

In step 1718, the first device calculates an interference cost estimate as a function of received round 2 request responses. For example, corresponding to a received request response associated with a higher priority connection than its own connection, the first device uses the received request response signal to calculate an estimate amount of interference that the first device estimates it will cause to reception with regard to the other higher priority connection. Operation proceeds from step 1718 to step 1720.

In step 1720, the first device determines whether the first device should be blocked from transmitting a transmission request in round 3 as a function of the calculated interference cost from round 2. For example, if each of the interference cost estimates of step 1718 corresponding to higher priority connections are below a threshold, then, the first device is not blocked; otherwise the first device is blocked. Operation proceeds from step 1720, via connecting node A 1722, to step 1724.

In step 1724, if the determination of step 1720 was that the first device is blocked from transmitting a transmission request in the third round, then operation proceeds from step 1724 to step 1728; otherwise operation proceeds from step 1724 to step 1726. In step 1726, the first device sends a transmission request in the round 3 transmission request interval. Operation proceeds from step 1726 to step 1728.

In step 1728, the first device monitors the round 3 transmission request response interval for an intended request response, e.g., an RX echo signal from the second device with which the first device has a connection if the first device performed step 1726 and transmitted a third round request. In step 1728 the first device also monitors the round 3 transmission request response signal for other request response signals, e.g., for RX echo signals corresponding to other connections. Operation proceeds from step 1728 to step 1730.

In step 1730, the first device calculates an interference cost estimate as a function of received round 3 request responses. For example, corresponding to a received request response associated with a higher priority connection than its own connection, the first device uses the received request response signal to calculate an estimate of the amount of interference that the first device estimates it will cause to reception with regard to the other higher priority connection. Operation proceeds from step 1730 to step 1732.

In step 1732, the first device determines whether the first device should be blocked from transmitting traffic in a traffic interval as a function of the calculated interference cost from round 3. For example, if each of the interference cost estimates of step 1730 corresponding to higher priority connections are below a threshold, then, the first device is not blocked; otherwise the first device is blocked. Operation proceeds from step 1732 to step 1734.

In step 1734, the first device proceeds from step 1732 to step 1736 if the determination of step 1732 is that the first device is to be blocked. However, operation proceeds from step 1734 to step 1738 if the determination of step 1732 is that the first device is not blocked. In step 1738 the first device proceeds from step 1738 to step 1736 if the first device determines that the intended request response was not received in the third round request response interval, e.g., the first device has not detected an RX echo signal from the second device in the monitoring of step 1728. However, if the first device has detected a request response signal, e.g., an RX echo signal, from the second device with which the first device has a connection, during the third round request response interval, then operation proceeds from step 1738 to step 1740.

Returning to step 1736, in step 1736 the first device is controlled to refrain from transmitting traffic in the traffic interval. Operation proceeds from step 1736 to end step 1742.

Returning to step 1740, in step 1740 the first device transmits traffic in the traffic interval. Operation proceeds from step 1740 to end step 1742. Note that the method of flowchart 1700 can be, and sometimes is, repeated for another traffic slot in the timing structure, if the first device has traffic data that it wants to transmit to the second device with which it has a connection during that traffic slot's traffic interval.

Note that the example of FIG. 17 corresponds to an embodiment including three request/request response rounds for a traffic interval. In some embodiments, there are a different number of request/request response rounds corresponding to a traffic interval, e.g., two rounds or more than 3 rounds. In various embodiment with more that 3 rounds, a transmission decision step uses interference estimate information calculated from detected request response signals from a previous round.

Figure 18A:
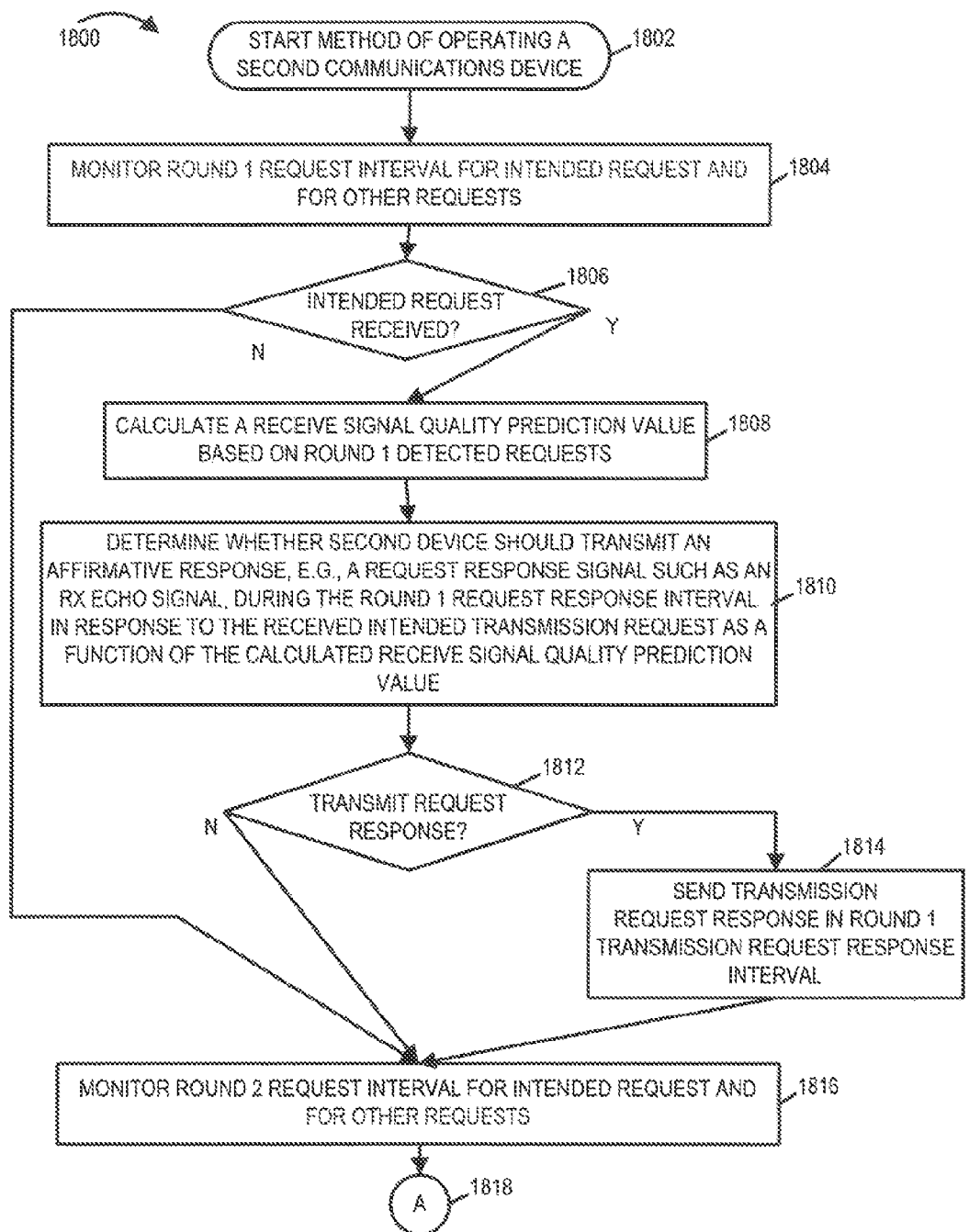
FIG. 18 comprising the combination of FIG. 18A, FIG. 18B
FIG. 18C is a flowchart of an exemplary method of operating a second communications device in accordance with various embodiments.
Figure 18B:
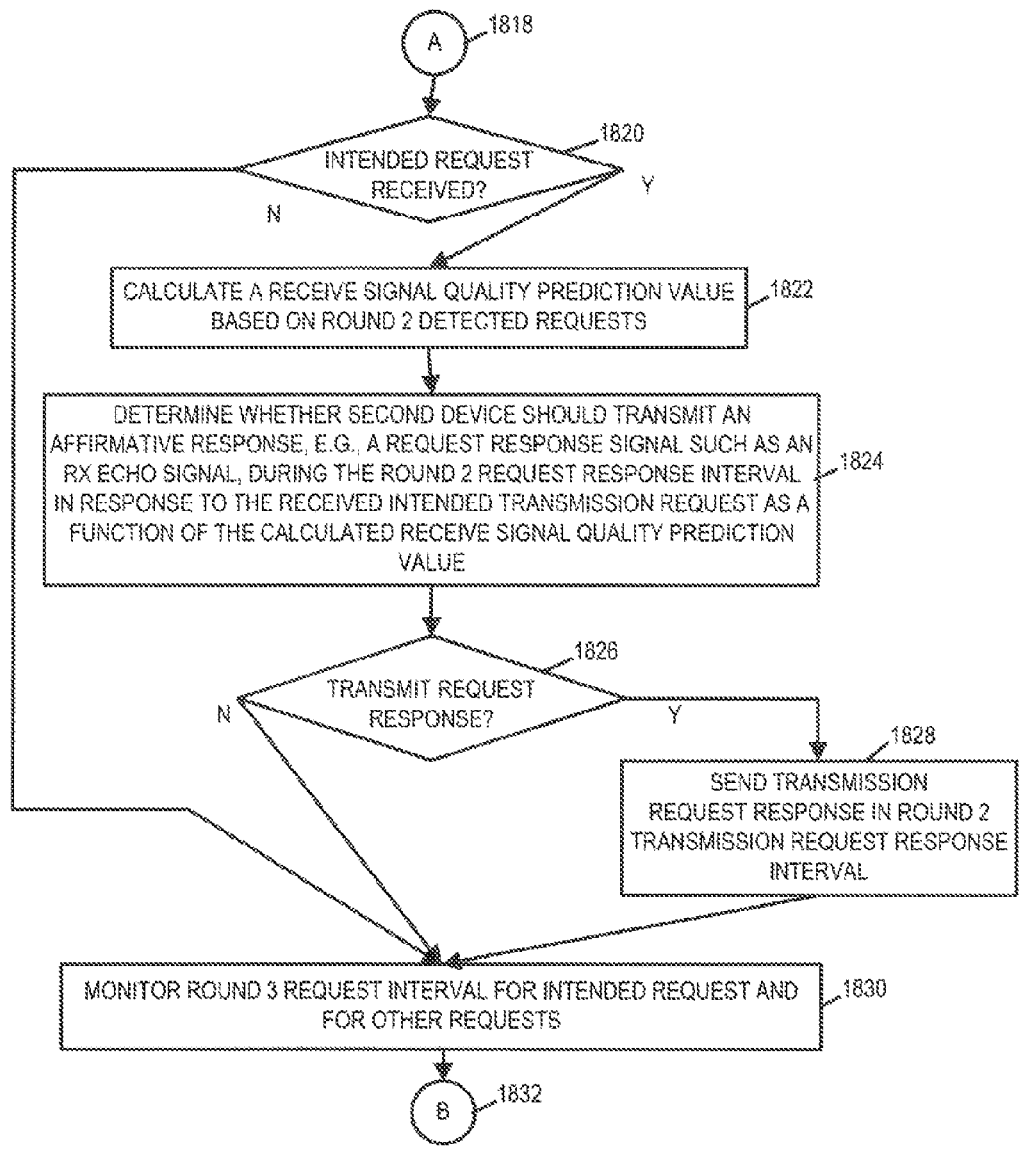
Figure 18C:
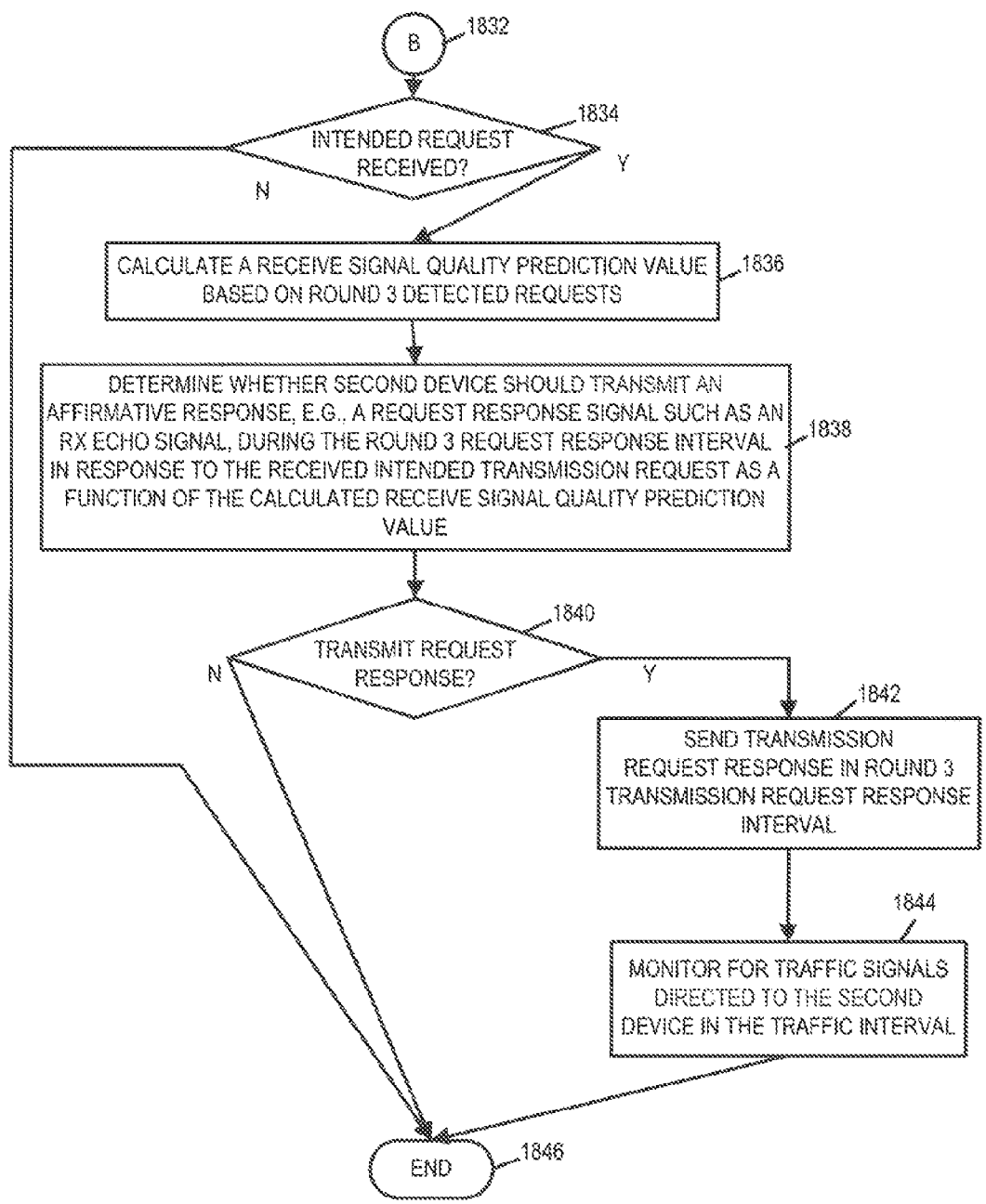

FIG. 18 comprising the combination of FIG. 18A, FIG. 18B and FIG. 18C is a flowchart 1800 of an exemplary method of operating a second communications device in accordance with various embodiments. The second communications device is, e.g., a wireless terminal such as a mobile node, the second communications device supporting peer to peer communications with a first communications device. The first communications device is, e.g., another wireless terminal such as a mobile node supporting peer to peer communications, with which the second communications device has a peer to peer connection. The first and second communications, in various embodiments, use a peer to peer timing structure including a user scheduling intervals, said user scheduling interval including a plurality of transmission request/transmission request response rounds, e.g., three rounds, which correspond to a traffic interval.

Operation of the exemplary method starts in initial step 1802 and proceeds to step 1804. In step 1804, the second device monitors a round 1 request interval for an intended request, e.g., a transmission request from the first device with which the second device has a connection, and for other requests, e.g., transmission requests corresponding to other peer to peer connections. Operation proceeds from step 1804 to step 1806. In step 1806, if the second device has not received an intended request, e.g., a request from the first device in the monitoring of step 1804, then operation proceeds from step 1806 to step 1816. However, if the second device has received an intended request, then operation proceeds from step 1806 to step 1808.

In step 1808 the second device calculates a receive signal quality prediction value based on the round 1 detected requests of step 1804. Operation proceeds from step 1808 to step 1810. In step 1810 the second device determines whether the second device should transmit an affirmative response, e.g., a request response signal such as an RX echo signal, to the first device during the round 1 request response interval in response to the received intended transmission request as a function of the calculated received signal quality value. For example, if the calculated receive signal quality value, e.g., an SNR or SIR, exceeds a threshold, then the second device determines that it should transmit an RX echo signal to the first device during the first request response interval. Operation proceeds from step 1810 to step 1812.

In step 1812, if the second device has decided not to transmit a request response in step 1810, then operation proceeds from step 1812 to step 1816. However, if in step 1810 the second device has decided to transmit a request response, then operation proceeds from step 1812 to step 1814. In step 1814, the second device sends a transmission request response in the round 1 transmission request response interval. Operation proceeds from step 1814 to step 1816.

In step 1816, the second device monitors the round 2 request interval for an intended request, e.g., a request from the first device with which the second device has a connection which is intended for the second device, and for other requests, e.g., requests corresponding to other connections. Operation proceeds from step 1816 via connecting node A 1818 to step 1820.

In step 1820, if the second device has not received an intended request, e.g., a request from the first device in the monitoring of step 1816, then operation proceeds from step 1820 to step 1830. However, if the second device has received an intended request, then operation proceeds from step 1820 to step 1822.

In step 1822 the second device calculates a receive signal quality prediction value based on the round 2 detected requests of step 1816. Operation proceeds from step 1822 to step 1824. In step 1824 the second device determines whether the second device should transmit an affirmative response, e.g., a request response signal such as an RX echo signal, to the first device during the round 2 request response interval in response to the received intended transmission request as a function of the calculated received signal quality value of step 1822. For example, if the calculated receive signal quality value of step 1822, e.g., an SNR or SIR, exceeds a threshold, then the second device determines that it should transmit an RX echo signal to the first device during the second request response interval. Operation proceeds from step 1824 to step 1826.

In step 1826, if the second device has decided not to transmit a request response in step 1824, then operation proceeds from step 1826 to step 1830. However, if in step 1824 the second device has decided to transmit a request response, then operation proceeds from step 1826 to step 1828. In step 1828, the second device sends a transmission request response in the round 2 transmission request response interval. Operation proceeds from step 1828 to step 1830.

In step 1830, the second device monitors the round 3 request interval for an intended request, e.g., a request from the first device with which the second device has a connection which is intended for the second device, and for other requests, e.g., requests corresponding to other connections. Operation proceeds from step 1830 via connecting node B 1832 to step 1834.

In step 1834, if the second device has not received an intended request, e.g., a request from the first device in the monitoring of step 1830, then operation proceeds from step 1830 to end step 1840. However, if the second device has received an intended request, then operation proceeds from step 1834 to step 1836.

In step 1836 the second device calculates a receive signal quality prediction value based on the round 3 detected requests of step 1830. Operation proceeds from step 1836 to step 1838. In step 1838 the second device determines whether the second device should transmit an affirmative response, e.g., a request response signal such as an RX echo signal, to the first device during the round 3 request response interval in response to the received intended transmission request as a function of the calculated received signal quality value of step 1836. For example, if the calculated receive signal quality value of step 1836, e.g., an SNR or SIR, exceeds a threshold, then the second device determines that it should transmit an RX echo signal to the first device during the third request response interval. Operation proceeds from step 1838 to step 1840.

In step 1840, if the second device has decided not to transmit a request response in step 1838, then operation proceeds from step 1840 to end step 1846. However, if in step 1838 the second device has decided to transmit a request response, then operation proceeds from step 1840 to step 1842. In step 1842, the second device sends a transmission request response in the round 3 transmission request response interval. Operation proceeds from step 1842 to step 1844. In step 1844 the second device monitors for traffic signals directed to the second device in the traffic interval. Operation proceeds from step 1844 to end step 1846.

Note that the method of method of flowchart 1800 can be, and sometimes is, repeated for another traffic slot in the timing structure. Also note that the example, of FIG. 18 corresponds to an embodiment including three request/request response rounds for a traffic interval. In some embodiments, there are a different number of request/request response rounds corresponding to a traffic interval, e.g., two rounds or more than 3 rounds. In various embodiments with more that 3 rounds, a transmission decision step uses received signal prediction value information calculated from detected request signals from a previous round.

Figure 19:
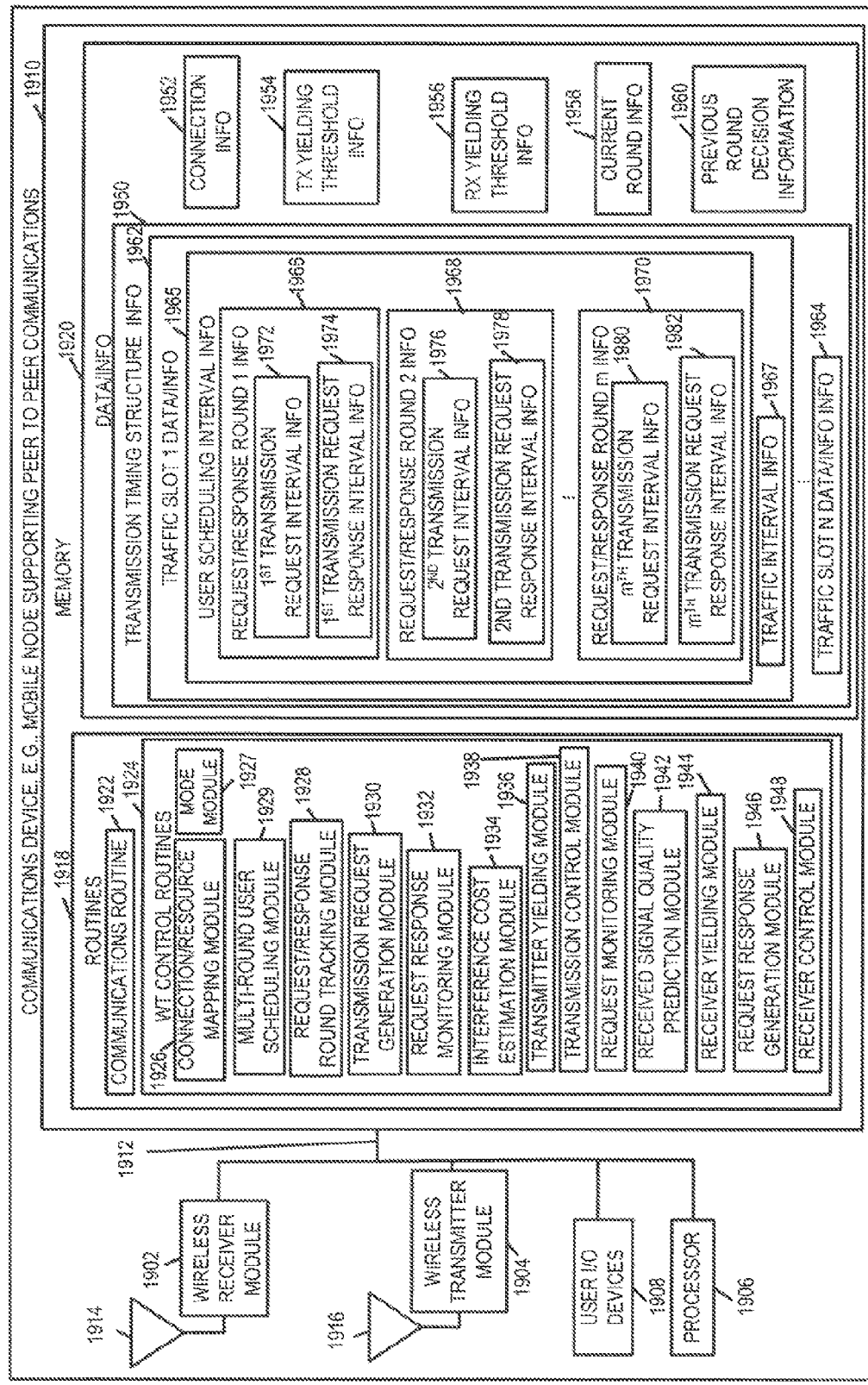
FIG. 19 is a drawing of an exemplary communications device, e.g., wireless terminal such as a mobile node supporting peer to peer communications, in accordance with various embodiments.

FIG. 19 is a drawing of an exemplary communications device 1900, e.g., wireless terminal such as a mobile node supporting peer to peer communications, in accordance with various embodiments. Exemplary communications device 1900 includes a wireless receiver module 1902, a wireless transmitter module 1904, user I/O devices 1908, a processor 1906, and memory 1910 coupled together via a bus 1912 over which the various elements may interchange data and information.

Memory 1910 includes routines 1918 and data/information 1920. The processor 1906, e.g., a CPU, executes the routines 1918 and uses the data/information 1920 in memory 1910 to control the operation of the communications device 1900 and implement methods, e.g., the method of flowchart 1700 of FIG. 17 or the method of flowchart 1800 of FIG. 18.

Wireless receiver module 1902, e.g., an OFDM receiver 1902, is coupled to receive antenna 1914 via which the communications device receives signals, e.g., transmission request signals, transmission request response signals, and traffic signals. Wireless transmitter module 1904, e.g., an OFDM transmitter 1904, is coupled to transmit antenna 1916, via which the communications device 1900 transmits transmission request signals, transmission request response signals, and traffic signals.

User I/O devices 1908 include, e.g., a microphone, a keyboard, a keypad, a camera, a mouse, a speaker, a display, etc. User I/O device 1908 allow a user of device 1900 to input data/information, access output data/information, and control at least some functions of the device 1900.

Routines 1918 include a communications routine 1922 and wireless terminal control routines 1924. The communications routine 1922 implements various communications protocols used by the communications device 1900. The wireless terminal control routines 1924 include a connection/resource mapping module 1926, a mode module 1927, a multi-round user scheduling module 1929, a request/response round tracking module 1928, a transmission request generation module 1930, a request response monitoring module 1932, an interference cost estimation module 1934, a transmitter yielding module 1936, a transmission control module 1938, a request monitoring module 1940, a received signal quality prediction module 1942, a receiver yielding module 1944, a request response generation module 1946, and a receiver control module 1948.

Data/information 1920 includes transmission timing structure information 1950, connection information 1952, transmitter yielding threshold information 1954, receiver yielding threshold information 1956, current round information 1958, and previous round decision information 1960. The transmission timing structure information 1950 includes information corresponding to a plurality of traffic slots in the peer to peer timing structure (traffic slot 1 data/information 1962, . . . , traffic slot N data/information 1964). Traffic slot 1 data/information 1962 includes user scheduling interval information 1965 and traffic interval information 1967. The user scheduling interval information 1965 includes information corresponding to a plurality of request/request response rounds (request/response round 1 information 1966, request/response round 2 information 1968, . . . , request/response round m data/information 1970. Request/response round 1 information 1966 includes $1^{st}$ transmission request interval information 1972 and $1^{st}$ transmission request response interval information 1974. Request/response round 2 information 1968 includes $2^{nd}$ transmission request interval information 1976 and $2^{nd}$ transmission request response interval information 1978. Request/response round m information 1970 includes $m^{th}$ transmission request interval information 1980 and $m^{th}$ transmission request response interval information 1982.

Connection/resource mapping module 1926 identifies the air link resources associated with a particular connection between device 1900 and another communications device. For example, connection/resource mapping module 1926 identifies as a function of a connection identifier, for a first traffic slot, an OFDM tone-symbol in the $1^{st}$ transmission request interval, an OFDM tone-symbol in the $1^{st}$ transmission request response interval, an OFDM tone-symbol in the $2^{nd}$ transmission request interval, an OFDM tone-symbol in the $2^{nd}$ transmission request response interval, . . . , an OFDM tone-symbol in the $m^{th}$ transmission request interval, and an OFDM tone-symbol in the $m^{th}$ transmission request response interval.

Mode module 1927 determines as a function of a connection identifier, whether the communications device 1900 is designated to be a traffic signal transmitter or a traffic signal receiver with respect to the connection. Mode module 1927 controls the device to be in the appropriate mode (receive or transmit) for a particular interval. For example, if device 1900 has a connection with another device in which device 1900 is designated as traffic signal transmitter device, and device 1900 wants to transmit traffic to the other device, mode control module 1927 controls device 1900 to be in transmit mode during the 1$^{st}$ transmission request interval, and controls device 1900 to be in receive mode during the 1$^{st}$ transmission request response interval. As another example, if device 1900 has a connection with another device in which device 1900 is designated as traffic signal receiver device, mode control module 1927 controls device 1900 to be in receive mode during the 1$^{st}$ transmission request interval, and controls device 1900 to be in transmit mode during the 1$^{st}$ transmission request response interval if it is to transmit an RX echo signal.

Multi-round user scheduling module 1929 controls sequencing through the multiple transmission request/transmission request response rounds of the user scheduling interval. Request/response round tracking module 1928 keeps track of the current round in the user scheduling interval as the device sequences through the multiple rounds of the user scheduling interval, e.g., updating current round information 1958 and identifying when the final round of the sequence occurs.

Transmission request generation module 1930 generates transmission request signals to be generated in transmission request intervals. Request response monitoring module 1932 monitors for request response signals, e.g., RX echo signals, from devices with which device 1900 has a connection and from other devices during transmission request response intervals. Interference cost estimation module 1934 determines an estimated interference cost to a higher priority connection than its own that communications device 1900 is expected to generate if allowed to transmit traffic signals during the traffic interval. Transmitter yielding module 1936 determines as a function of an interference cost estimation from module 1934 whether or not the communications device 1900 should be allowed to transmit or should yield. For example, transmitter yielding module 1936 compares one or more interference cost estimates in a round to a transmitter yielding threshold of information 1954. Transmission control module 1938 controls the transmitter module 1904 to transmit a generated transmission request signal or a generated traffic signal in the appropriate slot provided the transmitter yielding module has not determined that the transmitter should yield.

Request monitoring module 1940 monitors for transmission request signals during transmission request intervals. Received signal quality predication module 1942 determines a predicated receive signal quality, e.g., an SNR or SIR, at device 1900 as a function of received transmission request signals. Receiver yielding module 1944 determines whether or not device 1900 should transmit a request response signal, e.g., an RX echo signal, in response to a received transmission request signal directed to device 1900, for a round, as a function of a determined received signal quality predication. For example, the received signal quality prediction for a round is compared to an RX yielding threshold in information 1956. Request response generation module 1946 generates a request response signal when a transmission request corresponding to device 1900's connection has been received and when the receiver yielding module 1944 determines not to yield. Transmitter control module 1938 then control the wireless transmitter module 1904 to transmit the generated request response signal, e.g. generated RX echo signal. Receiver control module 1948 controls wireless receiver module 1902 to receive signals, e.g., request signals, request response signals, and peer to peer traffic signals at the appropriate times in coordination with the connection and mode.

Connection information 1952 includes information identifying a peer to peer connection between device 1900 and another device. The connection information includes information identifying the other device and information identifying the direction of the traffic flow associated with connection. Current round information 1958 includes information identifying the current round of the user scheduling interval, e.g., one of round 1, round 2, . . . , round m. Previous round decision information identifies a decision of the transmitter yielding module 1936 or the receiver yielding module 1944 corresponding to a previous round.

Figure 20:
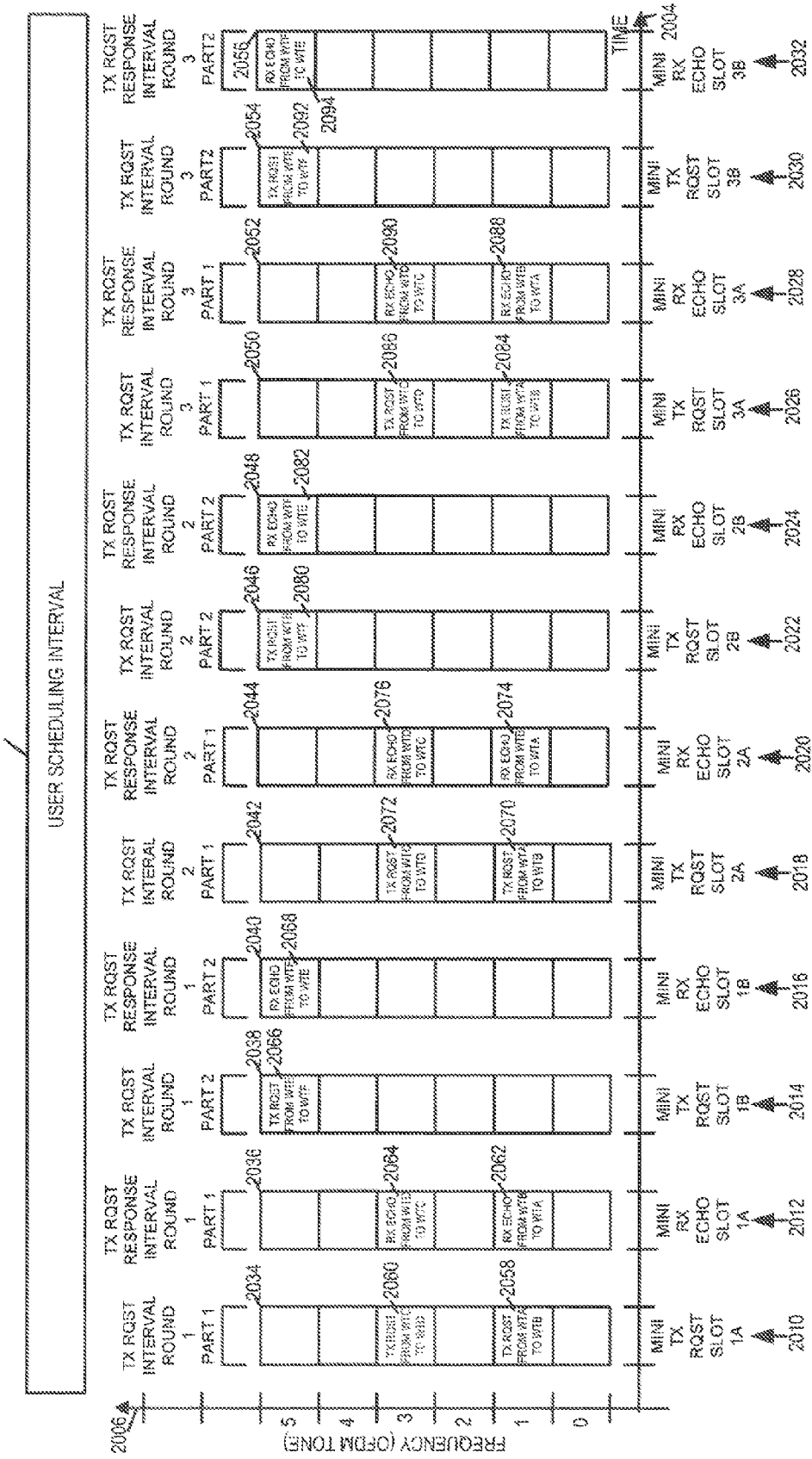
FIG. 20 is a drawing illustrating an exemplary user scheduling interval in a peer to peer recurring timing structure and an exemplary partition of air link resources of the user scheduling portion.

FIG. 20 is a drawing 2000 illustrating an exemplary user scheduling interval 2008 in a peer to peer recurring timing structure and an exemplary partition of air link resources of the user scheduling portion. Exemplary user scheduling interval 2008 is an exemplary alternative to exemplary user scheduling interval 212 of FIG. 2, which is used in some embodiments. The exemplary user scheduling interval 2008 includes: (i) transmission request interval for round 1 part 1 2010 otherwise referred to as mini TX request slot 1A; (ii) transmission request response interval for round 1 part 1 2012 otherwise referred to as mini RX echo slot 1A; (iii) transmission request interval for round 1 part 2 2014 otherwise referred to as mini TX request slot 1B; (iv) transmission request response interval for round 1 part 2 2016 otherwise referred to as mini RX echo slot 1B; (v) transmission request interval for round 2 part 1 2018 otherwise referred to as mini TX request slot 2A; (vi) transmission request response interval for round 2 part 1 2020 otherwise referred to as mini RX echo slot 2A; (vii) transmission request interval for round 2 part 2 2022 otherwise referred to as mini TX request slot 2B; (viii) transmission request response interval for round 2 part 2 2024 otherwise referred to as mini RX echo slot 2B; (ix) transmission request interval for round 3 part 1 2026 otherwise referred to as mini TX request slot 3A; (x) transmission request response interval for round 3 part 1 2028 otherwise referred to as mini RX echo slot 3A; (xi) transmission request interval for round 3 part 2 2030 otherwise referred to as mini TX request slot 3B; (xii) transmission request response interval for round 3 part 2 2032 otherwise referred to as mini RX echo slot 3B;

Intervals (2010, 2014, 2018, 2022, 2026, 2030) are designated to carry transmission request signals (TX request signals) while intervals (2012, 2016, 2020, 2024, 2028, 2032) are designated to carry transmission request response signals (RX echo signals).

Horizontal axis 2004 represents time, while vertical axis 2006 represents frequency, e.g., OFDM tones. OFDM symbol 2034 carries transmission request signals for first round requests for connections mapped into a position in the transmission request interval 2010. OFDM symbol 2036 carries first round transmission request response signals for connections mapped into a position in the transmission request response interval 2012. OFDM symbol 2038 carries transmission request signals for first round requests for connections mapped into a position in the transmission request interval 2014. OFDM symbol 2040 carries first round transmission request response signals for connections mapped into a position in the transmission request response interval 2016.

OFDM symbol 2042 carries transmission request signals for second round requests for connections mapped into a position in the transmission request interval 2018. OFDM symbol 2044 carries second round transmission request response signals for connections mapped into a position in the transmission request response interval 2020. OFDM symbol 2046 carries transmission request signals for second round requests for connections mapped into a position in the transmission request interval 2022. OFDM symbol 2048 carries second round transmission request response signals for connections mapped into a position in the transmission request response interval 2024.

OFDM symbol 2050 carries transmission request signals for third round requests for connections mapped into a position in the transmission request interval 2026. OFDM symbol 2052 carries third round transmission request response signals for connections mapped into a position in the transmission request response interval 2028. OFDM symbol 2054 carries transmission request signals for third round requests for connections mapped into a position in the transmission request interval 2030. OFDM symbol 2056 carries third round transmission request response signals for connections mapped into a position in the transmission request response interval 2032.

In this example, the position designated to carry a first round transmission request from WT A to WT B, the request being a request for transmission in a corresponding traffic interval of peer to peer traffic signals from wireless terminal A to wireless terminal B is designated as OFDM tone-symbol 2058 of OFDM symbol 2034, which corresponds to tone with index number=1 in transmission request interval for round 1 part 1 2010. In this example, the position designated to carry a first round transmission request response signal, e.g., an RX echo signal, from WT B to WT A is designated as OFDM tone-symbol 2062 of OFDM symbol 2036, which corresponds to tone with index number=1 in transmission request response interval for round 1 part 1 2012.

In this example, the position designated to carry a second round transmission request from WT A to WT B is designated as OFDM tone-symbol 2070 of OFDM symbol 2042, which corresponds to tone with index number=1 in transmission request interval for round 2 part 1 2018. In this example, the position designated to carry a second round transmission request response signal, e.g., an RX echo signal, from WT B to WT A is designated as OFDM tone-symbol 2074 of OFDM symbol 2044, which corresponds to tone with index number=1 in transmission request response interval for round 2 part 1 2020.

In this example, the position designated to carry a third round transmission request from WT A to WT B is designated as OFDM tone-symbol 2084 of OFDM symbol 2050, which corresponds to tone with index number=1 in transmission request interval for round 3 part 1 2026. In this example, the position designated to carry a third round transmission request response signal, e.g., an RX echo signal, from WT B to WT A is designated as OFDM tone-symbol 2088 of OFDM symbol 2052, which corresponds to tone with index number=1 in transmission request response interval for round 2 part 1 2028.

In this example, the position designated to carry a first round transmission request from WT C to WT D, the request being a request for transmission in the corresponding traffic interval of peer to peer traffic signals from wireless terminal C to wireless terminal D is designated as OFDM tone-symbol 2060 of OFDM symbol 2034, which corresponds to tone with index number=3 in transmission request interval for round 1 part 1 2010. In this example, the position designated to carry a first round transmission request response signal, e.g., an RX echo signal, from WT D to WT C is designated as OFDM tone-symbol 2064 of OFDM symbol 2036, which corresponds to tone with index number=3 in transmission request response interval for round 1 part 1 2012.

In this example, the position designated to carry a second round transmission request from WT C to WT D is designated as OFDM tone-symbol 2072 of OFDM symbol 2042, which corresponds to tone with index number=3 in transmission request interval for round 2 part 1 2018. In this example, the position designated to carry a second round transmission request response signal, e.g., an RX echo signal, from WT D to WT C is designated as OFDM tone-symbol 2076 of OFDM symbol 2044, which corresponds to tone with index number=3 in transmission request response interval for round 2 part 1 2020.

In this example, the position designated to carry a third round transmission request from WT C to WT D is designated as OFDM tone-symbol 2086 of OFDM symbol 2050, which corresponds to tone with index number=3 in transmission request interval for round 3 part 1 2026. In this example, the position designated to carry a third round transmission request response signal, e.g., an RX echo signal, from WT D to WT C is designated as OFDM tone-symbol 2090 of OFDM symbol 2052, which corresponds to tone with index number=3 in transmission request response interval for round 2 part 1 2028.

In this example, the position designated to carry a first round transmission request from WT E to WT F, the request being a request for transmission in the corresponding traffic interval of peer to peer traffic signals from wireless terminal E to wireless terminal F is designated as OFDM tone-symbol 2066 of OFDM symbol 2038, which corresponds to tone with index number=5 in transmission request interval for round 1 part 2 2014. In this example, the position designated to carry a first round transmission request response signal, e.g., an RX echo signal, from WT F to WT E is designated as OFDM tone-symbol 2068 of OFDM symbol 2040, which corresponds to tone with index number=5 in transmission request response interval for round 1 part 2 2016.

In this example, the position designated to carry a second round transmission request from WT E to WT F is designated as OFDM tone-symbol 2080 of OFDM symbol 2046, which corresponds to tone with index number=5 in transmission request interval for round 2 part 2 2022. In this example, the position designated to carry a second round transmission request response signal, e.g., an RX echo signal, from WT F to WT E is designated as OFDM tone-symbol 2082 of OFDM symbol 2048, which corresponds to tone with index number=5 in transmission request response interval for round 2 part 2 2024.

In this example, the position designated to carry a third round transmission request from WT E to WT F is designated as OFDM tone-symbol 2092 of OFDM symbol 2054, which corresponds to tone with index number=5 in transmission request interval for round 3 part 2 2030. In this example, the position designated to carry a third round transmission request response signal, e.g., an RX echo signal, from WT F to WT E is designated as OFDM tone-symbol 2094 of OFDM symbol 2056, which corresponds to tone with index number=5 in transmission request response interval for round 3 part 2 2032.

Wireless terminal A, when it has traffic data that it would like to transmit to WT B, when deciding whether or not to transmit a transmission request signal in tone-symbol 2070 considers higher priority transmission request response signals corresponding to other connections which have been detected, e.g., request response signals detected during TX request response interval for round 1 part 1 2012 which are higher priority than its own connection priority. Wireless terminal A, when it has traffic data that it would like to transmit to WT B, when deciding whether or not to transmit a transmission request signal in tone-symbol 2084 considers higher priority transmission request response signals corresponding to other connections which have been detected, e.g., request response signals detected during TX request response interval for round 2 part 1 2020 which are higher priority than its own connection priority.

Wireless terminal C, when it has traffic data that it would like to transmit to WT D, when deciding whether or not to transmit a transmission request signal in tone-symbol 2072 considers higher priority transmission request response signals corresponding to other connections which have been detected, e.g., request response signals detected during TX request response interval for round 1 part 1 2012 which are higher priority than its own connection priority. Wireless terminal C, when it has traffic data that it would like to transmit to WT D, when deciding whether or not to transmit a transmission request signal in tone-symbol 2086 considers higher priority transmission request response signals corresponding to other connections which have been detected, e.g., request response signals detected during TX request response interval for round 2 part 1 2020 which are higher priority than its own connection priority.

Wireless terminal E, when it has traffic data that it would like to transmit to WT F, when deciding whether or not to transmit a transmission request signal in tone-symbol 2066 considers higher priority transmission request response signals corresponding to other connections which have been detected, e.g., request response signals detected during TX request response interval for round 1 part 1 2012. Wireless terminal E, when it has traffic data that it would like to transmit to WT F, when deciding whether or not to transmit a transmission request signal in tone-symbol 2080 considers higher priority transmission request response signals corresponding to other connections which have been detected, e.g., request response signals detected during TX request response interval for round 2 part 1 2020. Wireless terminal E, when it has traffic data that it would like to transmit to WT F, when deciding whether or not to transmit a transmission request signal in tone-symbol 2092 considers higher priority transmission request response signals corresponding to other connections which have been detected, e.g., request response signals detected during TX request response interval for round 3 part 1 2028.

Figure 21:
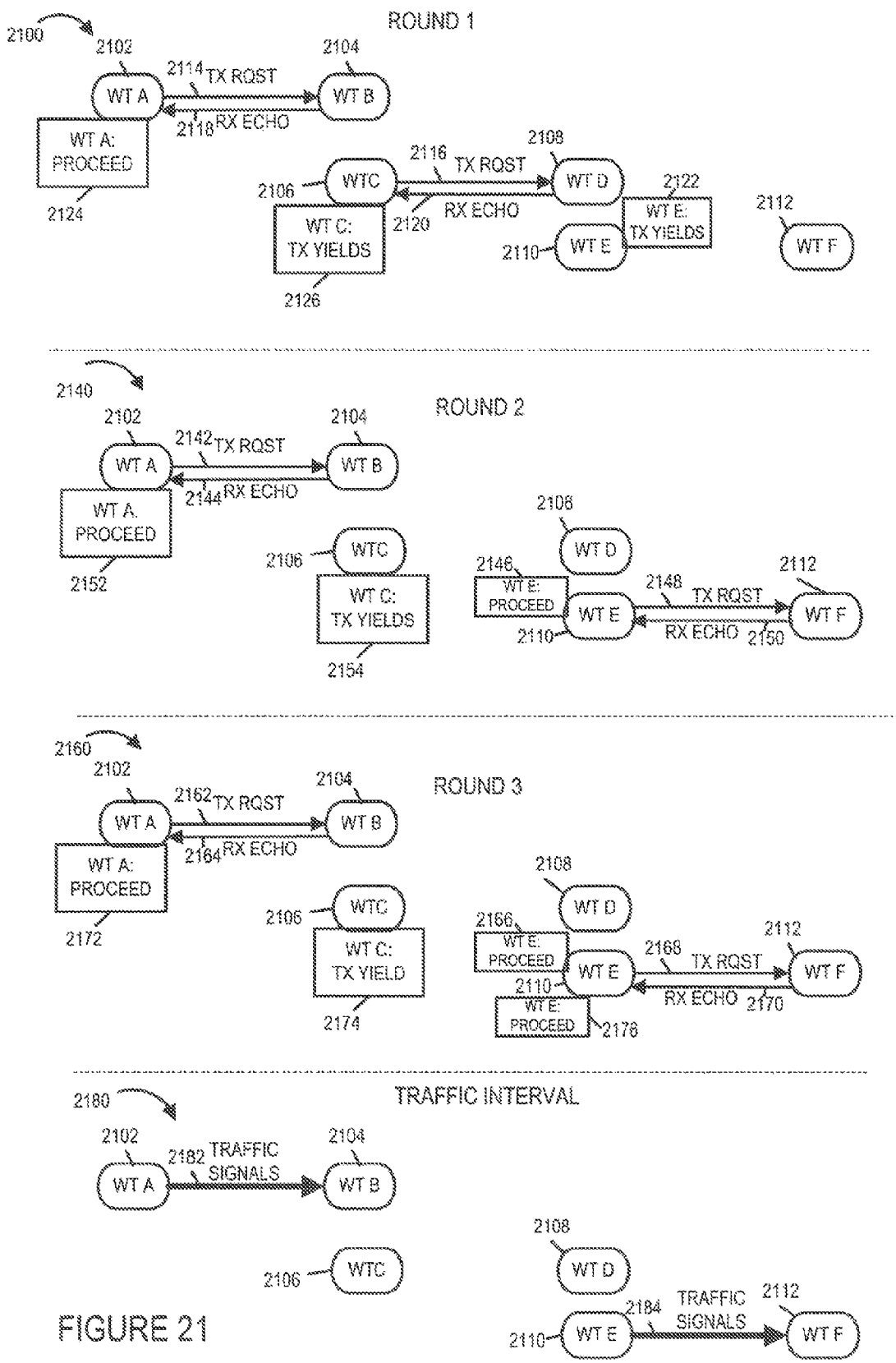
FIG. 21 includes a sequence of drawing illustrating exemplary multi-round request and response signaling in accordance with various embodiments.

FIG. 21 includes a sequence of drawings illustrating exemplary multi-round request and response signaling in accordance with various embodiments. In the example of FIG. 21, there are three transmission request/transmission request response rounds as part of a user scheduling interval for scheduling in a corresponding traffic interval which is subsequent to the three rounds. In this example, assume that WT A 2102, WT B 2104, WT C 2106, WT D 2108, WT E 2110 and WT F 2112 are wireless communications devices such as mobile nodes supporting peer to peer connections. Also assume: (i) that WT A 2102 has a peer to peer connection with WT B 2104 related to traffic signaling from WT A 2102 to WT B 2104; (ii) that WT C 2106 has a peer to peer connection with WT D 2108 related to traffic signaling from WT C 2106 to WT D 2108; (i) that WT E 2110 has a peer to peer connection with WT F 2112 related to traffic signaling from WT E 2110 to WT F 2112. Assume that connection priority is such that the A->B connection priority is greater than the C->D connection priority, and that the C->D connection priority is greater than the E->F connection priority. Also assume that the peer to peer devices use the user scheduling interval timing structure indicated in FIG. 20 which identifies air link resources mapped to the various exemplary connections for the different rounds. Further assume, for the purposes of the example, that WT B 2104 is relatively close to WT C 2106, and that WT D is relatively close to WT E 2110. Also assume for the purpose of this example, that WT A 2102 has peer to peer traffic signals that it would like to transmit to WT B in the traffic interval, that that WT C 2106 has peer to peer traffic signals that it would like to transmit to WT D 2108 in the same traffic interval, and that WT E 2110 has peer to peer traffic signals that it would like to transmit to WT F 2112 in the same traffic interval.

Drawing 2100 illustrates exemplary round 1 transmission request signaling, round 1 transmission request response signaling, and determinations made from a transmitter perspective. (WT A 2102, WT C 2106) transmit (TX request 2114, TX request 2116) to (WT B 2104, WT D 2108), respectively during the round 1 part 1 transmission request interval 2010. (WT B 2104, WT D 2108) receive transmission request signals (2114, 2116), respectively. (WT B 2104, WT D 2108) generate and transmit request response signals (RX echo 2118, RX echo 2120), respectively, during the round 1 part 1 request response interval 2012.

WT E 2110 would like to transmit a TX request signal to WT F 2112 during round 1 part 2 transmission request interval 2014. However, WT E 2110 has detected RX echo signal 2120 from WT D 2108 and determines that if wireless terminal E 2110 were to transmit traffic signals to WT F 2112 that the interference that it would create to WT D 2108 which would be attempting to receive and recover traffic signals from WT C 2106 is expected to be above a threshold. Since the C->D connection is higher in priority than the E->F connection, WT E 2110 decides to implement transmitter yielding and not transmit a request signal to WT F in tone-symbol 2066 as indicated by block 2122.

WT A 2102 has detected RX echo signal 2118, which happens to correspond to the highest priority connection, and decides to proceed as indicated by box 2124. WT C 2106 has received RX echo signal 2120 from WT D 2108. However WT C 2106 has also received RX echo signal 2118 from WT B 2104, which is associated with a higher priority connection than its own connection. In this example, WT C 2106 determines that if it were to transmit, the interference that it would cause at the WT B 2104 receiver is above a threshold. Therefore WT C 2106 decides to perform transmitter yielding as indicated by box 2126.

Drawing 1140 illustrates exemplary round 2 transmission request signaling, round 2 transmission request response signaling, and determinations made from a transmitter perspective. WT A 2102 transmits TX request 2142 to WT B 2104 during the round 2 part transmission request interval 2018. Note that WT C 2106 refrains from transmitting a transmission request in OFDM symbol 2072 due to the yield decisions of round 1 (2126). WT B 2104 receives transmission request signal 2142 during the round 2 part 1 transmission request interval 2016. WT B 1104 generates and transmit request response signal (RX echo 2144) to WT A 2102 during the round 2 part 1 request response interval 2020.

WT E 2122 monitors for RX echo signals in TX request response interval for round 2 part 1 2020. In this round, WT D 2108 has not transmitted a request response signal to WT C since WT C did not transmit a request signal, and WT B 2104 is far enough away from WT E 2110 that its response signal is either not detected at WT E 2110 or is received at a very low power level. WT E 2110 determines, based on received RX echo signals corresponding to higher priority connections, that if it were to transmit traffic to WT F 2112, the interference that it expects that it would cause to other higher priority receivers, which expect to receive traffic, is acceptable. Therefore WT E 2110 decides to continue as indicated by box 2146. WT E 2110 transmits TX request signal 2148 to WT F 2112 using OFDM tone-symbol 2080 in TX request interval round 2 part 2 2022. WT F 2112 receives the TX request signal 2148, decides to send a positive acknowledgment, generates and sends RX echo signal 2150 to WT E 2110.

WT A 2102 has detected RX echo signal 2144, which happens to correspond to the highest priority connection, and decides to proceed as indicated by box 2124. WT C 2106 has received RX echo signal 2144 from WT B 2104, which is associated with a higher priority connection than its own connection. In this example, WT C 2106 determines that if it were to transmit, the interference that it would cause at the WT B 2104 receiver is above a threshold. Therefore WT C 2106 decides to perform transmitter yielding as indicated by box 2154.

Drawing 2160 illustrates exemplary round 3 transmission request signaling, round 3 transmission request response signaling, and determinations made from a transmitter perspective. WT A 2102 transmits TX request 2162 to WT B 2104 during the round 3 part 1 transmission request interval 2026. Note that WT C 2106 refrains from transmitting a transmission request due to the yield decisions of round 2 (2154). WT B 2104 receives transmission request signal 2162 during the round 3 part 1 transmission request interval 2026. WT B 2104 generates and transmits request response signal (RX echo) 2164 to WT A 2102 during the round 3 part 1 request response interval 2028.

WT E 2122 monitors for RX echo signals in TX request response interval for round 3 part 1 2028. In this round, WT D 2108 has not transmitted a request response signal to WT C 2106 since WT C 2106 did not transmit a request signal, and WT B 2104 is far enough away from WT E 2110 that its response signal is either not detected at WT E 2110 or is received at a very low power level. WT E 2110 determines, based on received RX echo signals corresponding to higher priority connections, that if it were to transmit traffic to WT F 2112, the interference that it expects that it would cause to other higher priority receivers, which expect to receive traffic, is acceptable. Therefore WT E 2110 decides to continue as indicated by box 2166. WT E 2110 transmits TX request signal 2168 to WT F 2112 using OFDM tone-symbol 2092 in TX request interval round 3 part 2 2030. WT F 2112 receives the TX request signal 2168, decides to send a positive acknowledgment, generates and sends RX echo signal 2170 to WT E 2110.

WT A has detected RX echo signal 2164, which happens to correspond to the highest priority connection, and decides to proceed as indicated by box 2172. WT C 2106 has received RX echo signal 2164 from WT B 2104, which is associated with a higher priority connection than its own connection. In this example, WT C 2106 determines that if it were to transmit, the interference that it would cause at the WT B 2104 receiver is above a threshold. Therefore WT C 2106 decides to perform transmitter yielding as indicated by box 2174. In addition WT C 2106 decides to perform transmitter yielding for the additional reasons that this is the last round and WT C 2106 has not previously transmitted a transmission request in this round in OFDM tone-symbol 2086 and WT C 2106 has not received an RX echo signal in OFDM tone-symbol 2090.

WT E 1110 has received RX echo signal 2110 from WT F 2112 in TX request response interval for round 3 part 2 2032 and has not received any other RX echo signals of higher priority in interval 2032, in this example. Therefore WT E 2110 determines that if it were to transmit it would not cause unacceptable interference to receivers corresponding to other connections, so WT E 2110 decides to proceed as indicated by box 2176.

Drawing 2180 illustrates exemplary traffic in the traffic interval corresponding to the 3 round user scheduling described with respect to drawings (2100, 2140, 2160). WT A 2102 transmits peer to peer traffic signals 2182 to WT B 2104 during the traffic interval since the decision from the third round was to proceed (2172). WT C 2106 refrains from transmitting peer to peer traffic signals to WT D 2108 during the traffic interval since the decision from the third round was to yield (2174). WT E 2110 transmits peer to peer traffic signals 2184 to WT F 2112 during the traffic interval since the decision from the third round was to proceed (2176). Note that the result of the exemplary multi-round request/request response intervals in the user scheduling interval results in 2 out of the three connections being allowed to transmit traffic signal concurrently using the same air link resource, while if a single round request/request response approach is used in the user scheduling only one connection would be permitted to transmit traffic signals in the traffic interval. Thus, this exemplary multi-round approach leads to more efficient utilization of air link resources.

In this example, WT E 2122 had originally intended to send a TX request to WT F 2112 in round 1 but decided to TX yield because of the WT D round 1 RX echo 2120. However, in latter rounds, where WT D's RX echo disappears, WT E 2122 is able to send a TX request.

While described in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, transmitting a first transmission request from the first device to the second device, transmitting a second transmission request from the first device to the second device, making a decision whether or not to transmit data to the second device based on whether a response to the second transmission request was received from the second device, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first device to communicate with a second device, the method comprising:
   transmitting a first transmission request from the first device to the second device, the first transmission request being a first request to transmit data to the second device during a first traffic interval;
   transmitting a second transmission request from the first device to the second device, the second transmission request being a second request to transmit data to the second device during the first traffic interval, transmitting of the second transmission request occurring subsequent to transmission of said first transmission request;
   detecting transmission request responses to requests to transmit during the first traffic interval that correspond to connections between devices other than said first and second device;
   generating an interference cost estimate based on the detected transmission request responses to requests to transmit during the first traffic interval that correspond to connections between devices other than said first and second devices; and
   making a decision whether or not to transmit data to the second device during said first traffic interval based on said generated interference cost estimate and whether a response to the second transmission request was received from the second device.

2. The method of claim 1, further comprising:
   wherein said step of detecting transmission request responses corresponding to connections between devices other than said first and second device is performed during a transmission request response interval.

3. The method of claim 2, wherein said transmission request response interval is a second transmission request response interval corresponding to a second transmission request interval in which said second transmission request is transmitted.

4. The method of claim 3, further comprising:
   between said steps of transmitting said first transmission request and said second transmission request making a decision whether or not to transmit said second transmission request based on an interference estimate generated from transmission request responses received during a first transmission request response interval corresponding to a first transmission request interval in which said first transmission request was transmitted, said first transmission request response interval occurring between said first transmission request interval and the second transmission request interval, transmission request response received during the first transmission request response interval used to generate said interference estimate being response corresponding to connections other than the connection between said first and second device.

5. The method of claim 1, wherein a third transmission request interval occurs between said first and second transmission request intervals, the method further comprising:
   deciding whether or not to transmit a third transmission request during third transmission interval based on an interference estimate generated from transmission request responses received during a first transmission request response interval corresponding to a first transmission request interval in which said first transmission request was transmitted, said first transmission request response interval occurring between said first transmission request interval and the third transmission request interval, transmission request responses received during the first transmission request response interval used to generate said interference estimate being responses corresponding to connections other than the connection between said first and second device, said step of deciding whether or not to transmit a third transmission request including deciding not to transmit the third transmission request when said generated interference cost estimate exceeds an interference threshold.

6. A first device for communicating with a second device, the first device comprising:
   a transmission request module for generating transmission requests, said transmission requests including a first transmission request and a second transmission request from the first device to the second device, the first transmission request being a first request to transmit data to the second device during a first traffic interval, the second transmission request being a second request to transmit data to the second device during the first traffic interval;
   a wireless transmitter for transmitting the first and second transmission requests;
   a first detection module for detecting transmission request responses to requests to transmit during the first traffic interval that correspond to connections between devices other than said first and second device;
   an interference cost estimate generation module for generating an interference cost estimate based on the detected transmission request responses to requests to transmit during the first traffic interval that correspond to connections between devices other than said first and second devices;
   a receiver for receiving transmission request responses;
   a transmission decision module for determining whether or not to transmit data to the second device during said first traffic interval based on said generated interference cost estimate and whether a response to the second transmission request was received from the second device; and
   a transmission control module for controlling said wireless transmitter to transmit data to said second device when a decision by said transmission decision module indicates a decision to transmit.

7. The first device of claim 6, wherein said first detection module is configured to detect transmission request responses corresponding to connections between devices other than said first and second device during a transmission request response interval.

8. The first device of claim 7, wherein said transmission request response interval is a second transmission request response interval corresponding to a second transmission request interval in which said second transmission request is transmitted.

9. The device of claim 8, further comprising:
a second decision module for determining whether or not to transmit said second transmission request based on an interference estimate generated by said interference estimate cost generation module.

10. The device of claim 8, further comprising:
memory including transmission timing structure information indicating the relative timing relationship between three ordered transmission request intervals and three response intervals which correspond to said first traffic interval.

11. A first device for communicating with a second device, the first device comprising:
transmission request generation means for generating transmission requests, said transmission requests including a first transmission request and a second transmission request from the first device to the second device, the first transmission request being a first request to transmit data to the second device during a first traffic interval, the second transmission request being a second request to transmit data to the second device during the first traffic interval;
wireless transmitter means for transmitting the first and second transmission requests;
first detection means for detecting transmission request responses to requests to transmit during the first traffic interval that correspond to connections between devices other than said first and second device;
interference cost estimate generation means for generating an interference cost estimate based on the detected transmission request responses to requests to transmit during the first traffic interval that correspond to connections between devices other than said first and second devices;
receiver means for receiving transmission request responses;
transmission decision means for determining whether or not to transmit data to the second device during said first traffic interval based on said generated interference cost estimate and whether a response to the second transmission request was received from the second device; and
transmission control means for controlling said wireless transmitter means to transmit data to said second device when a decision by said transmission decision means indicates a decision to transmit.

12. The first device of claim 11, wherein said first detection means for detecting transmission request responses detect request responses corresponding to connections between devices other than said first and second device during a transmission request response interval.

13. The first device of claim 12, wherein said transmission request response interval is a second transmission request response interval corresponding to a second transmission request interval in which said second transmission request is transmitted.

14. A non-transitory computer readable medium embodying machine executable instructions for controlling a first device to implement a method of communicating with a second device, the method comprising:
transmitting a first transmission request from the first device to the second device, the first transmission request being a first request to transmit data to the second device during a first traffic interval;
transmitting a second transmission request from the first device to the second device, the second transmission request being a second request to transmit data to the second device during the first traffic interval, transmitting of the second transmission request occurring subsequent to transmission of said first transmission request;
detecting transmission request responses to requests to transmit during the first traffic interval that correspond to connections between devices other than said first and second device;
generating an interference cost estimate based on the detected transmission request responses to requests to transmit during the first traffic interval that correspond to connections between devices other than said first and second devices; and
making a decision whether or not to transmit data to the second device during said first traffic interval based on said generated interference cost estimate and whether a response to the second transmission request was received from the second device.

15. The non-transitory computer readable medium of claim 14, wherein said step of detecting transmission request responses corresponding to connections between devices other than said first and second device is performed during a transmission request response interval.

16. The non-transitory computer readable medium of claim 15, wherein said transmission request response interval is a second transmission request response interval corresponding to a second transmission request interval in which said second transmission request is transmitted.

17. An apparatus comprising:
a processor for use in a first device which communicates with a second device, the processor configured to:
transmit a first transmission request from the first device to the second device, the first transmission request being a first request to transmit data to the second device during a first traffic interval;
transmit a second transmission request from the first device to the second device, the second transmission request being a second request to transmit data to the second device during the first traffic interval, transmitting of the second transmission request occurring subsequent to transmission of said first transmission request;
detect transmission request responses to requests to transmit during the first traffic interval that correspond to connections between devices other than said first and second device;
generate an interference cost estimate based on the detected transmission request responses to requests to transmit during the first traffic interval that correspond to connections between devices other than said first and second devices; and
make a decision whether or not to transmit data to the second device during said first traffic interval based on said generated interference cost estimate and whether a response to the second transmission request was received from the second device; and
memory coupled to said processor.

18. The apparatus of claim 17, wherein said processor is configured to detect transmission request responses corresponding to connections between devices other than said first and second device during a transmission request response interval.

19. The apparatus of claim 18, wherein said transmission request response interval is a second transmission request response interval corresponding to a second transmission request interval in which said second transmission request is transmitted.

20. A method of operating a second device to communicate with a first device, the method comprising:
receiving from the first device, during a first transmission request interval, a first request to transmit data to the second device during a first traffic interval;
receiving during a second transmission request interval, a second request from the first device to transmit data during the first traffic interval;
receiving during the second transmission request interval additional transmission requests corresponding to connections between devices other than said first and second device, said additional transmission requests being requests to transmit data during the first traffic interval;
generating a received signal quality estimate based on the additional transmission requests corresponding to connections between devices other than said first and second device and said second transmission request from the first device to transmit data during the first traffic interval; and
deciding whether or not to transmit a second transmission request response from the second device to the first device, in response to the second transmission request, based on the generated received signal quality estimate.

21. The method of claim 20, further comprising:
transmitting the second transmission request response when it is decided to transmit the second transmission request response; and
monitoring to receive traffic during said first traffic interval subsequent to transmitting said second transmission request response.

22. The method of claim 20, further comprising:
transmitting a rate information signal to said first device following transmission of a response to the second transmission request and prior to said first traffic interval, said rate information signal indicating a transmission rate to be used for transmitting data during said first traffic interval.

23. The method of claim 21, wherein said received signal quality estimate is one of an SNR and SIR value.

24. The method of claim 21, further comprising:
prior to transmitting a first transmission request response in response to the first request to transmit data to the second device, making a decision whether or not to transmit said first transmission request response based on a received signal quality estimate generated from transmission requests received during a first transmission request time interval during which said first request to transmit data to the second device was received.

25. The method of claim 21, wherein a third transmission request response interval occurs between said first and second transmission request response intervals, the method further comprising:
deciding whether or not to transmit a third transmission request response during said third transmission request response interval based on a generated third received signal quality estimate generated from transmission requests received during said third transmission request interval, said third received signal quality estimate indicating an estimated signal quality of traffic signals which may be received from said first device, said step of deciding whether or not to transmit a third transmission request response including deciding not to transmit the third transmission request response when said generated third received signal quality estimate is below a threshold.

26. A second device for communicating with a first device, the second device comprising:
a wireless receiver for receiving from the first device, during a first transmission request interval, a first request to transmit data to the second device during a first traffic interval, said wireless receiver being configured to receive during a second transmission request interval, a second request from the first device to transmit data during the first traffic interval, and additional transmission requests corresponding to connections between devices other than said first and second device, said additional transmission requests being requests to transmit data during the first traffic interval;
a signal quality estimation module for generating a received signal quality estimate based on the additional transmission requests corresponding to connections between devices other than said first and second device and the second transmission request from the first device to transmit data during the first traffic interval; and
a decision module for deciding whether or not to transmit a second transmission request response from the second device to the first device, in response to the second transmission request, based on the generated received signal quality estimate.

27. The second device of claim 26, further comprising:
a transmitter for transmitting the second transmission request response when it is decided to transmit the second transmission request response; and
wherein said wireless receiver is configured to monitor to receive traffic during said first traffic interval subsequent to transmission of said second transmission request response.

28. The second device of claim 27, wherein said transmitter is configured to transmit a rate information signal to said first device following transmission of a response to the second transmission request and prior to said first traffic interval, said rate information signal indicating a transmission rate to be used for transmitting data during said first traffic interval.

29. The second device of claim 27, wherein said received signal quality estimate is one of an SNR and SIR value.

30. The second device of claim 27, wherein said decision module is configured to decide, prior to transmission of a first transmission request response in response to said first request to transmit data to the second device, whether or not to transmit said first transmission request response based on a received signal quality estimate generated from transmission requests received during a first transmission request time interval during which said first request to transmit data to the second device was received.

31. The second device of claim 26, wherein said decision module makes a decision not to transmit a transmission request response when said received signal quality estimate is below a threshold.

32. The second device of claim 30, further comprising:
memory including transmission timing structure information indicating the relative timing relationship between three ordered transmission request intervals and three response intervals which correspond to said first traffic interval.

33. A second device for communicating with a first device, the second device comprising:
wireless receiver means for receiving from the first device, during a first transmission request interval, a first request to transmit data to the second device during a first traffic interval, and for receiving during a second transmission request interval, a second request from the first device to transmit data during the first traffic interval, and additional transmission requests corresponding to connections between devices other than said first and second device, said additional transmission requests being requests to transmit data during the first traffic interval;

signal quality estimation means for generating a received signal quality estimate based on the additional transmission requests corresponding to connections between devices other than said first and second device and the second transmission request from the first device to transmit data during the first traffic interval; and decision means for deciding whether or not to transmit a second transmission request response from the second device to the first device, in response to the second transmission request, based on the generated received signal quality estimate.

34. The second device of claim 33, further comprising:
transmitter means for transmitting the second transmission request response when it is decided to transmit the second transmission request response; and
wherein said wireless receiver means include means for receiving traffic during said first traffic interval subsequent to transmission of said second transmission request response.

35. The second device of claim 34, wherein said transmitter means include means for transmitting a rate information signal to said first device following transmission of a response to the second transmission request and prior to said first traffic interval, said rate information signal indicating a transmission rate to be used for transmitting data during said first traffic interval.

36. A non-transitory computer readable medium embodying machine executable instructions for controlling a second device to implement a method of communicating with a first device, the method comprising:
receiving from the first device, during a first transmission request interval, a first request to transmit data to the second device during a first traffic interval;
receiving during a second transmission request interval, a second request from the first device to transmit data during the first traffic interval;
receiving during the second transmission request interval additional transmission requests corresponding to connections between devices other than said first and second device, said additional transmission requests being requests to transmit data during the first traffic interval;
generating a received signal quality estimate based on the additional transmission requests corresponding to connections between devices other than said first and second device and the second transmission request from the first device to transmit data during the first traffic interval; and
deciding whether or not to transmit a second transmission request response from the second device to the first device, in response to the second transmission request, based on the generated received signal quality estimate.

37. The non-transitory computer readable medium of claim 36, wherein said method further comprises:
transmitting the second transmission request response when it is decided to transmit the second transmission request response; and
monitoring to receive traffic during said first traffic interval subsequent to transmitting said second transmission request response.

38. The non-transitory computer readable medium of claim 37, wherein said method further comprises:
transmitting a rate information signal to said first device following transmission of a response to the second transmission request and prior to said first traffic interval, said rate information signal indicating a transmission rate to be used for transmitting data during said first traffic interval.

39. An apparatus comprising:
a processor for use in a second device which communicates with a first device, the processor configured to:
receive from the first device, during a first transmission request interval, a first request to transmit data to the second device during a first traffic interval;
receive during a second transmission request interval, a second request from the first device to transmit data during the first traffic interval;
receive during the second transmission request interval additional transmission requests corresponding to connections between devices other than said first and second device, said additional transmission requests being requests to transmit data during the first traffic interval;
generate a received signal quality estimate based on the additional transmission requests corresponding to connections between devices other than said first and second device and the second transmission request from the first device to transmit data during the first traffic interval; and
decide whether or not to transmit a second transmission request response from the second device to the first device, in response to the second transmission request, based on the generated received signal quality estimate; and
memory coupled to said processor.

40. The apparatus of claim 39, wherein said processor is further configured to:
transmit the second transmission request response when it is decided to transmit the second transmission request response; and
monitor to receive traffic during said first traffic interval subsequent to transmitting said second transmission request response.

41. The apparatus of claim 40, wherein said processor is further configured to:
transmit a rate information signal to said first device following transmission of a response to the second transmission request and prior to said first traffic interval, said rate information signal indicating a transmission rate to be used for transmitting data during said first traffic interval.

42. The method of claim 1, further comprising:
transmitting a third transmission request from the first device to the second device, the third transmission request being a third request to transmit data to the second device during the first traffic interval, transmitting of the third transmission request occurring subsequent to transmission of said second transmission request; and
wherein making said decision whether or not to transmit data to the second device is further based on whether a response to the third transmission request was received from the second device.

43. The method of claim 1, further comprising:
receiving a rate information signal from said second device following receipt of a response to the second transmission request from the second device and prior to said first traffic interval.

44. The method of claim 43, wherein said rate information signal includes transmission rate and interference information.

45. The method of claim 43, further comprising:

following receipt of a response to the second transmission request from the second device and prior to receiving said rate information signal, transmitting a pilot signal.

* * * * *